US007258920B2

(12) United States Patent
Boyle et al.

(10) Patent No.: US 7,258,920 B2
(45) Date of Patent: Aug. 21, 2007

(54) MULTIPHASE FIBER MATERIALS AND COMPOSITIONS, METHODS OF MANUFACTURE AND USES THEREOF

(75) Inventors: John B. Boyle, Chester, VA (US); James A. Kweeder, Chester, VA (US); Dale A. Hangey, Midlothian, VA (US); Samir Abdalla, Chula Vista, CA (US)

(73) Assignee: Honeywell International Inc., Morris Township, NJ (US)

( * ) Notice: Subject to any disclaimer, the term of this patent is extended or adjusted under 35 U.S.C. 154(b) by 139 days.

(21) Appl. No.: 10/717,048

(22) Filed: Nov. 18, 2003

(65) Prior Publication Data

US 2005/0119447 A1 Jun. 2, 2005

(51) Int. Cl.
*D02G 3/00* (2006.01)

(52) U.S. Cl. .................. 428/364; 524/86; 528/310
(58) Field of Classification Search ............... 428/364, 428/85, 395; 528/310; 524/86
See application file for complete search history.

(56) References Cited

U.S. PATENT DOCUMENTS

| 3,492,368 | A | * | 1/1970 | Coover, Jr. et al. | 525/425 |
| 3,583,949 | A | * | 6/1971 | Simons | 528/324 |
| 4,745,143 | A | | 5/1988 | Mason et al. | 524/98 |
| 5,047,459 | A | | 9/1991 | Walde | 524/100 |
| 5,155,178 | A | * | 10/1992 | Windley | 525/432 |
| 5,242,733 | A | * | 9/1993 | Windley | 428/97 |
| 5,330,834 | A | | 7/1994 | Windley | 428/364 |
| 5,773,119 | A | * | 6/1998 | Wells | 428/85 |
| 5,889,142 | A | * | 3/1999 | Mohajer et al. | 528/480 |
| 5,898,063 | A | * | 4/1999 | Stefandl | 528/480 |
| 6,268,468 | B1 | * | 7/2001 | Ilg et al. | 528/480 |
| 2002/0099136 | A1 | | 7/2002 | Park et al. | 525/66 |
| 2004/0054082 | A1 | * | 3/2004 | Bank et al. | 525/123 |
| 2004/0154110 | A1 | * | 8/2004 | Studholme | 8/557 |

FOREIGN PATENT DOCUMENTS

GB 1 476 997 10/1974
GB 2 274 109 7/1994

OTHER PUBLICATIONS

Website Home Page; www.fabrica.com.
Antec 1993 Conference Proceedings, New Orleans May 9-13, 1993, vol. 1, p. 470-473.
Antec 1994 Conference Proceedings, New Orleans May 1-5, 1994, vol. 1, p. 116-122.
PCT International Search Report and Written Opinion dated Apr. 5, 2005.

* cited by examiner

*Primary Examiner*—Terressa Boykin
(74) *Attorney, Agent, or Firm*—Sandra P. Thompson; Buchalter Nemer

(57) ABSTRACT

A pre-fiber composition is disclosed herein that includes: a) a first fiber constituent having a first melting point; b) a second fiber constituent having a second melting point; and c) a gelling agent that solvates at least one of the first fiber constituent or the second fiber constituent, wherein the gelling agent significantly reduces co-polymerization of either of the constituents in the composition. A fiber is also disclosed herein that includes: a) at least two amide-based polymers, each having a melting point, wherein the melting point of one amide-based polymer is dissimilar to the melting point of a second amide-based polymer; and b) a gelling agent that is compatible with at least one of the amide-based polymers, wherein the fiber comprises two differentiable melting points that are substantially similar to the melting points of each of the amide-based polymers. A method of producing a pre-fiber composition is disclosed herein that includes: a) providing a first fiber constituent having a first melting point; b) providing a second fiber constituent having a second melting point, wherein the first melting point and the second melting point are dissimilar; c) providing at least one gelling agent; and d) mixing the first constituent, the second constituent and the at least one gelling agent such that there is sufficient viscosity and sufficient melt strength in the composition so that it can be spun into a fiber and such that the first melting point and the second melting point in the fiber are substantially similar to their original values before mixing.

43 Claims, 18 Drawing Sheets

Mixture Contour Plot of Onset

Mixture Contour Plot of 1st Tm

Mixture Contour 1st T(melt) - T(onset)

Mixture Contour Plot of 2nd Tm

MULTIPHASE FIBER MATERIALS AND COMPOSITIONS, METHODS OF MANUFACTURE AND USES THEREOF

FIELD OF THE SUBJECT MATTER

The field of the subject matter herein is multiphase pre-fiber and fiber materials and compositions, fiber products, yarn products and carpet products, methods of manufacture and uses thereof.

BACKGROUND

Fibers for consumer use, especially fibers that are incorporated into yarns, carpet products and fabrics/textiles, are constantly being evaluated for improvements with respect to aesthetics and performance. These improvements may relate to appearance retention, texture and surface appearance, softness and floorwear performance. Fibers and fiber products are also being evaluated to determine if there are more efficient and cost-effective manufacturing processes and equipment.

Fibers, which can be used in the production of carpet products, such as wall-to-wall carpet, rugs and mats, are modified and in some instances improved to provide a certain yarn texture when they are incorporated into a carpet product and to provide a desired "look" for the space where the carpet product is being used. Additional issues that arise in the design of carpet fiber material and carpet products are daily and long-term performance and appearance.

One method that is being used to modify the texture of fabrics is to incorporate fibers that have mixed deniers into the fabric product. Denier (or fiber denier) is a physical property of a particular fiber and can be defined as: "A direct yarn numbering measurement, it is the weight in grams of 9,000 meters of yarn. Therefore, the higher the denier, the larger the yarn. Typical nylon carpet fiber has 15-18 denier/filament." (see www.fabrica.com: Glossary of Fabric and Rug Terms) Another method that is being used to modify fibers and the resulting carpet or textile product is to incorporate not only fibers with mixed deniers, but also mixed lusters, such as the fiber and carpet product seen in commonly-owned U.S. patent application Ser. No. 10/602, 459, which is incorporated herein by reference in its entirety.

Another method of improving the aesthetics of carpet products that is related to the mixed denier method is to incorporate two fiber types—such as a low melt continuous (minority) fiber and a bulked continuous filament (BCF) host fiber. In order to create softer resultant carpets with improved tips, surface and texture, however, the concentration of the minority fiber needs to be reduced. The reduction in concentration of the low melt continuous minority fiber can be difficult because the concentration is ultimately limited by the denier of the minority fiber. In a conventional low melt/host fiber product, the low melt continuous fiber has a yarn denier of about 20-40 denier, and depending on the denier of the host fiber, the low melt fiber constituent can greatly influence the final properties of the resultant fiber and/or resultant carpet product. Traditionally, carpet yarn deniers range between 1000 and 1500.

Caprolactam and nylon compounds have each been individually polymerized with the same compounds (i.e. caprolactam/caprolactam or nylon/nylon) by anionic polymerization in a twin-screw extruder and then tested for residual monomer content and thermal/mechanical properties; however, in both processes, there were no mixed monomer anionic polymerization, the polymerization process did not result in a pre-fiber gel composition that could be processed by any means (including extrusion), there was no pre-fiber dispersion, and there is no indication that the mechanical strength or thermal strength was improved by the single monomer/twin-screw extruder mixing process. (see Antec '93 Conference Proceedings, New Orleans, 9-13 May 1993, Vol. 1, p. 470-473; and Antec '94 Conference Proceedings, San Francisco, Calif., 1-5 May 1994, Vol. 1, p. 116-22)

Therefore, it would be desirable to produce a multiphase pre-fiber and/or fiber material and/or composition that a) has sufficient viscosity and suitable melt strength such that it can be spun into a fiber or yarn, b) can be processed by any processing method, including extrusion, c) can be incorporated into the production of a fiber, yarn, textile and/or carpet product, d) allows for reduction of the concentration of or the effect of the low melt material component without being constrained by a particular fiber denier, e) would comprise at least two dispersed constituents and exhibits at least two definitive and differentiatable melting points, and f) would produce a composition, fiber and/or product having two melting points whereby the melt temperature of the constituent having the lower melting point is maintained primarily by minimizing/preventing co-polymerization during blending and processing steps.

SUMMARY OF THE SUBJECT MATTER

A pre-fiber composition is disclosed herein that comprises: a) a first fiber constituent having a first melting point; b) a second fiber constituent having a second melting point; and c) a gelling agent that solvates at least one of the first fiber constituent or the second fiber constituent, wherein the gelling agent significantly reduces co-polymerization of either of the constituents in the composition.

A fiber is also disclosed herein that comprises: a) at least two amide-based polymers, each having a melting point, wherein the melting point of one amide-based polymer is dissimilar to the melting point of a second amide-based polymer; and b) a gelling agent that is compatible with at least one of the amide-based polymers, wherein the fiber comprises two differentiatable melting points that are substantially similar to the melting points of each of the amide-based polymers.

A method of producing a pre-fiber composition is disclosed herein that comprises: a) providing a first fiber constituent having a first melting point; b) providing a second fiber constituent having a second melting point, wherein the first melting point and the second melting point are dissimilar; c) providing at least one gelling agent; and d) mixing the first constituent, the second constituent and the at least one gelling agent such that there is sufficient viscosity and sufficient melt strength in the composition so that it can be spun into a fiber and such that the first melting point and the second melting point in the fiber are substantially similar to their original values before mixing.

DETAILED DESCRIPTION

Figure 1:
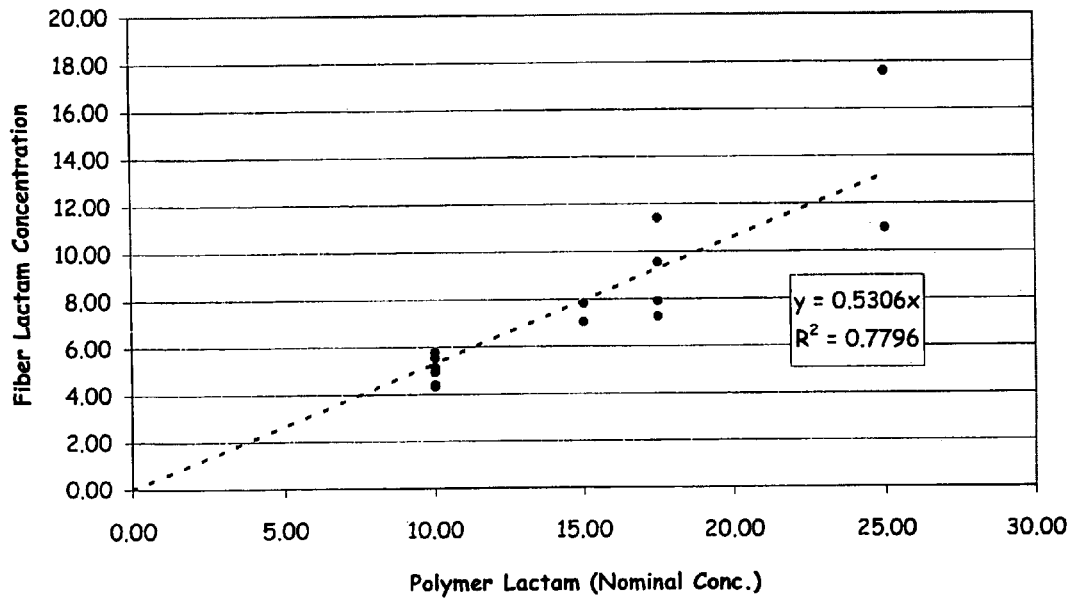
FIG. 1 shows data collected that relates to the onset of melting of the binder phase and the lactam concentration.
Figure 2:
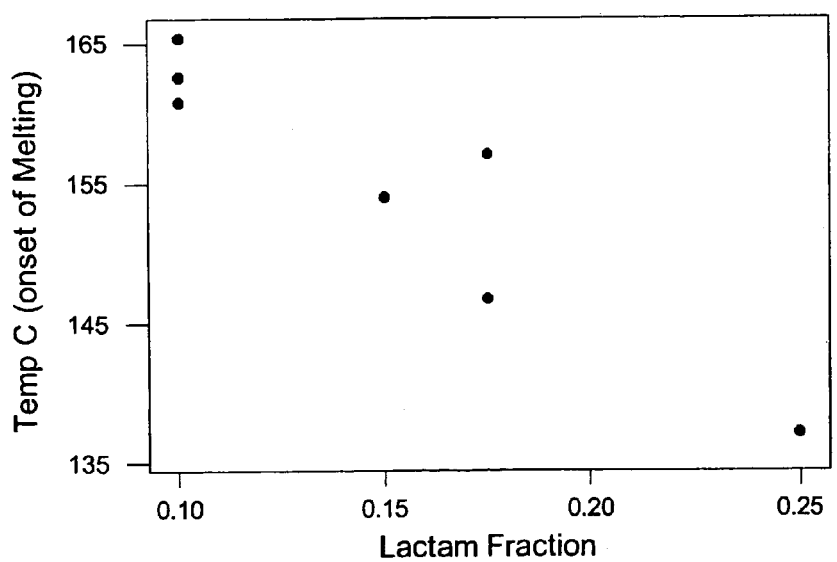
FIG. 2 shows data collected that relates to the onset of melting of the binder phase and the lactam concentration.
Figure 3:
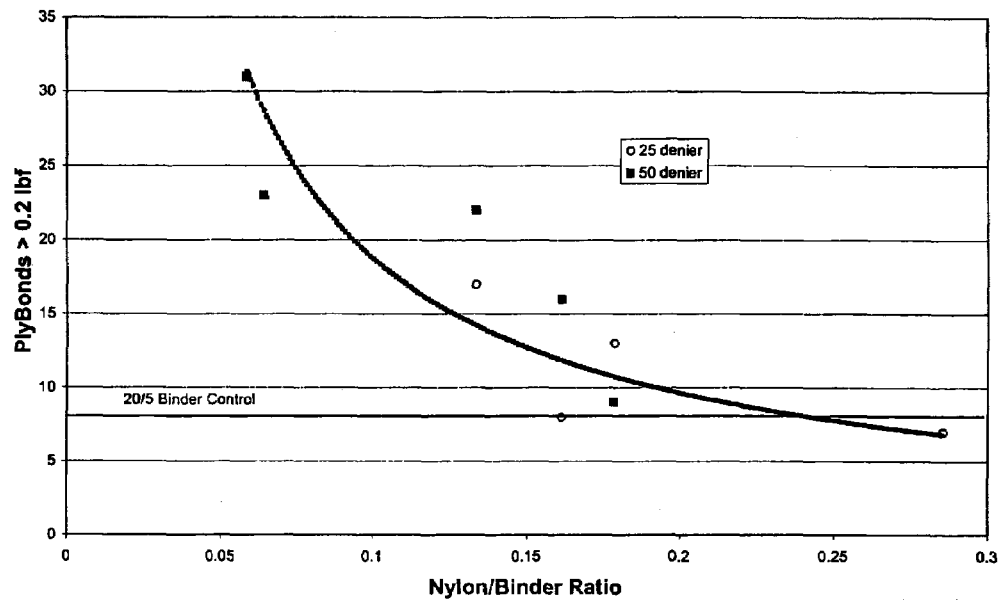
FIG. 3 shows data collected that relates to the onset of melting of the binder phase and the lactam concentration.
Figure 4:
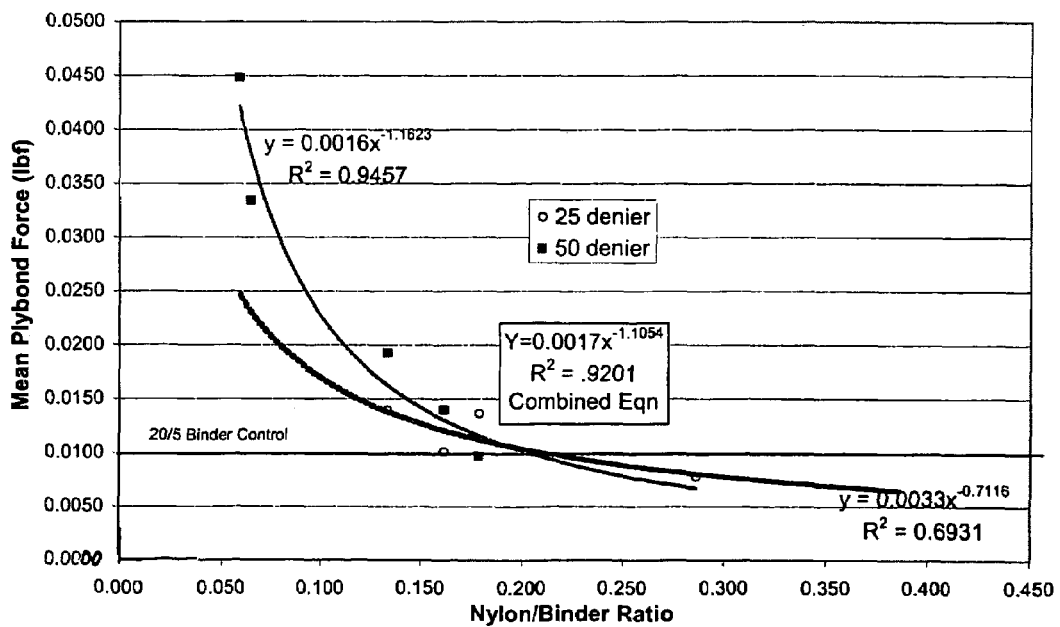
FIG. 4 shows data collected that relates to the onset of melting of the binder phase and the lactam concentration.
Figure 5:
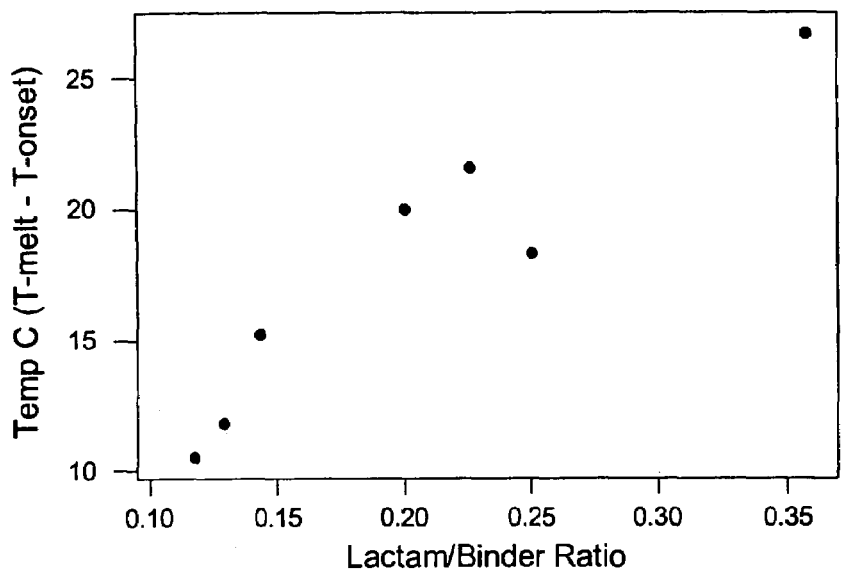
FIG. 5 shows data collected that relates to the onset of melting of the binder phase and the lactam concentration.
Figure 6:
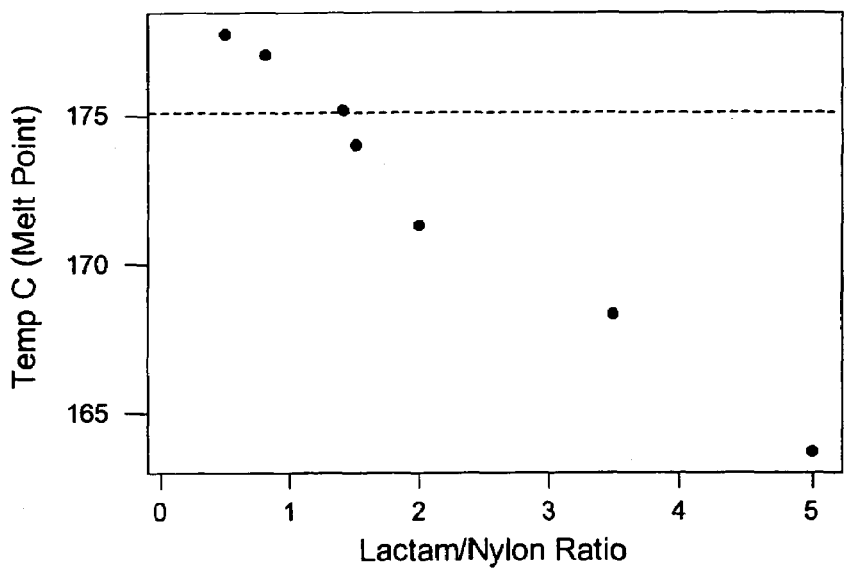
FIG. 6 shows data collected that relates to the onset of melting of the binder phase and the lactam concentration.
Figure 7:
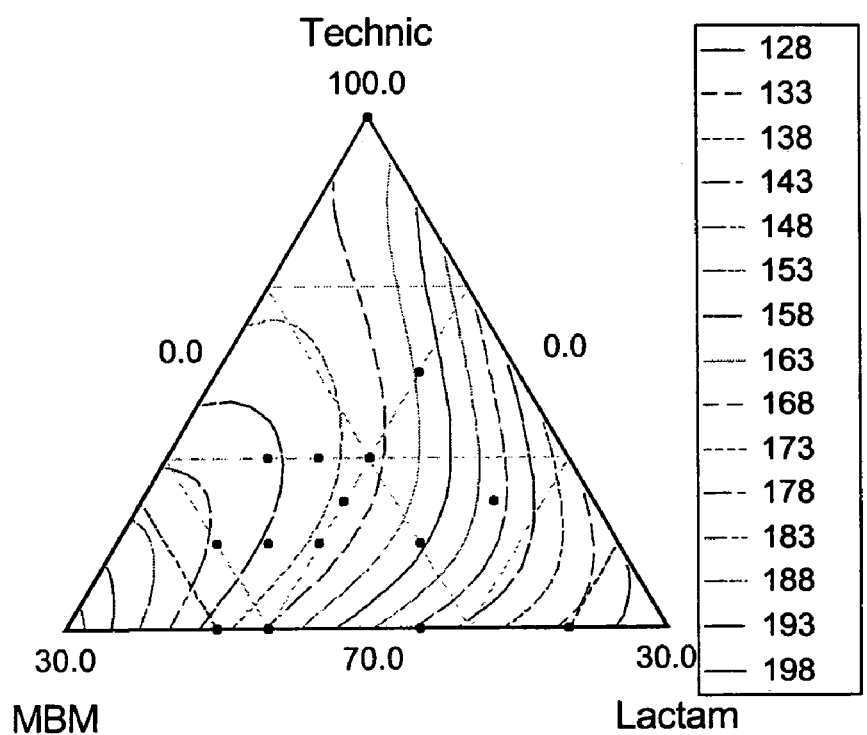
FIG. 7 shows data collected that relates to the onset of melting of the binder phase and the lactam concentration.
Figure 8:
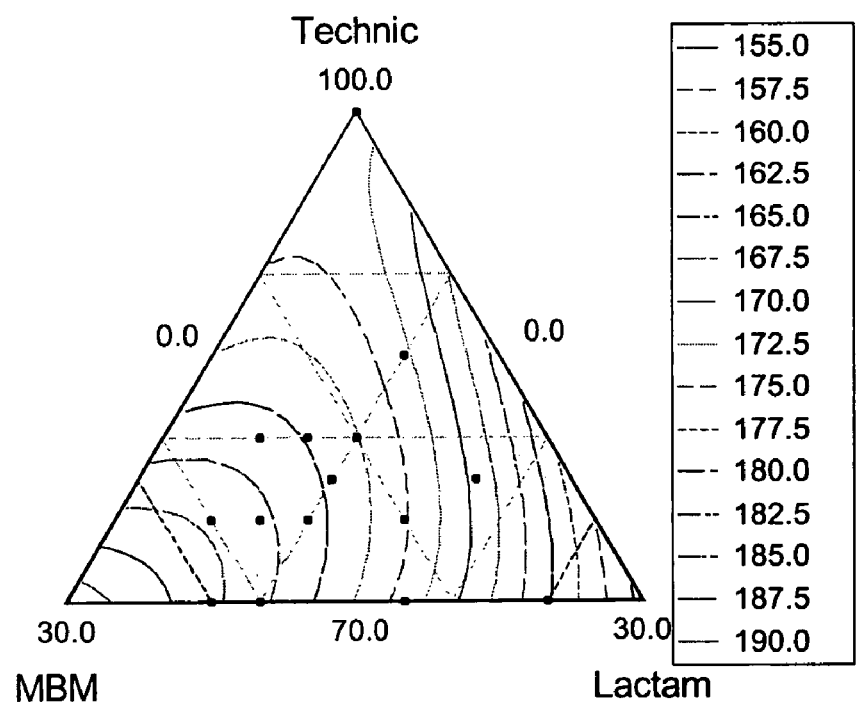
FIG. 8 shows data collected that relates to the onset of melting of the binder phase and the lactam concentration.
Figure 9:
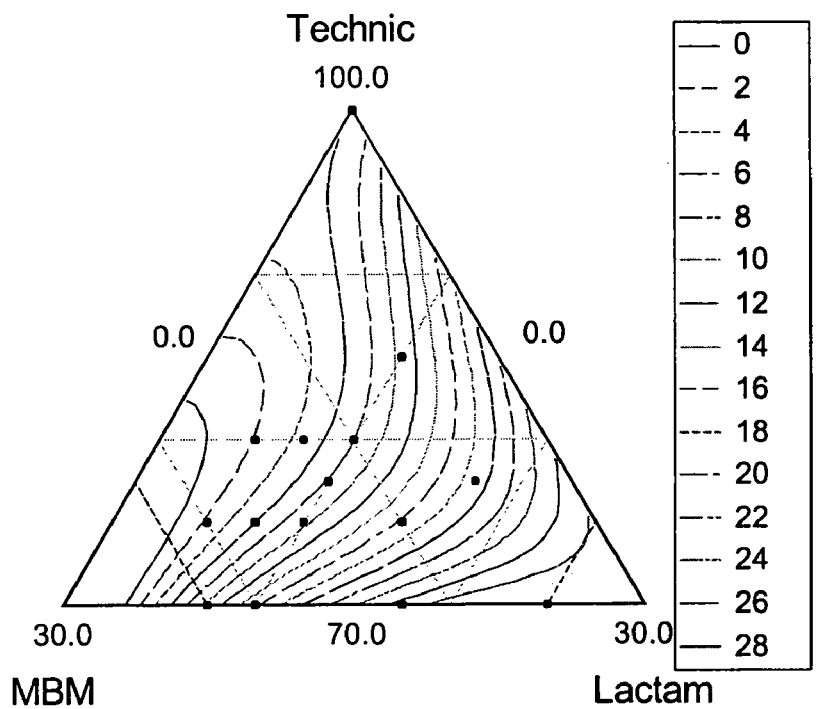
FIG. 9 shows data collected that relates to the onset of melting of the binder phase and the lactam concentration.
Figure 10:
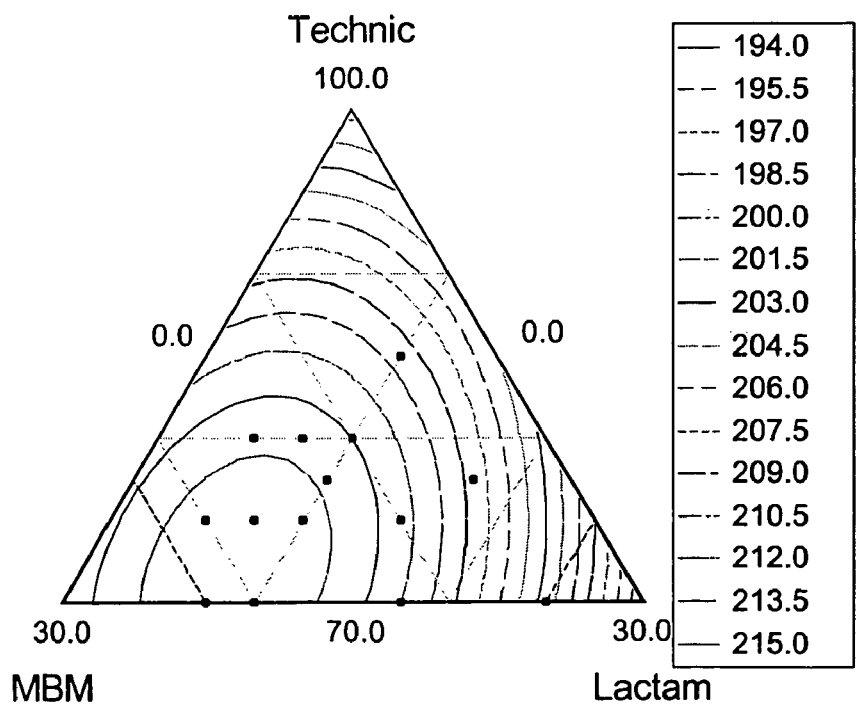
FIG. 10 shows data collected that relates to the onset of melting of the binder phase and the lactam concentration.
Figure 11:
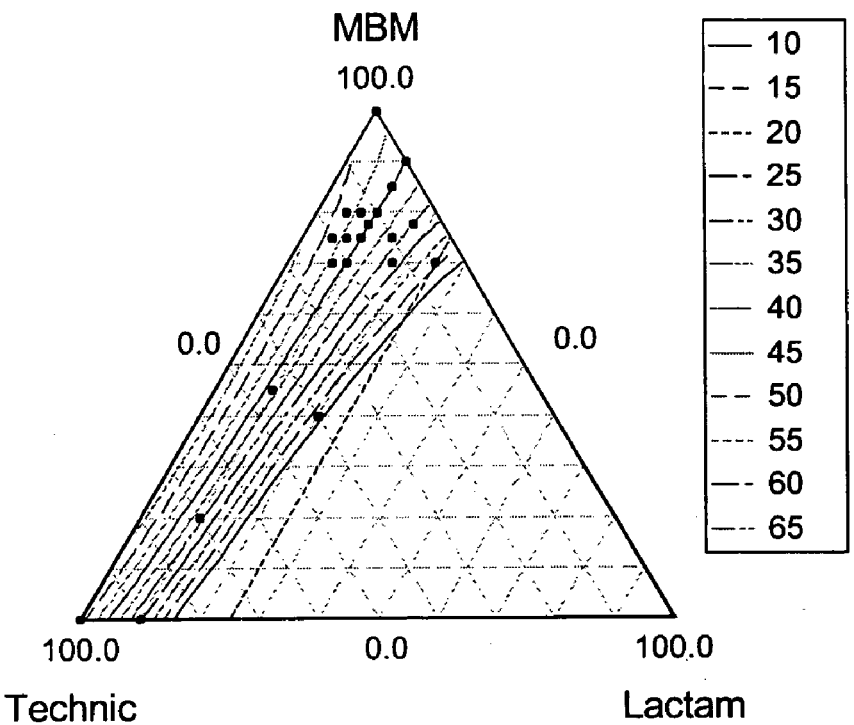
FIG. 11 shows data collected that relates to the onset of melting of the binder phase and the lactam concentration.
Figure 12:
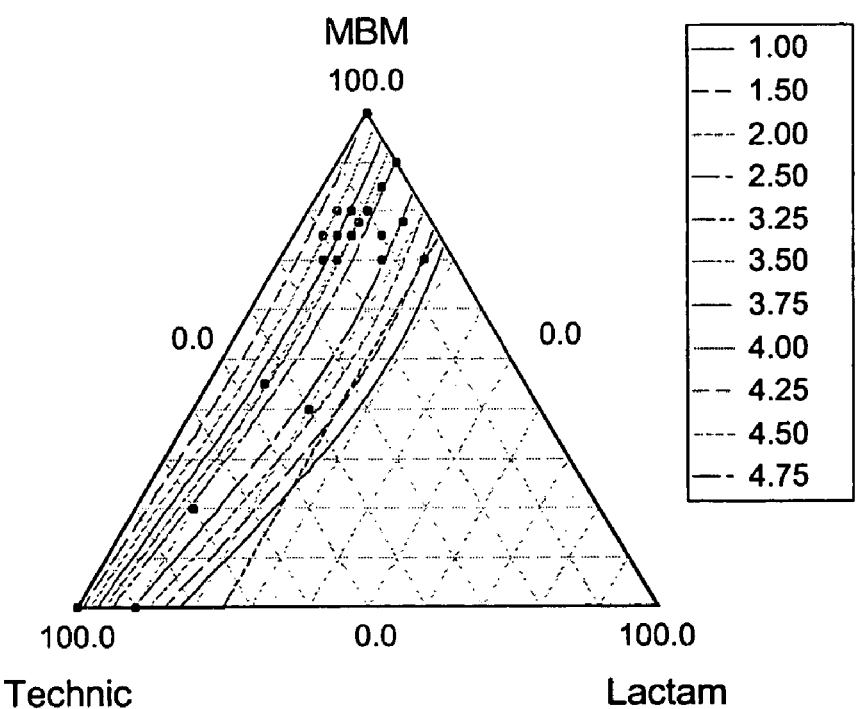
FIG. 12 shows data collected that relates to the onset of melting of the binder phase and the lactam concentration.
Figure 13:
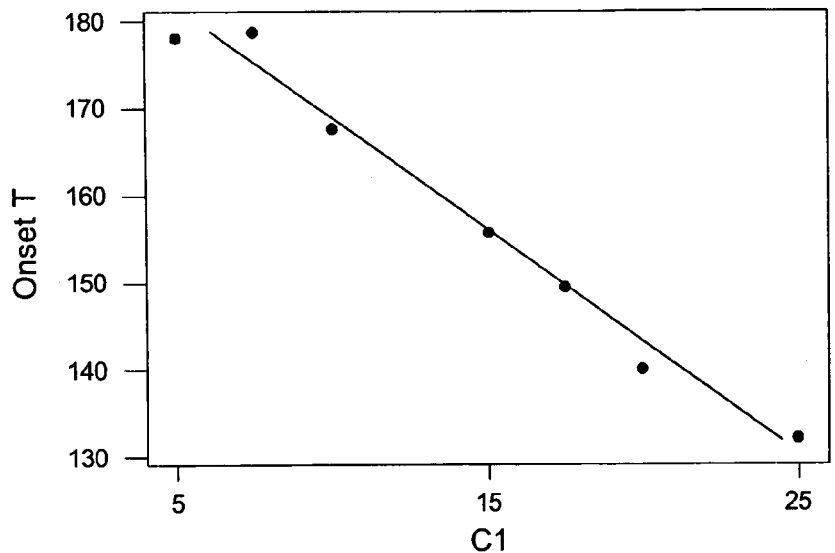
FIG. 13 shows data collected that relates to the onset of melting of the binder phase and the lactam concentration.
Figure 14:
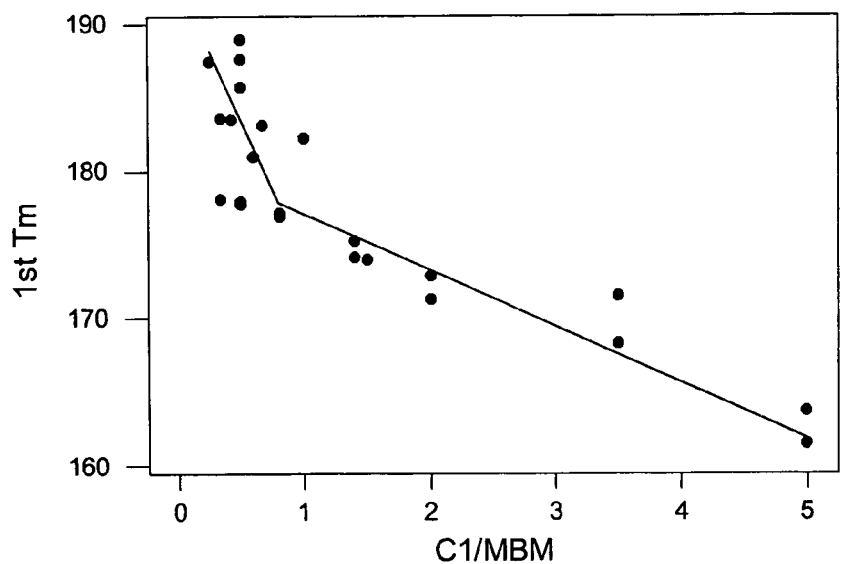
FIG. 14 shows data collected that relates to the onset of melting of the binder phase and the lactam concentration.
Figure 15:
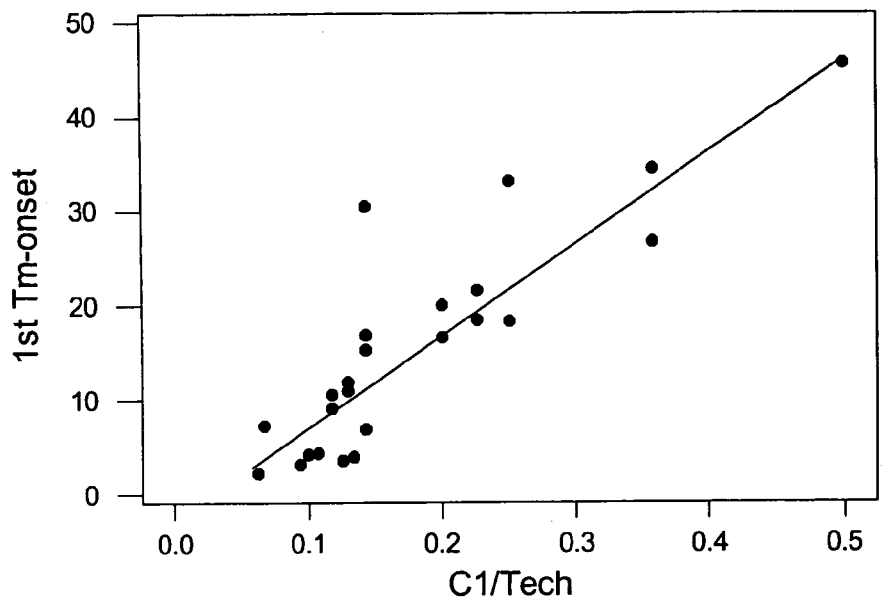
FIG. 15 shows data collected that relates to the onset of melting of the binder phase and the lactam concentration.
Figure 16:
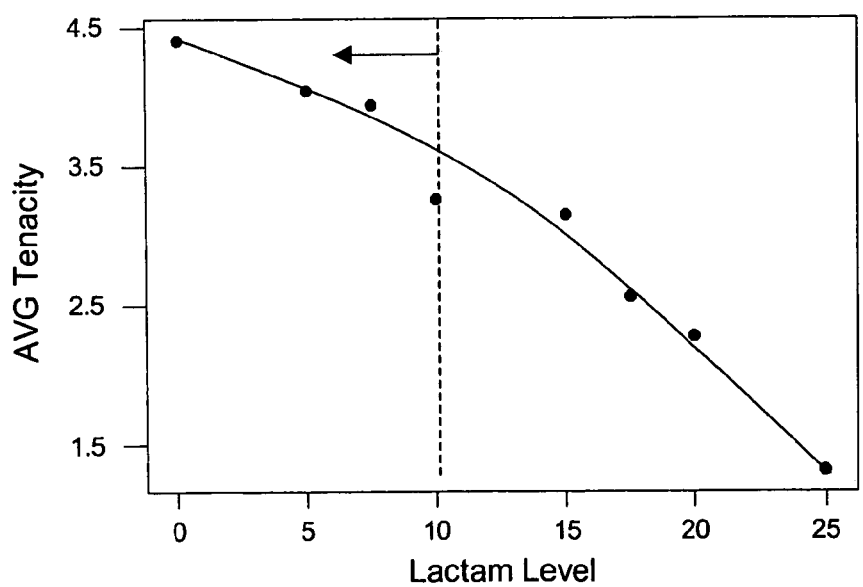
FIG. 16 shows data collected that relates to the onset of melting of the binder phase and the lactam concentration.

A multiphase pre-fiber and/or fiber material and/or composition has been produced that a) has sufficient viscosity and suitable melt strength such that it can be spun into a fiber or yarn, b) can be processed by any processing method, including extrusion, c) can be incorporated into the production of a fiber, yarn, textile and/or carpet product, d) allows for reduction of the concentration of or the effect of the low melt material component without being constrained by a particular fiber denier, e) comprises at least two dispersed constituents and exhibits at least two definitive and differentiatable melting points, and f) can produce a composition, fiber and/or product having at least two constituents each with a different melting point whereby the melt temperature of the constituent having the lower melting point is maintained primarily by minimizing/preventing co-polymerization during blending and processing steps. These pre-fiber and fiber materials and/or compositions at temperatures are also able to be processed at or below normal processing temperatures for a nylon fiber product.

In some embodiments, there is a formation of a multiphase pre-fiber and/or fiber gel-spun composition and/or material that allows for the control of the properties of the drawn fiber by allowing for more favorable orientation of the polymer molecules in the fiber. Controlling the molecule orientation can lead to increased tensile strength and an overall fiber improvement in the fiber physical properties. Furthermore, at least part of the at least one gelling agent can be removed and recovered from the spun fiber once formed. Formation of one of the embodiments—the pre-fiber gel composition—is also described in commonly-owned U.S. utility application entitled "Pre-fiber Gel Materials and Compositions, Methods of Manufacture and Uses Thereof" (Ser. No. not yet assigned) that has been filed concurrently and is incorporated herein in its entirety by reference.

In order to produce a pre-fiber composition, dispersion and/or material that can be formed into a gel spun fiber, a contemplated pre-fiber composition includes: a) a first fiber constituent having a first melting point; b) a second fiber constituent having a second melting point; and c) a gelling agent that solvates at least one of the first fiber constituent or the second fiber constituent while at the same time minimizing and/or preventing co-polymerization of the first constituent with the second constituent or either of the individual components with itself (for example, first constituent-first constituent intermolecular or intramolecular polymerization). In other embodiments, the addition of the at least one gelling agent forms a gel composition that has sufficient viscosity and sufficient melt strength upon the mixing of the first fiber constituent, the second fiber constituent and the at least one gelling agent that the composition can be spun into a fiber.

At this point it should be understood that, unless otherwise indicated, all numbers expressing quantities of ingredients, constituents, interaction conditions and so forth used in the specification and claims are to be understood as being modified in all instances by the term "about". Accordingly, unless indicated to the contrary, the numerical parameters set forth in the spacification and attached claims are approximations that may vary depending upon the desired properties sought to be obtained by the subject matter presented herein. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the subject matter presented herein are approximations, the numerical values set forth in the specific examples are reported as precisely as possible. Any numerical value, however, inherently contain certain errors necessarily resulting from the standard deviation found in their respective testing measurements.

A first fiber constituent and a second fiber constituent are the starting points for the formation of a pre-fiber composition, dispersion and/or material, and the mixture of the two can be characterized as a "binder alloy fiber" or an "alloy mixture". It should be understood that the first fiber constituent and the second fiber constituent may comprise any suitable monomer, polymer or moiety, as long as each individual or both combined constituents is capable of being used as a fiber material, especially in yarn products, fabric/textile products and/or carpet products.

In one embodiment, the first fiber constituent may comprise at least one amide-based compound and/or polyamide-based compound and the second fiber constituent may comprise at least one second amide-based compound and/or polyamide-based compound. As used herein, the term "compound" means a substance with constant composition that can be broken down into elements by chemical processes. Polyamides and polyamide-based compounds, as the name implies, are polymers that comprise amide monomers. Several contemplated polyamide-based compounds comprise nylon-6, nylon-6,6, "nylon-6,6,6" (nylon-6/nylon-6,6 copolymer) and/or nylon-12.

Amides are an important group of nitrogenous compounds and monomers that are used as intermediates and/or building blocks in the production of polymers, textiles, plastics and adhesives. Amide monomers are generally represented by the following formula:

wherein R is an alkyl group, an aryl group, a cyclic alkyl group, an alkenyl group, an arylalkylene group, or any other appropriate group that can be utilized to be a part of an amide compound.

As used herein, the term "monomer" generally refers to any chemical compound that is capable of forming a covalent bond with itself or a chemically different compound in a repetitive manner. The repetitive bond formation between monomers may lead to a linear, branched, super-branched, or three-dimensional product. Furthermore, monomers may themselves comprise repetitive building blocks, and when polymerized the polymers formed from such monomers are then termed "blockpolymers". The weight-average molecular weight of monomers may vary greatly between about 40 Dalton and 20000 Dalton. However, especially when monomers comprise repetitive building blocks, monomers may have even higher molecular weights. Monomers may also include additional groups, such as groups used for crosslinking, radiolabeling, and/or chemical or environmental protecting.

The term "alkyl" is used herein to mean a branched or a straight-chain saturated hydrocarbon group or substituent of 1 to 24 carbon atoms, such as methyl, ethyl, n-propyl, isopropyl, n-butyl, isobutyl, t-butyl, octyl, decyl, tetradecyl, hexadecyl, eicosyl, tetracosyl and the like. In some embodiments, contemplated alkyl groups contain 1 to 12 carbon atoms. The term "cyclic alkyl" means an alkyl compound whose structure is characterized by one or more closed rings. The cyclic alkyl may be mono-, bi-, tri- or polycyclic depending on the number of rings present in the compound. The term "aryl" is used herein to mean a monocyclic aromatic species of 5 to 7 carbon atoms or a compound that is built with monocyclic aromatic species of 5 to 7 carbon atoms and is typically phenyl, naphthalyl, phenanthryl, anthracyl etc. Optionally, these groups are substituted with one to four, more preferably one to two alkyl, alkoxy, hydroxy, and/or nitro substituents.

The term "alkenyl" is used herein to mean a branched or a straight-chain hydrocarbon chain containing from 2 to 24 carbon atoms and at least one double bond. Preferred alkenyl groups herein contain 1 to 12 carbon atoms. The term "alkoxy" is used herein to mean an alkyl group bound through a single, terminal ether linkage; that is, an alkoxy group may be defined as —OR wherein R is an alkyl group, as defined above. The term "arylalkylene" is used herein to mean moieties containing both alkylene and monocyclic aryl species, typically containing less than about 12 carbon atoms in the-alkylene portion, and wherein the aryl substituent is bonded to the structure of interest through an alkylene linking group. Exemplary arylalkylene groups have the structure —$(CH_2)_j$—Ar wherein "j" is an integer in the range of 1 to 6 and wherein "Ar" is an aryl species.

The first fiber constituent comprises a first melting point and the second fiber constituent has a second melting point, and it should be understood that the first melting point and the second melting point are different from one another. Melting points can be determined by any available method, including differential scanning calorimetry (DSC), which is used herein and shown in the Examples section. It should further be understood that these at least two melting points are found in the same pre-fiber composition and/or the same fiber before the fiber is formed and after the fiber is formed/spun.

In additional embodiments, at least one additional fiber constituent may be added to the pre-fiber composition and/or dispersion, wherein the at least one additional fiber constituent has at least one additional melting point that is measurably different from both the first melting point and the second melting point.

At least one gelling agent is provided that is mixed and/or blended with the first or second fiber constituent, the at least one polyamide-based or the at least one amide-based compound in order to form a contemplated pre-fiber composition and/or dispersion. The at least one gelling agent may comprise any suitable solvent that a) can solvate and is compatible with either the first or the second fiber constituent and b) is at least partially compatible with the other fiber constituent(s) in the pre-fiber composition. As mentioned, a suitable gelling agent is one that is compatible with either the first or the second fiber constituent. The term "compatible" means that gelling agent that does not contribute any negative effects to the pre-fiber composition, such as by making one of the constituents "watery", by reacting with either the first or second fiber constituent (or additional constituents), by making the dispersion "non-spinnable", by making the "low melt" constituent into a composition that does not retain its low melting point, by inducing co-polymerization in the dispersion between or among any of the constituents and combinations of any of these negative effects thereof.

In some embodiments, especially those embodiments where the first fiber constituent and the second fiber constituent comprise amide-based compounds, the gelling agent comprises a lactam. It should be understood that lactam is a suitable gelling agent because, in the embodiments where the first fiber constituent and the second fiber constituent comprise amide-based compounds, lactam is very compatible with at least one of the first fiber constituent or the second fiber constituent and is at least partially compatible with the other fiber constituent(s).

In yet other embodiments, the lactam-based gelling agent comprises a caprolactam, such as ε-caprolactam. ε-Caprolactam, also known as aminocaproic lactam and 2-oxohexamethyleneimine, is a compound that is produced in flake and molten forms and is used primarily in the manufacture of nylon-6 and nylon-6,6,6 products such as those products contemplated herein or other synthetic fibers, plastics, bristles, films, coatings, synthetic leathers, plasticizers and paint vehicles. Caprolactam can also be used as a cross-linking agent for polyurethanes and in the synthesis of the amino acid lysine. A contemplated lactam preparation method is shown herein in Example 1.

Amides, such as caprolactam, can also be produced by reacting a ketone with hydroxylamine to make an oxime, and then using an acid catalyzed rearrangement of the oxime(s), conventionally called the Beckmann rearrangement, to form the amide. Merchant quality caprolactam can be produced by methods described in U.S. patent application Ser. No. 10/251,335 filed on Sep. 21, 2002, which is commonly owned and herein incorporated in its entirety.

The at least one gelling agent may be added in any suitable weight percentage with respect to the other composition/dispersion constituents, as long as the addition of the gelling agent aids in the production of a pre-fiber composition/dispersion. In a contemplated embodiment, the at least one gelling agent comprises less than 50 weight percent of the composition/dispersion. In another contemplated embodiment, the at least one gelling agent comprises less than 40 weight percent of the composition/dispersion. In yet another contemplated embodiment, the at least one gelling agent comprises less than 30 weight percent of the composition/dispersion. In other contemplated embodiments, the at least one gelling agent comprises less than 20 weight percent of the composition/dispersion. In yet other contemplated embodiments, the at least one gelling agent comprises less than 10 weight percent of the composition/dispersion. Also, in some contemplated embodiments, the at least one gelling agent comprises less than 5 weight percent of the composition/dispersion.

Once the pre-fiber composition/dispersion is formed, the composition/dispersion may be extruded through a suitable die or spinnerette for production of a "minority" fiber. It should be understood that the resulting fiber will comprise the first fiber constituent having and retaining a first melting point (at or near its original melting point) and the second fiber constituent having and retaining a second melting point (at or near its original melting point), whereby co-polymerization between any or all of the constituents has been minimized and/or prevented entirely through the addition of the gelling agent. The minority fiber may then be combined with a "host" fiber or bulked continuous filament (BCF) "host" fiber to create a carpet product that is softer than conventional carpet products made with conventional low melt fiber comprising 100% low melt co-polymer and that comprises improved tips, surface and texture, as opposed to conventional carpet products made without the addition of low melt fibers. These conventional melt-blended polymer fibers generally comprise significant and undesirable co-polymerization, such that the melt point of the low melt polymer increases as the amount of the higher melt point polymer increases. These fibers will not melt and bond at the temperature of the original low melt polymer and hence not effect the aesthetics of the resultant carpets if heat treated at the same temperature.

In addition, a method of producing a pre-fiber composition and/or dispersion includes: a) providing a first fiber constituent having a first melting point; b) providing a second fiber constituent having a second melting point, wherein the first melting point and the second melting point are dissimilar; c) providing at least one gelling agent; and d) mixing the first fiber constituent, the second fiber constituent and the at least one gelling agent such that there is sufficient viscosity and sufficient melt strength in the composition so that it can be spun into a fiber while at the same time minimizing and/or preventing co-polymerization between any of the constituents. Once the pre-fiber composition and/or dispersion is formed, it can be formed into a fiber, which can in turn be combined with a host fiber to form a yarn and then a carpet product having improved tips, surface and texture.

The first fiber constituent, the second fiber constituent, the at least one gelling agent and/or the at least one additional constituent and/or gelling agent may be provided by any suitable method, including a) buying at least some of the first fiber constituent, the second fiber constituent, the at least one gelling agent and/or the at least one additional constituent and/or gelling agent from a supplier or textile mill; b) preparing or producing at least some of the first fiber constituent, the second fiber constituent, the at least one gelling agent and/or the at least one additional constituent and/or gelling agent in house using chemicals provided by another source and/or c) preparing or producing at least some of the first fiber constituent, the second fiber constituent, the at least one gelling agent and/or the at least one additional constituent and/or gelling agent in house using chemicals also produced or provided in house or at the location.

During or after the formation of contemplated pre-fiber compositions, gel-spun fiber materials, yarn products and/or carpet products, a thermal energy may be applied to the materials and/or products, wherein the thermal energy comprises a temperature that is below, at or above the melting point of the higher melting point constituent, the fiber and/or other heat-active components. The thermal energy can be applied to activate at least some of the plurality of fibers. In some embodiments, activating the fibers comprises forming chemical, such as covalent, ionic or hydrogen and/or physical, such as adhesion, bonds between at least some of the plurality of fibers and at least one of the other components. It should be understood, however, that the thermal energy will not induce co-polymerization between any of the constituents in the minority fiber or pre-fiber composition. It should also be understood that regardless of the temperature of the thermal energy that is applied—whether its below, at or above the melting point of the higher melting fiber constituent—the pre-fiber composition and/or fiber product continues to maintain at least two distinct and differentiatable melting points.

The thermal energy may come from any suitable source, including extended/non-point sources, such as a UV-VIS source, an infra-red source, a heat source, both radiative and convective, or a microwave source; or electron sources, such as electron guns or plasma sources. Other suitable energy sources include electron beams, and radiative devices at non-IR wavelengths including x-ray, and gamma ray. Still other suitable energy sources include vibrational sources such as microwave transmitters. In preferred embodiments, the energy source is an extended source. In more preferred embodiments, the energy source is a heat source, such as an atmospheric pressure forced air machine, which can be followed by a steam purge, or a pressurized twist-setting machine. An example of an atmospheric pressure forced air machine is the Suessen® Twist-Setting Machine. Examples of pressurized twist-setting machines are those of the autoclave-type and those manufactured by Superba®.

It should be understood that the thermal energy may be applied consistently or in short bursts. It is also contemplated that the thermal energy may be gradually and continuously applied over a temperature range until the thermal energy is at or above the melting point of the fiber or other heat-active components. For example, the fiber material and/or yarn may be heated by an atmospheric pressure forced air machine at a temperature of about 195° C. for a residence time of about 60 seconds, before the treated fiber material and/or yarn product is tufted. The thermal energy may also be immediately applied at or above the melting point of the binder fiber and/or other heat-active components without any ramp time. It should also be understood that the temperature at which the low melt polymer phase melts is generally dependent on the atmospheric conditions. For example, the melt point of polyamides are depressed in the presence of water.

The pre-fiber materials contemplated and described herein may be used alone or in combination with other materials and/or products to form any suitable product, including a spun fiber product, a yarn product, a fabric product and/or a carpet product.

EXAMPLES

The pre-fiber composition, spun and gel-spun fiber materials, yarn products, carpet products and methods used to produce those materials and products, as described in the examples, are for illustrative purpose only and should not, in any way, limit the scope of this invention.

Example 1

Lactam Preparation

Four liters of caprolactam were melted in a convection oven overnight in a covered container. The lactam was poured into a 5L 3-necked distillation flask with a magnetic stir bar and an electric heating mantle (top and bottom mantles). The distillation column was vacuum jacketed by a 29/42 column and a 10 tray section, a 5 tray section, a splitting distillation head and a condenser. The condenser was held at 50° C. with a heated water circulator. The system had the pressure reduced from 7 mm Hg to 4 mm Hg. Heat was applied and the column was brought to reflux conditions and held for 30 minutes. After 30 minutes for the column to stabilize, the distillation head splitter was activated with a 4 second take off and a 10 second reflux. Slightly less than 1 liter of lactam was distilled off. The heat was turned off and the mantles were removed allowing the lactam in the 5-liter flask to drop to 90° C. before breaking the vacuum on the system. The 5-liter flask was removed and the lactam was poured into 1-liter nalgene beakers and promptly placed into a glove box with a dry nitrogen atmosphere. After cooling overnight, the crystal lactam was transferred to plastic bags and was broken into flake form with a hammer inside the glove box. The lactam was stored inside the dry glove box under house nitrogen until needed for the pre-fiber gel composition formation.

Example 2

A Contemplated Pre-Fiber Gel Composition Formation

Nylon-6 was ground to a fine powder and mixed with a lactam gelling agent, which was in this case—caprolactam. A Braybender mixer was used to mix the nylon and caprolactam at a speed of 60 RPM. Addition time took about 5 minutes and the gel was allowed to mix for 15 minutes after charging at the temperature indicated. The samples were removed while the Braybender was running with a brass wipe stick. The samples were then ground in a Willey mill using a course screen. A weighted amount of each ground gel mix was extracted 16+ hours using a jacketed soxlet extractor. The extract was filtered using a folded #54 paper and rinsed into a 100 mL volumetric flask. The extract was brought to volume with deionized water and then analyzed by Gas Chromatography for % lactam using a Carbowax column.

| GEL MIX | BRAYBENDER TEMPERATURE | WEIGHT EXTRACTED | VOLUME | % LACTAM IN EXTRACT | % LACTAM IN GEL BY GC |
|---|---|---|---|---|---|
| 5% Lactam | 225 | 8.9041 | 100 | 0.2867 | 3.22 |
| 10% Lactam | 220 | 9.0031 | 100 | 0.4204 | 4.67 |
| 15% Lactam | 215 | 9.7892 | 100 | 0.9114 | 9.31 |
| 20% Lactam | 210 | 8.6867 | 100 | 0.966 | 11.12 |
| 30% Lactam | 205 | 8.7811 | 100 | 1.8124 | 20.64 |
| 40% Lactam | 194 | 7.6208 | 100 | 2.3396 | 30.7 |

The resulting gels were gel spun on an twin screw extruder. The gels spun into a fiber product surprisingly well and packages of fiber were able to be prepared at most conventional spinning conditions. Furthermore, it was observed that extruder temperature could be dropped below conventional conditions for neat polymers, given that the gel compositions allowed for lower extruder pressures. Tables 1-5, shown below, give summaries of several of the spinning conditions utilized in these Examples.

Example 3

A Contemplated Pre-Fiber Composition Formation

Background

Conventional binder alloy samples (1-end of 22 denier/12 fils) were inserted into 1202 mp 2-ply yarns during cabling and Superba® heatset. Plybond tests of the yarns did not show any evidence of bonding after Superba® heatset. Subsequently, we autoclave heatset the yarns followed by conversion into a banded carpet. No significant aesthetic effect in the carpet was observed with any of the conventional binder alloy samples. However, there was a slight impact (firmness) on carpet hand at the lowest nylon/binder ratio, but no texture or surface change in the carpet was observed.

This study investigated low melt alloy fibers with modifications to their compositions (higher Technic "binder" and higher lactam concentrations). The goal of the study was to find an alloy composition that would melt and bind fibers together within a bundle during Superba® heatsetting. A primary requirement is that the composition must be melt spinnable and have acceptable fiber tensile properties.

Experimental

The polymer blends were combined in a twin screw extruder and directly spun into fibers. The polymer melt temperature was at or below 218° C. for all the blends evaluated, except for Sample #9, which was also run at 225° C. The finish emulsion was F-137-10 (Finish type F-137 with 10% Emulsion). The target Wet Pick Up (WPU) was 8% and the actual WPU was about 3.3-5.2%. The BCF host fiber is about 1100-1200 textured denier and is subsequently twisted to at least 5.75 tpi and Superba® textured prior to tufting.

The following compositions were evaluated and spun into 25 denier/12 filaments and 50/12 fiber bundles, as shown in Table 6:

TABLE 6

| SAMPLE | TECHNIC (%) | NYLON-6 (%) | LACTAM (%) |
|---|---|---|---|
| 1 | 70 (840 g) | 20 (240 g) | 10 (120 g) |
| 2 | 85 (1020 g) | 5 (60 g) | 10 (120 g) |
| 3 | 70 (840 g) | 5 (60 g) | 25 (300 g) |
| 4 | 75 (900 g) | 10 (120 g) | 15 (180 g) |
| 5 | 70 (840 g) | 12.5 (150 g) | 17.5 (210 g) |
| 6 | 77.5 (930 g) | 5 (60 g) | 17.5 (210 g) |
| 7 | 77.5 (930 g) | 12.5 (150 g) | 10 (120 g) |

The binder fiber samples were inserted on a drawing and texturing machine into the host product (1123 mt) after drawing/texturing and before commingling. The samples were Superba textured heatset at 258° C. Yarns were tested for plybonding and forwarded for conversion to a bonded carpet.

Observations
Carpet Aesthetic Evaluation

The best blend of hand and tips/texture appears close to those observed in samples A3 and B4. These results showed that nylon-6, nylon-6/6,6 and lactam can be blended together to form a multiphase fiber system and that when inserted into a host fiber and subsequently heatset yields carpets with varying degrees of hand and texture. The hand and tips/texture of the resultant carpets is a function of composition.

Lactam concentration in the alloy mixture can have a significant negative effect on tenacity and ultimate elongation (UE). Tenacity and UE increase with decreasing lactam concentration. Concentrations at 10% or less appear most desirable with respect to fiber physical properties. The optimum mixture composition within the ranges evaluated was 78-82% binder polymer, 8-12% nylon-6 and <10% lactam, with respect to tensile properties.

Fiber Melting Properties

Table 8 shows the experimental conditions for the Fiber Melting Tests, including showing each Sample ID (from Table 6 above). Table 9 shows the DSC results for each of these Sample IDs.

There are two distinct polymer phases in the polyamide alloy as evidenced by two distinct melting points and multiple birefringence transitions. The shape and location of the melting peaks vary with composition and spinning melt temperature.

Lactam concentration significantly effects the onset of melting of the binder polymer phase. The onset of melting

TABLE 7

| CARPET ID | BAND ORDER | HOST FIBER | TPI (INSERTED) | BINDER (%) | NYLON (%) | LACTAM (%) | DENIER |
|---|---|---|---|---|---|---|---|
| A | 1 | 1123 mt | 5.75 | 0 | 100 | 0 | 25 |
| A | 2 | 1123 mt | 5.75 | 70 | 20 | 10 | 25 |
| A | 3 | 1123 mt | 5.75 | 70 | 12.5 | 17.5 | 25 |
| A | 4 | 1123 mt | 5.75 | 77.5 | 12.5 | 10 | 25 |
| A | 5 | 1123 mt | 5.75 | 75 | 10 | 15 | 25 |
| A | 6 | 1123 mt | 5.75 | 100 | 0 | 0 | 20 |
| B | 1 | 1123 mt | 5.75 | 0 | 100 | 0 | 25 |
| B | 2 | 1123 mt | 5.75 | 70 | 12.5 | 17.5 | 50 |
| B | 3 | 1123 mt | 5.75 | 77.5 | 12.5 | 10 | 50 |
| B | 4 | 1123 mt | 5.75 | 75 | 10 | 15 | 50 |
| B | 5 | 1123 mt | 5.75 | 77.5 | 5 | 17.5 | 50 |
| B | 6 | 1123 mt | 5.75 | 85 | 5 | 10 | 50 |

The cut pile carpets were $8^{th}$ gauge, the stitches per inch were 8, and the pile height was 22/32". The carpets were dyed and finished. The carpet bands were cut apart and subjectively evaluated for tips/texture and hand. The rankings were as follows:

Hand Evaluation

SOFTEST                                                                           FIRMEST
A1 = B1 <A4 ≦B2 = A3 ≦B4    ≦A2 = A5 ≦A6 <B3 <B5    ≦B6
{----------- Desirable -----------}

Tips/Texture Evaluation

HIGH
LOW (WORST)                                                                       (BEST)
A1 = B1 ≦A4 ≦B2 = B4    ≦A3 = A2 = B3 ≦A5 = B5    <A6 <B6
                         {---------------- Desirable ----------------} of the binder phase decreases linearly as lactam concentration increased as observed in this Example and FIGS. 1-6.

The ratio of lactam/nylon-6 is highly correlated with melt point of the binder polymer phase. As the ratio increases above 1.5, the melt point of the binder phase decreases. This decrease in melt point is likely associated with a lactam phase and its solvation effect on the nylon-6 phase, which minimizes the co-polymerization of the two polyamide phases during melt processing.

The sharpness of the melting peak ($T_{melt}$-$T_{onset}$) of the binder polymer phase varies linearly with the lactam/binder polymer ratio. The binder phase melt peak broadens as the lactam/binder ratio increase.

The number of plybonds stronger than the control yarn (no binder) response increases (non-linearly) as the nylon/binder ratio decreases. The average force to pull the yarns apart also increases (non-linearly) as the nylon/binder ratio decreases. Increasing the bundle denier of the binder alloy in the host fiber increases the number of bonds and the mean force to pull the yarns apart, as expected.

The lactam remaining in the fiber after extrusion is approximately 50% of the original amount added (over and above the lactam present in the original nylon-6 (MBM)).

Example 4

Another Contemplated Pre-Fiber Composition Formation

Background

The previous study demonstrated sufficient melting and bonding of the binder alloy fibers through the Superba® HS process. The compositional effects on the fiber tensile properties and the melting/bonding properties of the binder alloy fibers are better understood through this and other Examples.

Experimental

The polymer blends were combined in a twin screw extruder and directly spun into fibers. The polymer melt temperature was at or below 218° C. for all the blends evaluated, except for Sample #9, which was also run at 225° C. The finish emulsion was F-137-10. The target Wet Pick Up (WPU) was 8% and the actual WPU was about 8-9%. The BCF host fiber is about 1100-1200 textured denier and is subsequently twisted to at least 5.75 tpi and Superba® textured prior to tufting.

The following compositions were evaluated and spun into 20 denier/6 filaments fiber bundles and are shown in Table 10 below:

| SAMPLE | TECHNIC % (GRAMS) | NYLON-6 % (GRAMS) | LACTAM % (GRAMS) |
|---|---|---|---|
| 1 | 80 (1440 g) | 10 (180 g) | 10 (180 g) |
| 2 | 80 (1440 g) | 12.5 (225 g) | 7.5 (135 g) |
| 3 | 80 (1440 g) | 15 (270 g) | 5 (90 g) |
| 4 | 75 (1350 g) | 15 (270 g) | 10 (180 g) |
| 5 | 75 (1350 g) | 17.5 (315 g) | 7.5 (135 g) |
| 6 | 75 (1350 g) | 20 (360 g) | 5 (90 g) |
| 7 | 70 (1260 g) | 20 (360 g) | 10 (180 g) |
| 8 | 70 (1260 g) | 22.5 (405 g) | 7.5 (135 g) |
| 9 | 70 (1260 g) | 25 (450 g) | 5 (90 g) |
| 10 | 100 (1800 g) | 0 (0 g) | 0 (0 g) |
| 11 | 0 (1800 g) | 100 (0 g) | 0 (0 g) |
| 12 | 0 (0 g) | 100 (1800 g) | 0 (0 g) |

The binder fiber samples were inserted on a drawing and texturing machine into the 1202 mt after drawing/texturing and before commingling. The samples were Superba textured heatset at 258° C. Yarns were tested for plybonding and forwarded for conversion to a bonded carpet.

Observations

Lactam concentration in the alloy mixture can have a significant negative effect on tenacity and ultimate elongation (UE). Tenacity and UE increase with decreasing lactam concentration. Minimizing lactam concentration appears to be most desirable with respect to fiber physical properties. However, lactam concentration effects other melting properties and this impact should be considered when establishing the lactam target level. Note: sufficient lactam is required at low spinning melt temperatures (<220° C.) to achieve a phase separation of MBM (a nylon-6 based resin) and Technic (a nylon 6,6,6 based resin—with 70% nylon-6 and 30% nylon-6,6) polymers. Concentrations as low as about 5% were successfully evaluated.

Fiber Melting Properties

Tables 11-13 show the experimental conditions for the Fiber Melting Tests, including showing each Sample ID (from Table 10 above). Table 14 shows the DSC results for each of these Sample IDs.

There are two distinct polymer phases in the polyamide alloy as evidenced by two distinct melting points and multiple birefringence transitions. The shape and location of the melting peaks vary with composition and spinning melt temperature. Sample 9, shown below, was spun at 217° C. and 225° C., which is slightly higher than the melt point of nylon-6. However, the DSC tests of this sample showed two distinct melting points and a sharper melting peak of the binder polymer phase with a reduced melting point. This result was unexpected, since we have observed that at melt temperatures around 260° C., there is only one distinct polymer phase for a 50/50 Technic/nylon blend and melting point, in the absence of additional lactam.

Lactam concentration significantly effects the onset of melting of the binder polymer phase. The onset of melting of the binder phase decreases linearly as lactam concentration increased as observed in this Example and FIGS. 7-16.

The ratio of lactam/nylon-6 is highly correlated with melt point of the binder polymer phase. As the ratio increases above 1.5, the melt point of the binder phase decreases. This decrease in melt point is likely associated with a lactam phase. The sharpness of the melting peak ($T_{melt}$-$T_{onset}$) of the binder polymer phase varies linearly with the lactam/binder polymer ratio. The binder phase melt peak broadens as the lactam/binder ratio increase.

The number of plybonds stronger than the control yarn (no binder) response increases (non-linearly) as the nylon/binder ratio decreases. The average force to pull the yarns apart also increases (non-linearly) as the nylon/binder ratio decreases. Increasing the bundle denier of the binder alloy in the host fiber increases the number of bonds and the mean force to pull the yarns apart, as expected.

Example 5

Another Contemplated Pre-Fiber Composition Formation

Background

Example 4 showed that the shape and location of the melting peaks may vary with spinning melt temperature, in addition to composition. Sample 9 from Example 4 was spun at 217° C. and 225° C., which is slightly higher than the melt point of nylon-6. The DSC tests of this sample (#9B) showed 2 distinct melting points, which implies two distinct crystalline phases were present. This result was unexpected, since it has been observed that at melt temperatures around 260° C. there is only one distinct polymer phase at a 50/50-Technic/nylon blend and one melting point, in the absence of additional lactam.

Experimental

The polymer blends were combined in a twin screw extruder and directly spun into fibers. The polymer melt temperature was varied between about 225° C. and about 265° C. The BCF host fiber is about 1100-1200 textured denier and is subsequently twisted to at least 5.75 tpi and Superba® textured prior to tufting.

The following compositions were evaluated and spun into 20 denier/6 filaments fiber bundles and are shown in Table 15 below:

| SAMPLE (MELT TEMP ° C.) | TECHNIC % (GRAMS) | NYLON-6 % (GRAMS) | LACTAM % (GRAMS) |
| --- | --- | --- | --- |
| 9B (225) | 70 (3150 g) | 25 (1125 g) | 5 (225 g) |
| 9C (235) | 70 (3150 g) | 25 (1125 g) | 5 (225 g) |
| 9D (245) | 70 (3150 g) | 25 (1125 g) | 5 (225 g) |
| 9E (255) | 70 (3150 g) | 25 (1125 g) | 5 (225 g) |
| 9F (265) | 70 (3150 g) | 25 (1125 g) | 5 (225 g) |

Observations

Figure 17:
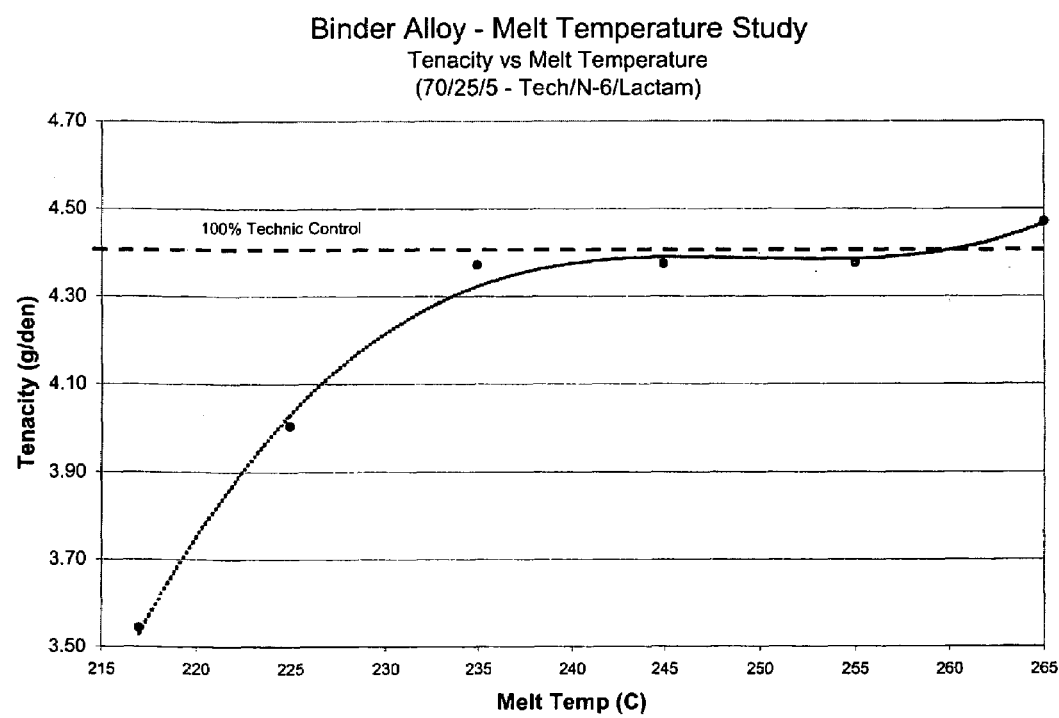
FIG. 17 shows data collected that relates to fiber tenacity.
Figure 18:
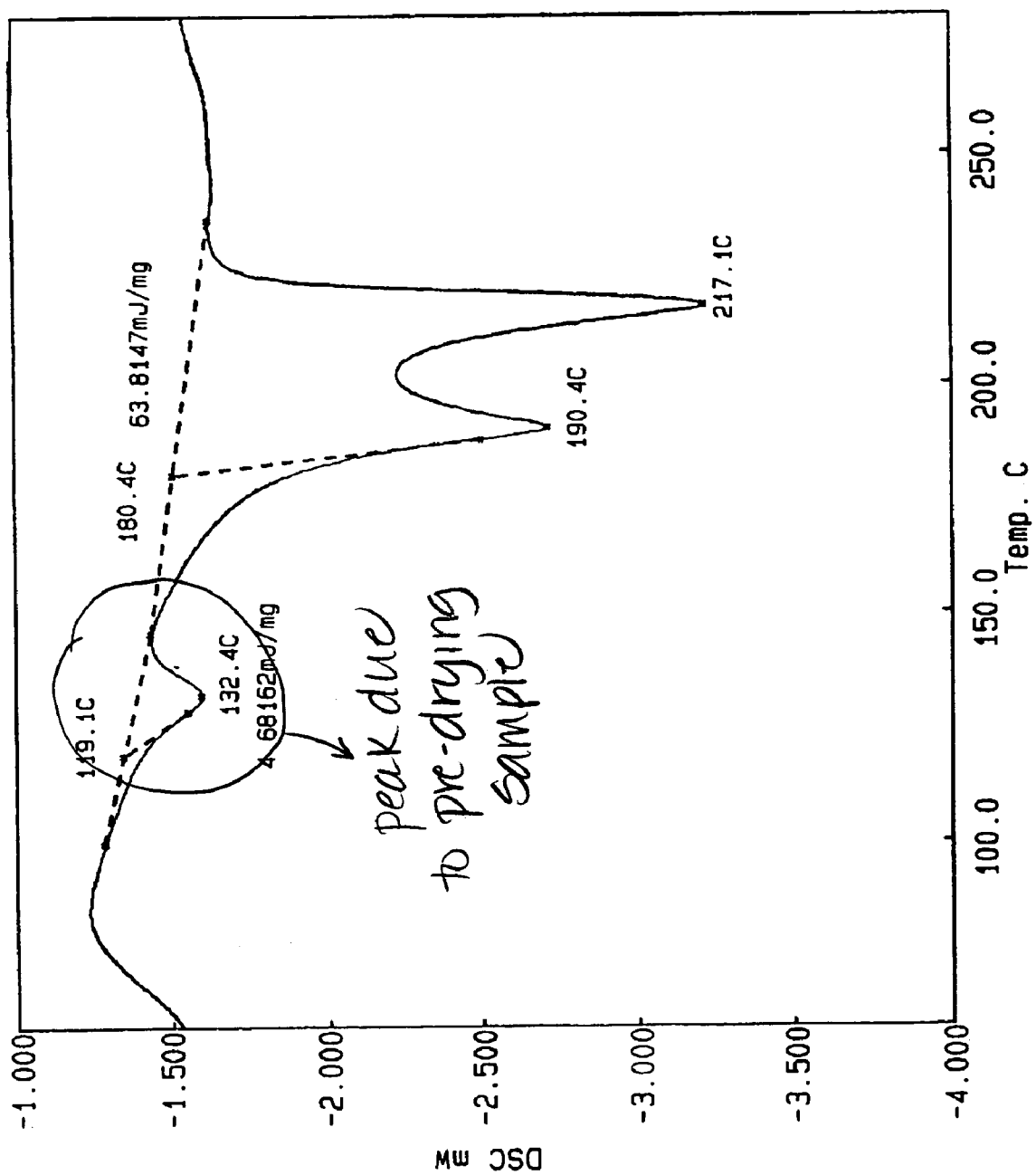
FIG. 18 shows data collected that relates to fiber tenacity.
Figure 19:
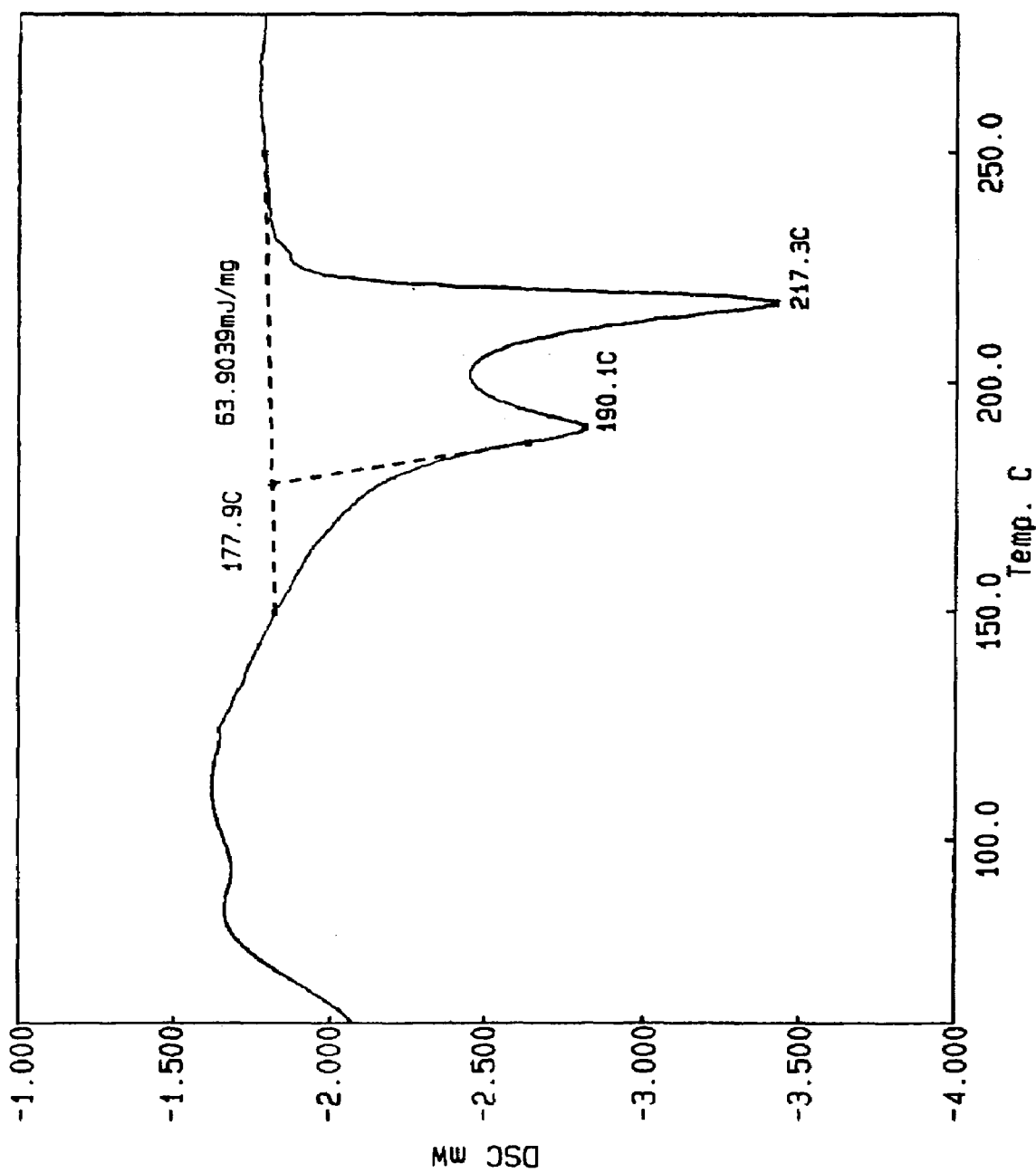
FIG. 19 shows data collected that relates to fiber tenacity.

Tenacity of the resulting fibers improves as the spinning melt temperature increases from 218° C. to about 235° C. with the composition evaluated. At temperatures greater or equal to about 235° C., tenacity remains constant and equal to the tenacity of the 100% binder (Technic) fibers. (See FIGS. 17-19).

Fiber Melting Properties

Tables 16-17 show the experimental conditions for the Fiber Melting Tests, including showing each Sample ID (from Table 15 above). Table 18 shows the DSC results for each of these Sample IDs.

Increasing the spinning melt temperature doesn't significantly effect the melting behavior of the nylon or the binder (Technic) polymer phases. There were two distinct melting peaks in all of the samples evaluated between about 225° C. and about 265° C. These results were unexpected. It was anticipated that co-polymerization would have taken place resulting in a single polymer phase with one distinct melting point. The following data are averages of all of the samples evaluated, since there were no significant differences between the samples. Each sample was tested in duplicate. The values are in degrees C:

| TECHNIC PHASE | | NYLON-6 PHASE | SAMPLE |
| --- | --- | --- | --- |
| ONSET MELTING ° C. | TMELT ° C. | TMELT ° C. | PREPARATION |
| 180.9 | 188.6 | 216.1 | DRIED PRIOR TO TESTING 110° C.-16 HOURS |
| 176.6 | 187.9 | 215.4 | NONE-TESTED AS RECEIVED |

Testing the samples as received prevents the formation of a low temperature melting peak at about 132-149° C. However, drying the fiber samples before DSC testing did not materially effect the melting point of either the Technic or nylon phases. The onset of melting of the Technic phase was slightly lower when the samples were tested as received.

Figure 20:
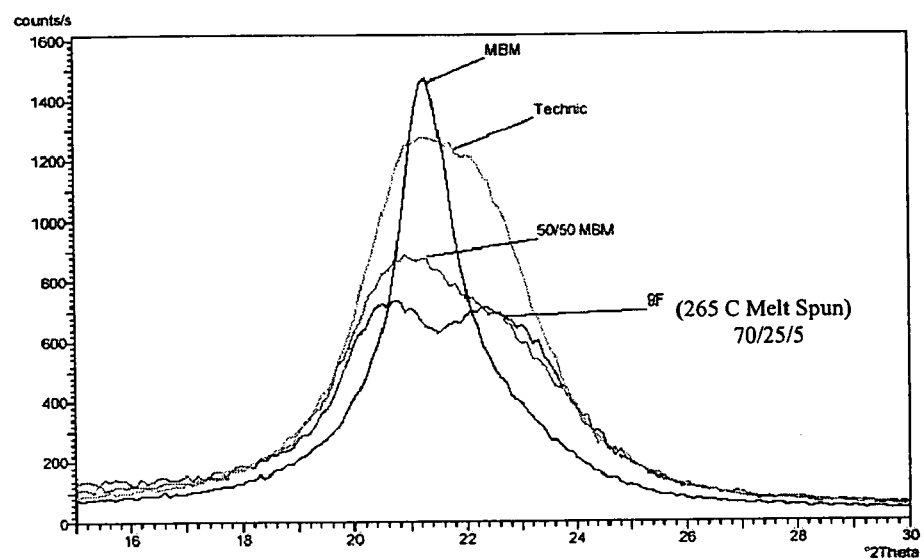
FIG. 20 shows XRD data collected for a contemplated embodiment of the subject matter herein.

The multiphase fibers appear to have less gamma (γ) crystalline structure as compared to the 100% Technic or 100% nylon-6 fibers. The XRD tests on sample 9F shows α1 and α2 crystalline peaks (see FIG. 20).

Example 6

Another Contemplated Pre-Fiber Composition Formation

Background

Example 5 investigated the effect of spinning melt temperature on the resultant fiber melting and physical properties. The composition was held constant at 70% Technic, 25% nylon-6 and 5% lactam. Increasing the spinning melt temperature did not significantly effect the melting behavior of the nylon or the binder (Technic) polymer phases. There were two distinct melting peaks in all of the samples evaluated between about 225° C. and about 265° C. These results were unexpected. This Example shows if the presence of additional lactam is responsible for achieving multiple phase fibers spun at temperatures significantly higher than the melt point of either base polymer. This Example will establish the role that lactam plays in the phase separation of the two polymers and what is the minimum lactam level required to achieve phase separation during melt spinning.

Experimental

The polymer blends were combined in a twin screw extruder and directly spun into fibers. The polymer melt temperature was varied between about 225° C. and about 265° C. The BCF host fiber is about 1100-1200 textured denier and is subsequently twisted to at least 5.75 tpi and Superba® textured prior to tufting.

The following compositions were evaluated and spun into 20 denier/6 filaments fiber bundles and are shown in Table 19 below:

| SAMPLE (MELT TEMP ° C.) | TECHNIC (%) | NYLON-6 (%) | LACTAM (%) |
| --- | --- | --- | --- |
| 1A (265) | 73.7 | 26.3 | 0 |
| 1B (255) | 73.7 | 26.3 | 0 |
| 1C (245) | 73.7 | 26.3 | 0 |
| 2 (255) | 71.47 | 25.53 | 3 |
| 3 (255) | 72.58 | 25.92 | 1.5 |
| 4 (265) | 73.13 | 26.12 | 0.75 |

The Technic/nylon-6 ratio was 2.8 for all of the above-referenced samples.

Observations

Figure 21:
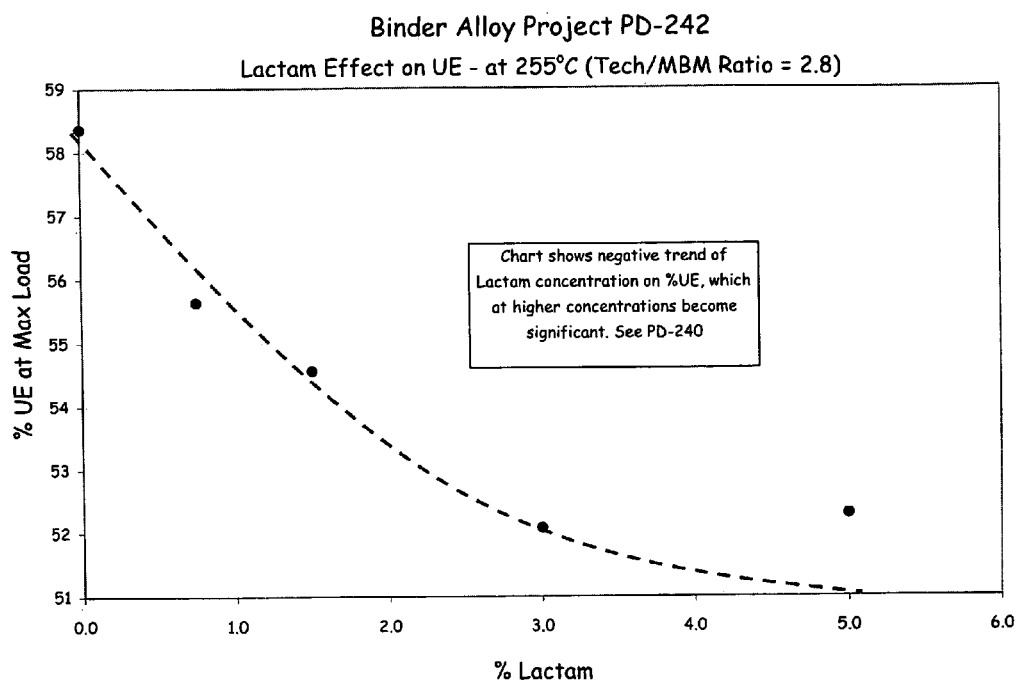
FIG. 21 shows data collected that relates to the % UE of a contemplated embodiment of the subject matter herein.
Figure 22:
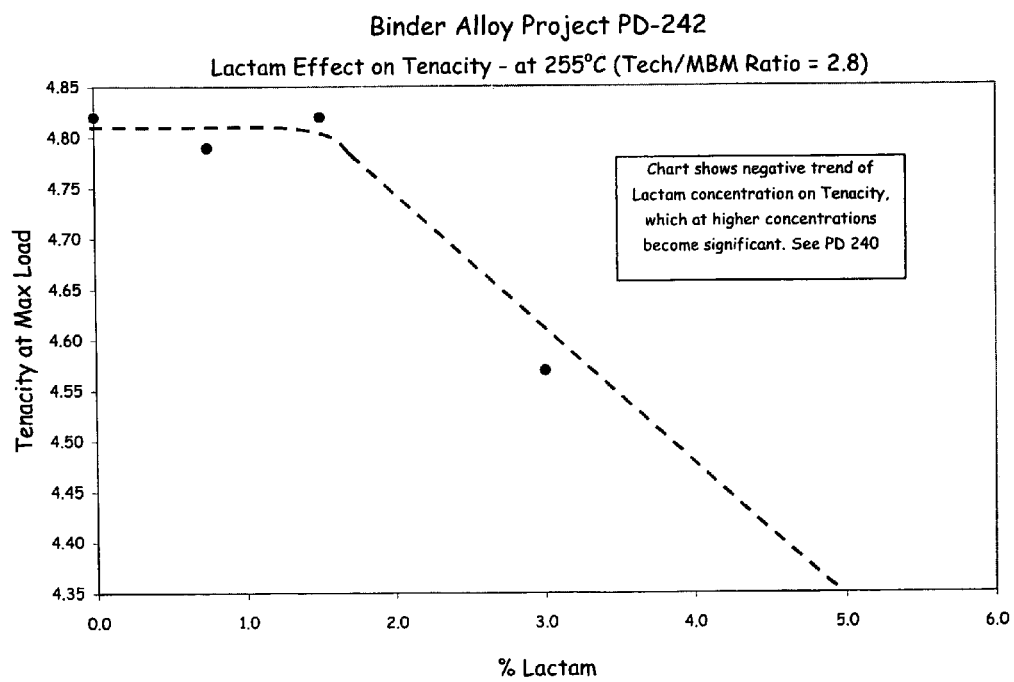
FIG. 22 shows data collected that relates to the % UE of a contemplated embodiment of the subject matter herein.
Figure 23:
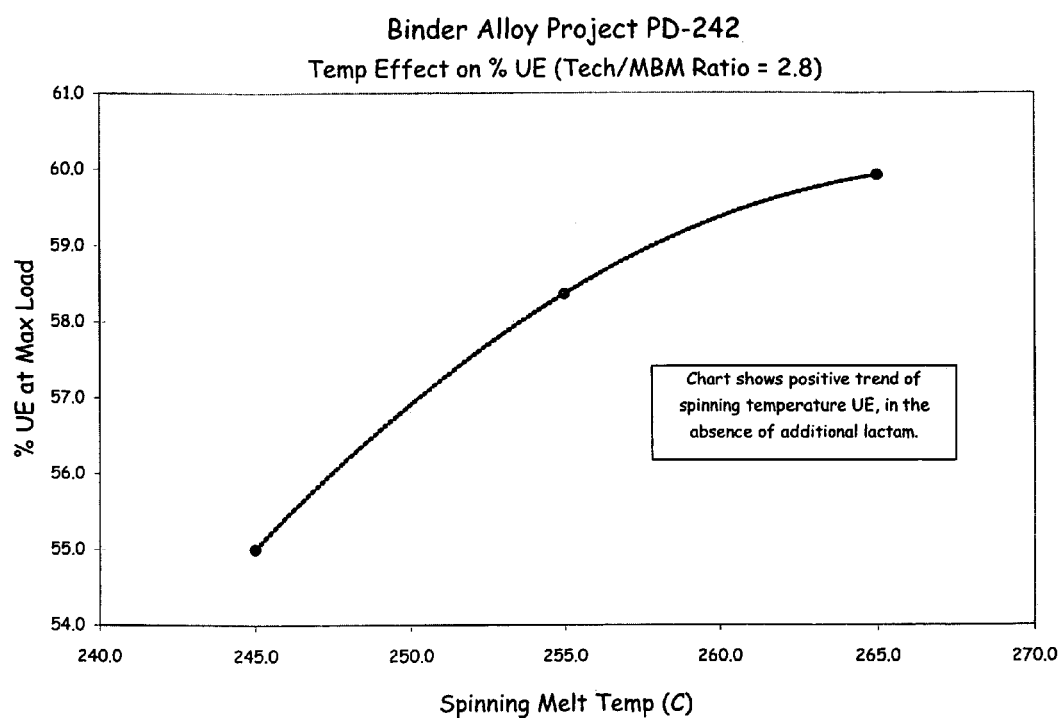
FIG. 23 shows data collected that relates to the % UE of a contemplated embodiment of the subject matter herein.

Increasing lactam concentration has a negative effect on fiber physical properties as previously observed in Example 4. Increasing the melt temperature from about 245° C. to about 265° C. increases the % UE of the resultant fibers slightly. (see FIGS. 21-23)

Fiber Melting Properties

Tables 20-21 show the experimental conditions for the Fiber Melting Tests, including showing each Sample ID (from Table 19 above). Table 22 shows the DSC results for each of these Sample IDs.

Removing excess lactam from the given compositional blend (Technic/nylon-6 ratio=2.8) did not materially effect the melting point of either base polymer phase. Two distinct melt points were observed in the samples without additional lactam at temperatures between about 245° C. and about 265° C.

Example 7

Another Contemplated Pre-Fiber Composition Formation

Background

Example 6 showed that removing excess lactam from the given compositional blend (Technic/nylon-6 ratio=2.8) did not materially effect the melting point of either base polymer phase within the lactam range evaluated. This Example looks at the compositional effects in the absence of additional lactam on the phase separation of the two base polymers as evidenced by two distinct melting points.

Experimental

The polymer blends were combined in a twin screw extruder and directly spun into fibers. The polymer melt temperature was held constant at about 255° C. The BCF host fiber is about 1100-1200 textured denier and is subsequently twisted to at least 5.75 tpi and Superba® textured prior to tufting.

The following compositions were evaluated and spun into 20 denier/6 filaments fiber bundles and are shown in Table 23 below:

| SAMPLE (TECHNIC/ NYLON RATIO) | TECHNIC (%) | NYLON-6 (%) | LACTAM (%) |
|---|---|---|---|
| 1 (2) | 66.67 | 33.33 | 0 |
| 2 (1.5) | 60 | 40 | 0 |
| 3 (1) | 50 | 50 | 0 |
| 4 (.5) | 33.33 | 66.67 | 3 |
| 5 (.75) | 42.86 | 57.14 | 1.5 |

Observations

Varying the Technic/Nylon ratio in the absence of additional lactam did not significantly effect the resultant fiber physical properties at spinning melt temperatures significantly higher than the melt point of either base polymer (255° C.). The physical properties were very good and similar for all of the samples evaluated.

Fiber Melting Properties

Tables 24-25 show the experimental conditions for the Fiber Melting Tests, including showing each Sample ID (from Table 23 above). Table 26 shows the DSC results for each of these Sample IDs.

Figure 24:
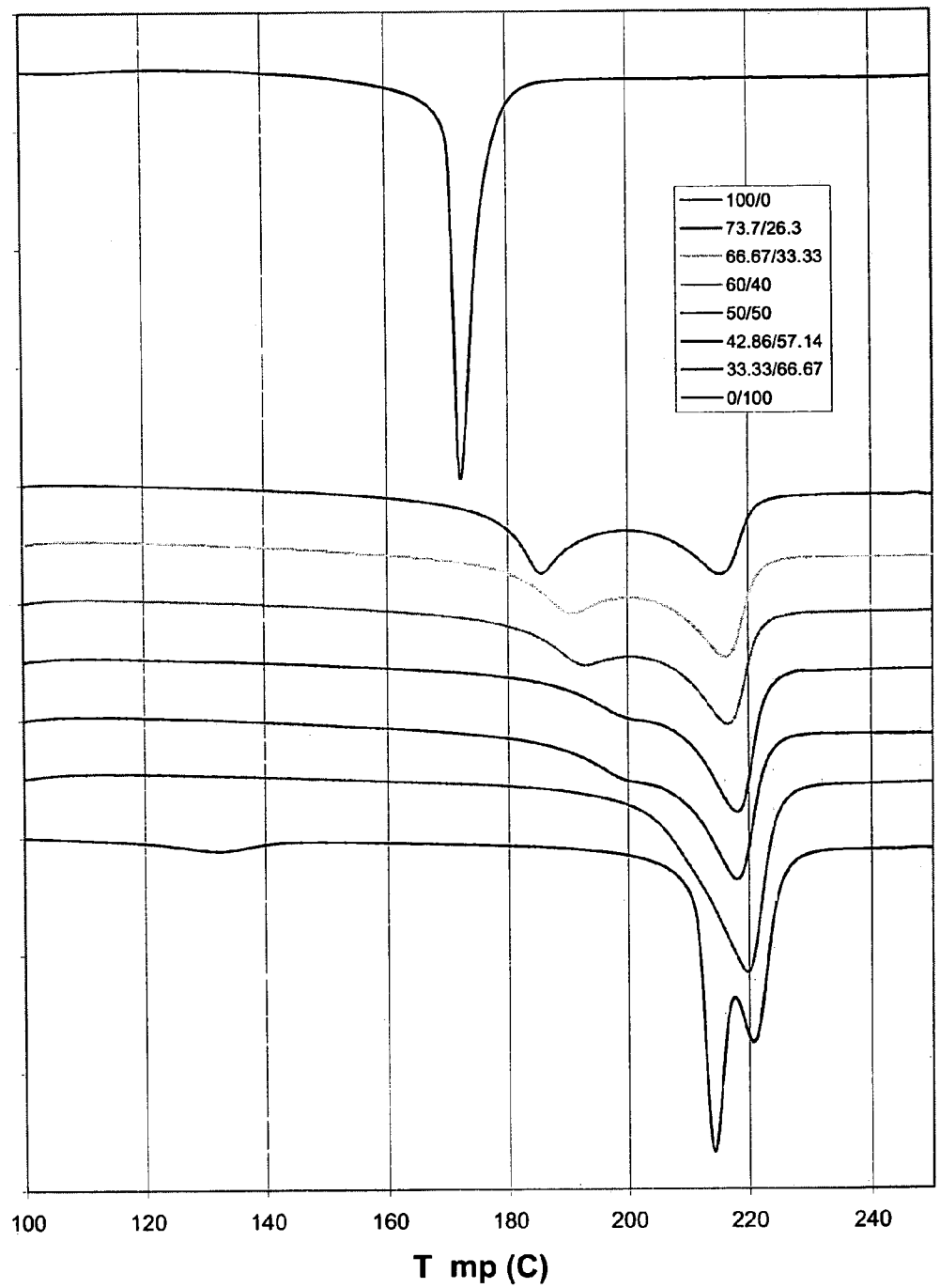
FIG. 24 shows data collected that relates to the melting point versus the Technic concentration in a contemplated embodiment of the subject matter herein.

Two distinct melting points are observed at Technic (nylon-6,6,6 co-polymer) concentrations between about 40 and 75%. In this conventional melt blending of two polyamide polymers, the melt point of the low melt co-polymer (nylon-6,6,6) increases as the amount of the higher melt point polymer (nylon-6) increases. This observation can be attributed to co-polymerization that takes place during melt processing. (see FIG. 24) The increase in melting point of the Technic phase varies linearly with Technic concentration in the absence of lactam.

When combining previous data collected with this Example, it is evident that the incorporation of additional lactam decreases the melt point of the Technic phase for a given Technic concentration. Solution or gel spinning of the high melt point polyamide with caprolactam in the presence of the low melt polyamide appears to maintain the melt temperature of the low melt polyamide by minimizing/preventing the co-polymerization during blending and processing.

The following regression equation was established using the current and previous compositions evaluated:

$$T_{melt}(\text{nylon-6,6,6}) = 159 + 0.190*(\% \text{ nylon-6,6,6}) + 0.575*(\% \text{ nylon-6}) - 2.35*(\% \text{ lactam}/\% \text{ nylon-6})$$

Note: This equation accounts for over 87% of the variation in the melting point of the nylon-6,6,6 phase in the blend.

Crystallinty

Figure 25:
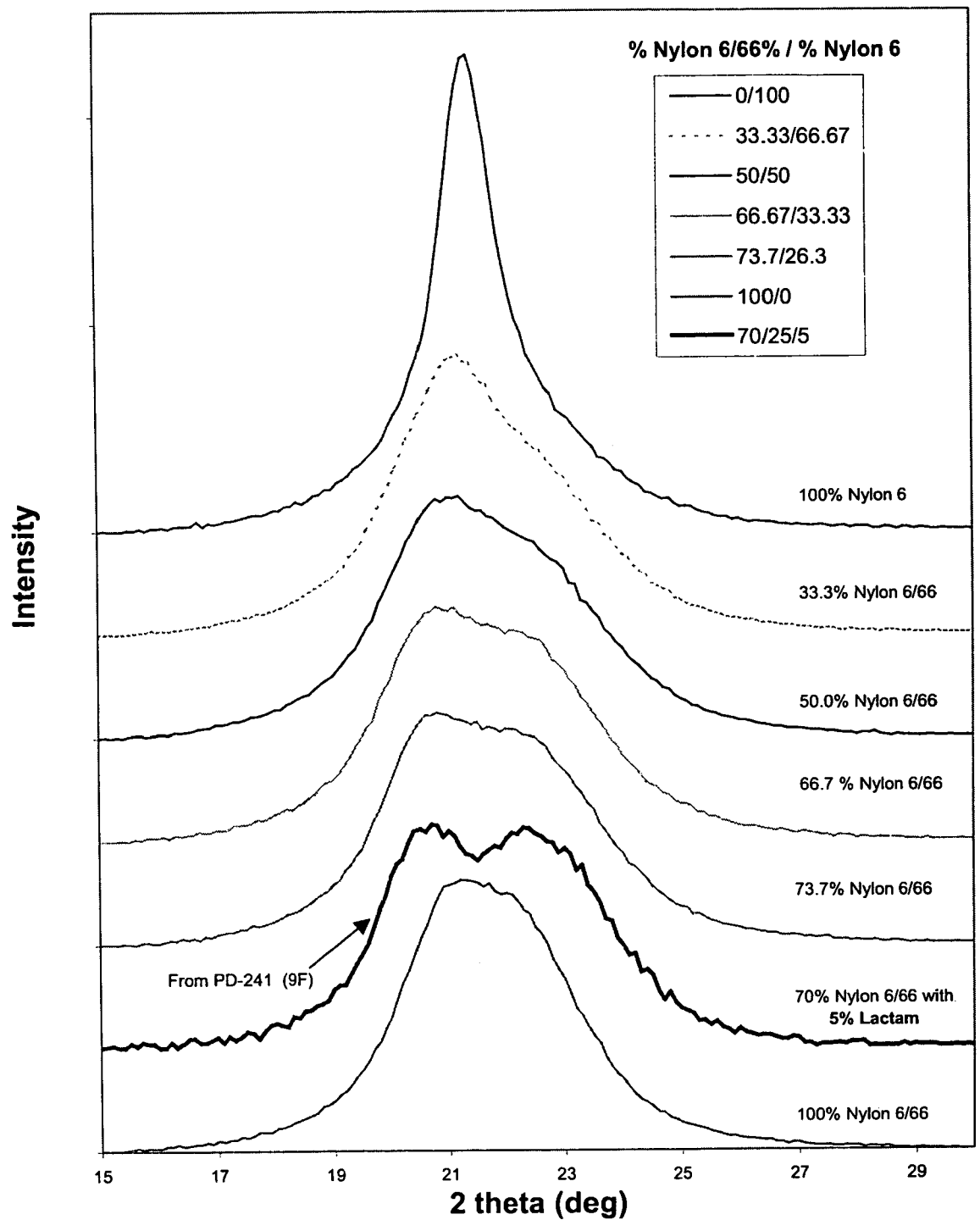
FIG. 25 shows XRD data collected for a contemplated embodiment of the subject matter herein.
Figure 26:
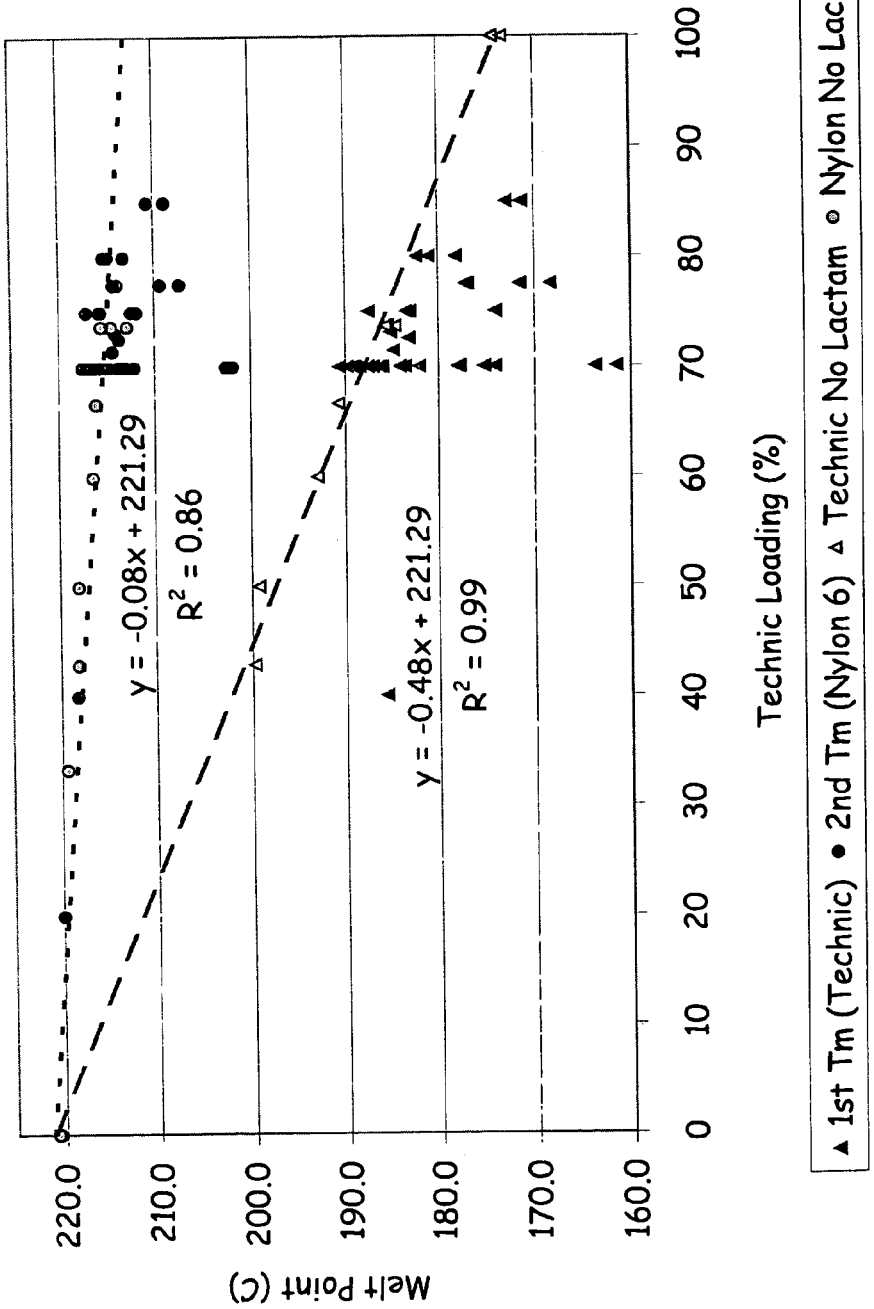
FIG. 26 shows XRD data collected for a contemplated embodiment of the subject matter herein.
Figure 27:
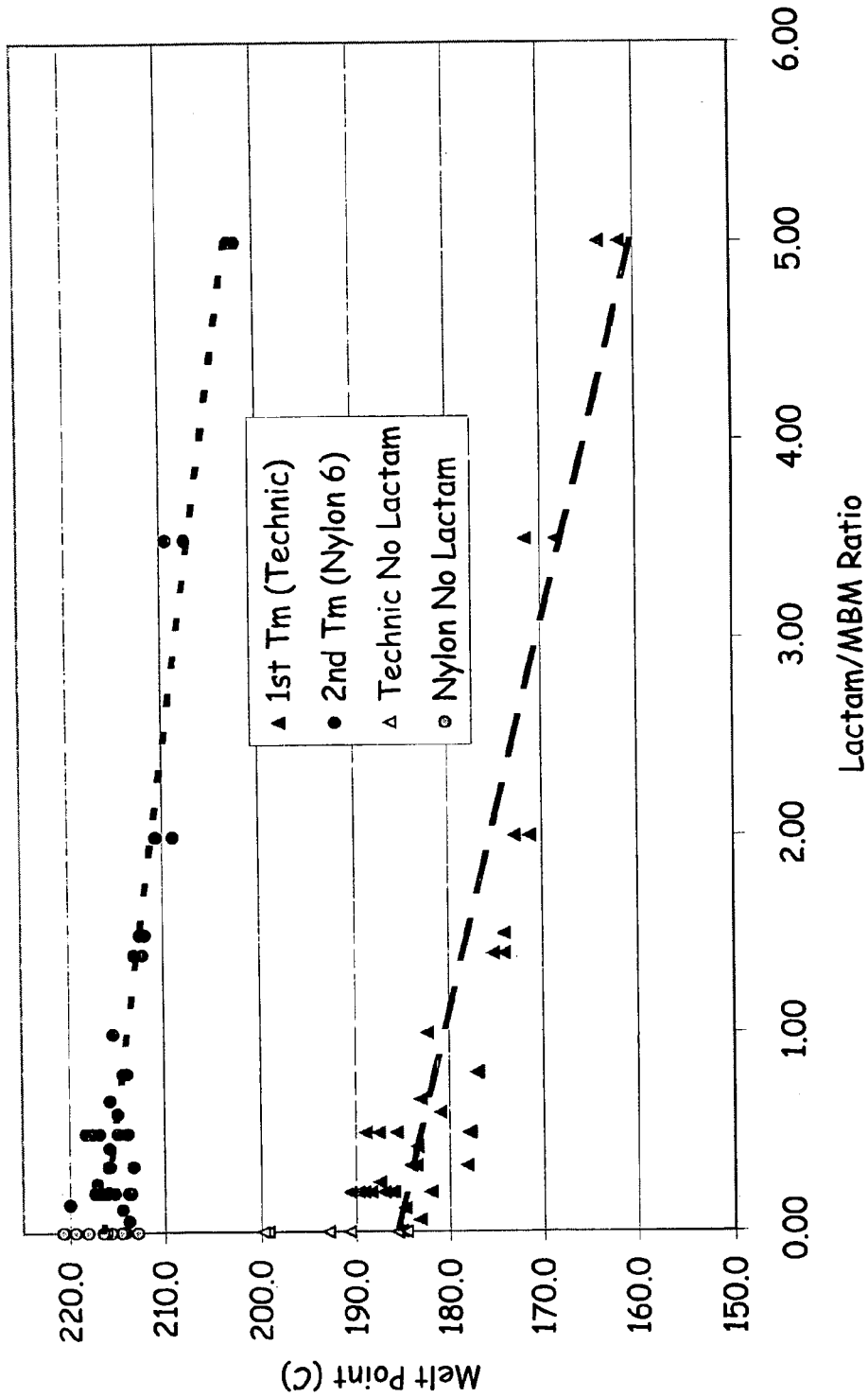
FIG. 27 shows XRD data collected for a contemplated embodiment of the subject matter herein.

The XRD analysis of selected samples shows the XRD patterns associated with the crystalline structure vary as a function of composition. More importantly, the addition of lactam to the mixture significantly changes the crystalline structure to more of an alpha structure (more stable) than the typical gamma crystalline form, which is common for this type of fiber and process. Sample 9F from Example 5 was included in the overlay graph for comparison. (See FIGS. 25-27).

Thus, specific embodiments and applications of multiphase pre-fiber and fiber compositions and materials, their manufacture and uses thereof have been disclosed. It should be apparent, however, to those skilled in the art that many more modifications besides those already described are possible without departing from the inventive concepts herein. The inventive subject matter, therefore, is not to be restricted except in the spirit of the disclosure. Moreover, in interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

TABLE 1

Nylon Gel Spinning:
RXT-2 UNIT
CHANGE NUMBERS WHERE IT IS BLUE COLOR

| | | | |
|---|---|---|---|
| MINIMUM PUMP RPM | 8 | | |
| MAXIMUM PUMP RPM | 40 | | |
| PUMP SIZE(CC/REV.) | 1.16 | | |
| NUMBER OF FILAMENTS | 14 | | |
| PUMP SPEED(RPM) | 19.7 | | |
| POLYMER DENSITY(GM/CC) | 0.98 | | |
| THRU-PUT(LBS/HR) | 2.95969 | | |
| THRU-PUT PER FIL(LBS/HR) | 0.21141 | THRU-PUT PER FIL(GMS/MIN) | 1.5982 |
| THRU-PUT(GMS/MIN) | 22.395 | THRU-PUT(GMS/MIN) | 22.395 |
| THRU-PUT PER FIL(GMS/MIN) | 1.59964 | | |
| TAKE-UP SPEED (Meter/min) | 3000 | FROM FT/MIN TO M/MIN | 0.3048 |
| DPF GMS @TAKE-UP ROLL (UNDRAWN) | 4.79892 | | |
| DTEX PER FIL GMS @TAKE-UP ROLL (UNDRAWN) | 5.33213 | | |
| FIL DIAMETER, MICRONS (UNDRAWN) | 22.1859 | | 22.186 |
| FIL DIAMETER, mm (UNDRAWN) | 0.02219 | | |
| TAKE-UP SPEED (FEET/min) | 9842.52 | | |

TABLE 1-continued

Nylon Gel Spinning:
RXT-2 UNIT
CHANGE NUMBERS WHERE IT IS BLUE COLOR

| Spinnerette | diameter | length | L/D | AREA |
|---|---|---|---|---|
| INCH | 0.03 | 0.09 | 3 | 0.0007065 |
| CM | 0.0762 | 0.2286 | 3 | 0.00455806 |
| YARN DENIER @TAKE-UP ROLL (GMS) | 67.1849 | | | |
| FLOW RATE(CC/MIN) | 22.852 | | | |
| JET VELOCITY (CM/MIN) | 5013.54 | | | |
| JET VELOCITY (meter/MIN) | 50.1354 | DR @ (TAKE-UP ROLL) | | 59.8379407 |
| SPIN. CAPILLARY RADIUS (FT) | 0.0025 | | | |
| SPIN. CAPILLARY LENGTH (FT) | 0.0075 | | | |
| THRU-PUT PER FIL(LBm/HR) | 0.21141 | | | |
| DENSITY(LBm/FT3) | 61.1814 | | | |
| FLOW RATE(FT3/SEC.) | 9.6E−07 | | | |
| VISCOSITY (POISE) | 3143.9 | | | |
| VISCOSITY (LBf.SEC/FT2) | 6.56634 | | | |
| DELTA PRESSURE(PSI) | 21.4101 | | | |
| Stack Draw (calc. From sprt hole dia. And fil dia.) | 34.3462 | | | |
| FINAL REQUIRE DENIER AFTER DRAWIN | 10 | | | |
| DRAWING DRAW RATIO | 0.47989 | | | |

TABLE 2

| | Starting Conditions | Sample I.D. #1 MBM | #2 MBM | #3 MBM 10% Lactam | #4 MBM 10% Lactam |
|---|---|---|---|---|---|
| Feeder Setting | 2.96 | 2.96 | 2.96 | 2.96 | 2.96 |
| water on feeding zone | on | on | on | on | on |
| zone 1 Temp. (deg C.) | 245 | 270 | 250 | 250 | 245 |
| zone 2 Temp. (deg C.) | 245 | 280 | 250 | 250 | 245 |
| zone 3 Temp. (deg C.) | 245 | 280 | 250 | 250 | 245 |
| zone 4 Temp. (deg C.) | 245 | 280 | 250 | 250 | 245 |
| zone 5 Temp. (deg C.) | 245 | 280 | 250 | 250 | 245 |
| zone 6 Temp. (deg C.) | 245 | 280 | 250 | 250 | 245 |
| zone 7 Temp. (deg C.) | 245 | 280 | 250 | 250 | 245 |
| 8 Connecting Plate Temp. (deg. C.) | 245 | 280 | 250 | 250 | 245 |
| 9 Block Temp. (deg. C.) | 245 | 280 | 250 | 250 | 245 |
| 10 Spin Pump Temp. (deg. C.) | 245 | 280 | 250 | 250 | 245 |
| 11 Top Cap (deg C.) | 245 | 280 | 250 | 250 | 245 |
| 12 Spin Pack Temp. (deg. C.) | 245 | 280 | 250 | 250 | 245 |
| Top Heated Sleeve Length (inches) | xxxx | xxxx | xxxx | xxxx | xxxx |
| Top Heated Sleeve Temp. (deg C.) | xxxx | xxxx | xxxx | xxxx | xxxx |
| Bottom Heated Sleeve Length (inches) | xxxx | xxxx | xxxx | xxxx | xxxx |
| Bottom Heated Sleeve Temp. (deg C.) | xxxx | xxxx | xxxx | xxxx | xxxx |
| Barrel Melt Temp. (deg C.) | 252 | 288 | 256 | 257 | 251 |
| Melt Pump Inlet Pressure (psi) | ???? | 420 | 10 | 200 | 10 |
| Melt Pump Outlet Pressure (psi) | ???? | 200 | 470 | 250 | 250 |
| Extruder (rpm) | 200 | 200 | 200 | 200 | 200 |
| Spinneret: no. of holes/Shape | 14 R | 14 R | 14 R | 14 R | 14 R |
| Spinneret: capillary diameter & depth | .024 × 0.072 | .024 × 0.072 | .024 × 0.072 | .024 × 0.072 | .024 × 0.072 |
| Metering pump size (cc/rev) | 1.16 | 1.16 | 1.16 | 1.16 | 1.16 |
| Metering pump (rpm) | 16.7 | 19.3 | 19.8 | 19.8 | 19.8 |
| Thruput (lbs/hr) | 2.97 | 2.97 | 2.97 | 2.97 | 2.97 |
| Filter type | STD SCREEN | STD SCREEN | STD SCREEN | STD SCREEN | STD SCREEN |
| Monomer Exhaust Reading (inches water) | TBD | TBD | TBD | TBD | TBD |
| Quench air Flow rate (CF/M) | 14.2 | 14.2 | 14.2 | 14.2 | 14.2 |
| Qench air Temp. (deg C.) | 19 | 19 | 19 | 19 | 19 |
| Quench air Humidity % | 40.8 | 40.8 | 40.8 | 40.8 | 40.8 |
| % Torque | 70 | 25 | 29 | 22 | 20 |
| Nitrogen in Hoper | 3 | 3 | 3 | 3 | 3 |
| Need: polymer chips moisture | Yes | | | | |
| Need: Free fall samples for FAV, COOH | Yes | Yes | Yes | Yes | Yes |

TABLE 2-continued

| | Sample I.D. | | | |
|---|---|---|---|---|
| | #5 | #6 | #7 | #8 |
| | POLYMER TYPE | | | |
| | MBM 10% Lactam | MBM 10% Lactam | MBM 10% Lactam | MBM 10% Lactam |
| Feeder Setting | 2.96 | 2.96 | 2.96 | 2.96 |
| water on feeding zone | on | on | on | on |
| zone 1 Temp. (deg C.) | 240 | 235 | 230 | 225 |
| zone 2 Temp. (deg C.) | 240 | 235 | 230 | 225 |
| zone 3 Temp. (deg C.) | 240 | 235 | 230 | 225 |
| zone 4 Temp. (deg C.) | 240 | 235 | 230 | 225 |
| zone 5 Temp. (deg C.) | 240 | 235 | 230 | 225 |
| zone 6 Temp. (deg C.) | 240 | 235 | 230 | 225 |
| zone 7 Temp. (deg C.) | 240 | 235 | 230 | 225 |
| 8 Connecting Plate Temp. (deg. C.) | 240 | 235 | 230 | 225 |
| 9 Block Temp. (deg. C.) | 240 | 235 | 230 | 225 |
| 10 Spin Pump Temp. (deg. C.) | 240 | 235 | 230 | 225 |
| 11 Top Cap (deg C.) | 240 | 235 | 230 | 225 |
| 12 Spin Pack Temp. (deg. C.) | 240 | 235 | 230 | 225 |
| Top Heated Sleeve Length (inches) | xxxx | xxxx | xxxx | xxxx |
| Top Heated Sleeve Temp. (deg C.) | xxxx | xxxx | xxxx | xxxx |
| Bottom Heated Sleeve Length (inches) | xxxx | xxxx | xxxx | xxxx |
| Bottom Heated Sleeve Temp. (deg C.) | xxxx | xxxx | xxxx | xxxx |
| Barrel Melt Temp. (deg C.) | 248 | 240 | 235 | 231 |
| Melt Pump Inlet Pressure (psi) | 10 | 10 | 10 | 10 |
| Melt Pump Outlet Pressure (psi) | 310 | 260 | 360 | 400 |
| Extruder (rpm) | 200 | 200 | 200 | 200 |
| Spinneret: no. of holes/Shape | 14 R | 14 R | 14 R | 14 R |
| Spinneret: capilary diameter & depth | .024 × 0.072 | .024 × 0.072 | .024 × 0.072 | .024 × 0.072 |
| Metering pump size (cc/rev) | 1.16 | 1.16 | 1.16 | 1.16 |
| Metering pump (rpm) | 19.8 | 19.7 | 19.7 | 19.7 |
| Thruput (lbs/hr) | 2.97 | 2.97 | 2.97 | 2.97 |
| Filter type | STD SCREEN | STD SCREEN | STD SCREEN | STD SCREEN |
| Monomer Exhaust Reading (inches water) | TBD | | | |
| Quench air Flow rate (CF/M) | 14.2 | 15.5 | 15.9 | 14.9 |
| Qench air Temp. (deg C.) | 19 | 19.3 | 19.6 | 19.7 |
| Quench air Humidity % | 40.8 | 39.8 | 39.5 | 39 |
| % Torque | 21 | 20 | 24 | 24 |
| Nitrogen in Hoper | 3 | 3 | 3 | 3 |
| Need: polymer chips moisture | | | yes | |
| Need: Free fall samples for FAV, COOH | Yes | Yes | | |

TABLE 3

| | Sample I.D. | | | | |
|---|---|---|---|---|---|
| | #9 | #10 | #11 | #12 | #13 |
| | POLYMER TYPE | | | | |
| | BHS | BHS 10% Lactam | BHS 10% Lactam | BHS 10% Lactam | BHS 10% Lactam |
| Feeder Setting | 2.96 | 2.96 | 2.96 | 2.96 | 2.96 |
| water on feeding zone | on | on | on | on | on |
| zone 1 Temp. (deg C.) | 252 | 252 | 247 | 242 | 237 |
| zone 2 Temp. (deg C.) | 252 | 252 | 247 | 242 | 237 |
| zone 3 Temp. (deg C.) | 252 | 252 | 247 | 242 | 237 |
| zone 4 Temp. (deg C.) | 252 | 252 | 247 | 242 | 237 |
| zone 5 Temp. (deg C.) | 252 | 252 | 247 | 242 | 237 |
| zone 6 Temp. (deg C.) | 252 | 282 | 247 | 242 | 237 |
| zone 7 Temp. (deg C.) | 252 | 252 | 247 | 242 | 237 |
| 8 Connecting Plate Temp. (deg C.) | 232 | 252 | 247 | 242 | 237 |
| 9 Block Temp. (deg. C.) | 252 | 252 | 247 | 242 | 237 |
| 10 Spin Pump Temp. (deg. C.) | 252 | 252 | 247 | 242 | 237 |
| 11 Top Cap (deg. C.) | 252 | 252 | 247 | 242 | 237 |
| 12 Spin Pack Temp. (deg. C.) | 252 | 252 | 247 | 242 | 237 |
| Top Heated Sleeve Length (inches) | xxxx | xxxx | xxxx | xxxx | xxxx |
| Top Heated Sleeve Temp. (deg C.) | xxxx | xxxx | xxxx | xxxx | xxxx |
| Bottom Heated Sleeve Length (inches) | xxxx | xxxx | xxxx | xxxx | xxxx |
| Bottom Heated Sleeve Temp. (deg C.) | xxxx | xxxx | xxxx | xxxx | xxxx |
| Barrel Melt Temp. (deg C.) | 259 | 260 | 254 | 249 | 245 |
| Melt Pump Inlet Pressure (psi) | 40 | 90 | 250 | 280 | 180 |
| Melt Pump Outlet Pressure (psi) | 970 | 520 | 570 | 610 | 740 |

TABLE 3-continued

|  | | | | | |
|---|---|---|---|---|---|
| Extruder (rpm) | 200 | 200 | 200 | 200 | 200 |
| Spinneret: no. of holes/Shape | 14 R | 14 R | 14 R | 14 R | 14 R |
| Spinneret: capilary diameter & depth | .024 × 0.072 | .024 × 0.072 | .024 × 0.072 | .024 × 0.072 | .024 × 0.072 |
| Metering pump size (cc/rev) | 1.16 | 1.16 | 1.16 | 1.16 | 1.16 |
| Metering pump (rpm) | 19.7 | 19.7 | 19.7 | 19.7 | 19.7 |
| Thruput (lbs/hr) | 2.97 | 2.97 | 2.97 | 2.97 | 2.97 |
| Filter type | STD SCREEN | STD SCREEN | STD SCREEN | STD SCREEN | STD SCREEN |
| Monomer Exhaust Reading (inches water) | TBD | TBD | TBD | TBD | TBD |
| Quench air Flow rate (CF/M) | 14.6 | 14.5 | 14.6 | 14.9 | 15 |
| Qench air Temp. (deg C.) | 19.5 | 18.9 | 19.2 | 19.2 | 18.7 |
| Quench air Humidity % | 38.7 | 39.3 | 39.7 | 41.6 | 39.7 |
| % Torque | 42 | 27 | 29 | 30 | 29 |
| Nitrogen in Hoper | 3 | 3 | 3 | 3 | 3 |
| Need: polymer chips moisture | | | | | |
| Need: Free fall samples for FAV, COOH | | | | | |

|  | Sample I.D. | | | |
|---|---|---|---|---|
|  | #14 | #15 | #16 | #17 |
|  | POLYMER TYPE | | | |
|  | BHS 10% Lactam | BHS 10% Lactam | 135 | 135 10% Lactam |
| Feeder Setting | 2.96 | 2.96 | 2.96 | 2.96 |
| water on feeding zone | on | on | on | on |
| zone 1 Temp. (deg C.) | 232 | 227 | 260 | 260 |
| zone 2 Temp. (deg C.) | 232 | 227 | 260 | 260 |
| zone 3 Temp. (deg C.) | 232 | 227 | 260 | 60 |
| zone 4 Temp. (deg C.) | 232 | 227 | 260 | 260 |
| zone 5 Temp. (deg C.) | 232 | 227 | 260 | 260 |
| zone 6 Temp. (deg C.) | 232 | 227 | 260 | 260 |
| zone 7 Temp. (deg C.) | 232 | 227 | 260 | 260 |
| 8 Connecting Plate Temp. (deg. C.) | 232 | 227 | 260 | 260 |
| 9 Block Temp. (deg. C.) | 232 | 227 | 260 | 260 |
| 10 Spin Pump Temp. (deg. C.) | 232 | 227 | 260 | 260 |
| 11 Top Cap (deg. C.) | 232 | 227 | 260 | 260 |
| 12 Spin Pack Temp. (deg. C.) | 232 | 227 | 260 | 260 |
| Top Heated Sleeve Length (inches) | xxxx | xxxx | xxxx | xxxx |
| Top Heated Sleeve Temp. (deg C.) | xxxx | xxxx | xxxx | xxxx |
| Bottom Heated Sleeve Length (inches) | xxxx | xxxx | xxxx | xxxx |
| Bottom Heated Sleeve Temp. (deg C.) | xxxx | xxxx | xxxx | xxxx |
| Barrel Melt Temp. (deg. C.) | 240 | 235 | 270 | 269 |
| Melt Pump Inlet Pressure (psi) | 50 | 70 | 1200 | 300 |
| Melt Pump Outlet Pressure (psi) | 790 | 840 | 1600 | 1040 |
| Extruder (rpm) | 200 | 200 | 200 | 200 |
| Spinneret: no. of holes/Shape | 14 R | 14 R | 14 R | 14 R |
| Spinneret: capilary diameter & depth | .024 × 0.072 | .024 × 0.072 | .024 × 0.072 | .024 × 0.072 |
| Metering pump size (cc/rev) | 1.16 | 1.16 | 1.16 | 1.16 |
| Metering pump (rpm) | 19.7 | 19.7 | 19.7 | 19.7 |
| Thruput (lbs/hr) | 2.97 | 2.97 | 2.97 | 2.97 |
| Filter type | STD SCREEN | STD SCREEN | STD SCREEN | STD SCREEN |
| Monomer Exhaust Reading (inches water) | TBD | | | |
| Quench air Flow rate (CF/M) | 14.6 | 14.9 | 14.5 | 15.1 |
| Qench air Temp. (deg C.) | 19 | 19.4 | 18.5 | 19.2 |
| Quench air Humidity % | 40.3 | 39.4 | 39.6 | 41.1 |
| % Torque | 30 | 29 | 56 | 37 |
| Nitrogen in Hoper | 3 | 3 | 3 | 3 |
| Need: polymer chips moisture | | | | |
| Need: Free fall samples for FAV, COOH | | | | |

TABLE 4

|  | Sample I.D. | | | | |
|---|---|---|---|---|---|
|  | #18 | #19 | #20 | #21 | #22 |
|  | POLYMER TYPE | | | | |
|  | 135 10% Lactam | 135 10% Lactam | 135 10% Lactam | 135 10% Lactam | 135 10% Lactam |
| Feeder Setting | 2.96 | 2.96 | 2.96 | 2.96 | 2.96 |
| water on feeding zone | on | on | on | on | on |
| zone 1 Temp. (deg C.) | 255 | 250 | 245 | 240 | 235 |
| zone 2 Temp. (deg C.) | 255 | 250 | 245 | 240 | 235 |
| zone 3 Temp. (deg C.) | 255 | 250 | 245 | 240 | 235 |

TABLE 4-continued

| | | | | | |
|---|---|---|---|---|---|
| zone 4 Temp. (deg C.) | 255 | 250 | 245 | 240 | 235 |
| zone 5 Temp. (deg C.) | 255 | 250 | 245 | 240 | 235 |
| zone 6 Temp. (deg C.) | 255 | 250 | 245 | 240 | 235 |
| zone 7 Temp. (deg C.) | 255 | 250 | 245 | 240 | 235 |
| 8 Connecting Plate Temp. (deg. C.) | 255 | 250 | 245 | 240 | 235 |
| 9 Block Temp. (deg. C.) | 255 | 250 | 245 | 240 | 235 |
| 10 Spin Pump Temp. (deg. C.) | 255 | 250 | 245 | 240 | 235 |
| 11 Top Cap (deg. C.) | 255 | 250 | 245 | 240 | 235 |
| 12 Spin Pack Temp. (deg. C.) | 255 | 250 | 245 | 240 | 235 |
| Top Heated Sleeve Length (inches) | xxxx | xxxx | xxxx | xxxx | xxxx |
| Top Heated Sleeve Temp. (deg C.) | xxxx | xxxx | xxxx | xxxx | xxxx |
| Bottom Heated Sleeve Length (inches) | xxxx | xxxx | xxxx | xxxx | xxxx |
| Bottom Heated Sleeve Temp. (deg C.) | xxxx | xxxx | xxxx | xxxx | xxxx |
| Barrel Melt Temp. (deg C.) | 264 | 259 | 253 | 248 | 243 |
| Melt Pump Inlet Pressure (psi) | 630 | 470 | 450 | 630 | 600 |
| Melt Pump Outlet Pressure (psi) | 1080 | 1140 | 1280 | 1280 | 1330 |
| Extruder (rpm) | 200 | 200 | 200 | 200 | 200 |
| Spinneret: no. of holes/Shape | 14 R | 14 R | 14 R | 14 R | 14 R |
| Spinneret: capilary diameter & depth | .024 × 0.072 | .024 × 0.072 | .024 × 0.072 | .024 × 0.072 | .024 × 0.072 |
| Metering pump size (cc/rev) | 1.16 | 1.16 | 1.16 | 1.16 | 1.16 |
| Metering pump (rpm) | 19.7 | 19.7 | 19.7 | 19.7 | 19.7 |
| Thruput (lbs/hr) | 2.97 | 2.97 | 2.97 | 2.97 | 2.97 |
| Filter type | STD SCREEN | STD SCREEN | STD SCREEN | STD SCREEN | STD SCREEN |
| Monomer Exhaust Reading (inches water) | TBD | TBD | TBD | TBD | TBD |
| Quench air Flow rate (CF/M) | 15.2 | 14.9 | 14.5 | 14.4 | 14.9 |
| Qench air Temp. (deg C.) | 20.1 | 19.5 | 18.7 | 19 | 18.9 |
| Quench air Humidity % | 39.4 | 40.7 | 39.7 | 40.1 | 41.3 |
| % Torque | 39 | 38 | 40 | 37 | 39 |
| Nitrogen in Hoper | 3 | 3 | 3 | 3 | 3 |
| Need: polymer chips moisture | | | | | |
| Need: Free fall sample for FAV, COOH | | | | | |

| | Sample I.D. | | | |
|---|---|---|---|---|
| | #23 | #24 | #25 | #26 |
| | POLYMER TYPE | | | |
| | 135 10% Lactam | 135 10% Lactam | 195 | 195 10% Lactam |
| Feeder Setting | 2.96 | 2.96 | 2.96 | 2.96 |
| water on feeding zone | on | on | on | on |
| zone 1 Temp. (deg C.) | 230 | 225 | 300/289 | 290/273 |
| zone 2 Temp. (deg C.) | 230 | 225 | 300 | 290 |
| zone 3 Temp. (deg C.) | 230 | 225 | 300 | 290 |
| zone 4 Temp. (deg C.) | 230 | 225 | 300 | 290 |
| zone 5 Temp. (deg C.) | 230 | 225 | 300 | 290 |
| zone 6 Temp. (deg C.) | 230 | 225 | 300 | 290 |
| zone 7 Temp. (deg C.) | 230 | 225 | 300 | 290 |
| 8 Connecting Plate Temp. (deg. C.) | 230 | 225 | 300 | 290 |
| 9 Block Temp. (deg. C.) | 230 | 225 | 300 | 290 |
| 10 Spin Pump Temp. (deg. C.) | 230 | 225 | 300 | 290 |
| 11 Top Cap (deg. C.) | 230 | 225 | 300 | 290 |
| 12 Spin Pack Temp. (deg. C.) | 230 | 225 | 300/300 | 290 |
| Top Heated Sleeve Length (inches) | xxxx | xxxx | xxxx | xxxx |
| Top Heated Sleeve Temp. (deg C.) | xxxx | xxxx | xxxx | xxxx |
| Bottom Heated Sleeve Length (inches) | xxxx | xxxx | xxxx | xxxx |
| Bottom Heated Sleeve Temp. (deg C.) | xxxx | xxxx | xxxx | xxxx |
| Barrel Melt Temp. (deg C.) | 238 | 232 | 312 | 299 |
| Melt Pump Inlet Pressure (psi) | 580 | 190 | 1480 | 1080 |
| Melt Pump Outlet Pressure (psi) | 1480 | 1700 | 1290 | 790 |
| Extruder (rpm) | 200 | 200 | 200 | 200 |
| Spinneret: no. of holes/Shape | 14 R | 14 R | 14 R | 14 R |
| Spinneret: capilary diameter & depth | .024 × 0.072 | .024 × 0.072 | .024 × 0.072 | .024 × 0.072 |
| Metering pump size (cc/rev) | 1.16 | 1.16 | 1.16 | 1.16 |
| Metering pump (rpm) | 19.7 | 19.7 | 19.7 | 19.7 |
| Thruput (lbs/hr) | 2.97 | 2.97 | 2.97 | 2.97 |
| Filter type | STD SCREEN | STD SCREEN | STD SCREEN | STD SCREEN |
| Monomer Exhaust Reading (inches water) | TBD | | | |
| Quench air Flow rate (CF/M) | 14 | 14.2 | 14.6 | 14.8 |
| Qench air Temp. (deg C.) | 19.1 | 18.7 | 18.9 | 19.5 |
| Quench air Humidity % | 38.7 | 39.1 | 96.8 | 39.1 |
| % Torque | 40 | 42 | 52 | 38 |
| Nitrogen in Hoper | 3 | 3 | 3 | 3 |
| Need: polymer chips moisture | | | | |
| Need: Free fall sample for FAV, COOH | | | | |

TABLE 5

| | Sample I.D. | | | |
|---|---|---|---|---|
| | #27 | #28 | #29 | #30 |
| | POLYMER TYPE | | | |
| | 195 10% Lactam | 195 10% Lactam | 195 10% Lactam | 195 10% Lactam |
| Feeder Setting | 2.96 | 2.95 | 2.95 | 2.96 |
| water on feeding zone | on | on | on | on |
| zone 1 Temp. (deg C.) | 285/270 | 280/266 | 275/263 | 270/258 |
| zone 2 Temp. (deg C.) | 285 | 280 | 275 | 270 |
| zone 3 Temp. (deg C.) | 285 | 280 | 275 | 270 |
| zone 4 Temp. (deg C.) | 285 | 280 | 275 | 270 |
| zone 5 Temp. (deg C.) | 285 | 280 | 275 | 270 |
| zone 6 Temp. (deg C.) | 285 | 280 | 275 | 270 |
| zone 7 Temp. (deg C.) | 285 | 280 | 275 | 270 |
| 8 Connecting Plate Temp. (deg. C.) | 285 | 280 | 275 | 270 |
| 9 Block Temp. (deg. C.) | 285 | 280 | 275 | 270 |
| 10 Spin Pump Temp. deg. C. | 285 | 280 | 275 | 270 |
| 11 Top Cap (deg. C.) | 285 | 280 | 275 | 270 |
| 12 Spin Pack Temp. (deg. C.) | 285 | 280 | 275 | 270 |
| Top Heated Sleeve Length (Inches) | xxxx | xxxx | xxxx | xxxx |
| Top Heated Sleeve Temp. (deg. C.) | xxxx | xxxx | xxxx | xxxx |
| Bottom Heated Sleeve Length (Inches) | xxxx | xxxx | xxxx | xxxx |
| Bottom Heated Sleeve Temp. (deg. C.) | xxxx | xxxx | xxxx | xxxx |
| Barrel Melt Temp. (deg. C.) | 296 | 289 | 284 | 279 |
| Melt Pump Inlet Pressure (psi) | 1250 | 50 | 860 | 1060 |
| Melt Pump Outlet Pressure (psi) | 860 | 890 | 970 | 1100 |
| Extruder (rpm) | 200 | 200 | 200 | 200 |
| Spinneret: no. of holes/Shape | 14 R | 14 R | 14 R | 14 R |
| Spinneret: capilary diameter & depth | .024 × 0.072 | .024 × 0.072 | .024 × 0.072 | .024 × 0.072 |
| Metering pump size (cc/rev) | 1.16 | 1.16 | 1.16 | 1.16 |
| Metering pump (rpm) | 19.7 | 19.7 | 19.7 | 19.7 |
| Thruput (lbs/hr) | 2.97 | 2.97 | 2.97 | 2.97 |
| Filter type | STD SCREEN | STD SCREEN | STD SCREEN | STD SCREEN |
| Monomer Exhaust Reading (inches water) | open | open | open | open |
| Quench air Flow rate (CF/M) | 14.7 | 14.7 | 14.2 | 13.9 |
| Qench air Temp. (deg. C.) | 19.2 | 19.7 | 20 | 18.7 |
| Quench air Humidity % | 46.1 | 41.5 | 43.1 | 39.4 |
| % Torque | 41 | 28 | 37 | 41 |
| Nitrogen In Hoper | 3 | 3 | 3 | 3 |

TABLE 8

| | Sample I.D. | | | | |
|---|---|---|---|---|---|
| | 1-25 | 1-50 | 2-25 | 2-50 | 3-25 |
| | POLYMER TYPE | | | | |
| | 20% MBM 70% Technic + 10% Lactam | 20% MBM 70% Technic + 10% Lactam | 5% MBM 85% Technic + 10% Lactam | 5% MBM 85% Technic + 10% Lactam | 5% MBM 70% Technic + 25% Lactam |
| | Polymer Type/Blend ID: | | | | |
| | Blend 1 | Blend 1 | Blend 2 | Blend 2 | Blend 3 |
| SAMPLE START TIME | | | | | |
| SAMPLE FINISH TIME | 45 | 45 | 45 | 45 | 45 |
| Run time (min) | | | | | |
| Finish type | F-137 | F-137 | F-137 | F-137 | F-137 |
| Kiss roll (rpm) | 3 | 3.5 | 3 | 3.5 | 3 |
| WPU % | 5.16 | 3.28 | 5.16 | 3.28 | 5.16 |
| Roll # 1 Speed (m/min.) RXT-2 | 3680 | 3680 | 3680 | 3680 | 3680 |
| LARGE Roll # 4 SPEED (m/min.) RXT-1 | 3680 | 3680 | 3680 | 3680 | 3680 |
| Entangling | | | | | |
| jet type | | | | | |
| air to jet (psi) | | | | | |
| Winder grove roll: Speed (m/min.) | 4453 | 4372 | 4210 | 4291 | 4331 |
| Winder drive roll: Speed (m/min.) | 4048 | 4048 | 4048 | 4048 | 4048 |
| Undrawn Denier | 25 | 50 | 25 | 50 | 25 |
| Feeder Setting | 1.5 | 3 | 1.5 | 3 | 1.5 |
| water on feeding zone | on | on | on | on | on |
| zone 1 Temp. (deg C.) | 215 | 215 | 215 | 215 | 215 |
| zone 2 Temp. (deg C.) | 215 | 215 | 215 | 215 | 215 |
| zone 3 Temp. (deg C.) | 215 | 215 | 215 | 215 | 215 |
| zone 4 Temp. (deg C.) | 215 | 215 | 215 | 215 | 215 |

TABLE 8-continued

| | | | | | |
|---|---|---|---|---|---|
| zone 5 Temp. (deg C.) | 215 | 215 | 215 | 215 | 215 |
| zone 6 Temp. (deg C.) | 210 | 210 | 210 | 210 | 210 |
| zone 7 Temp. (deg C.) | 210 | 210 | 210 | 210 | 210 |
| Connecting Plate Temp. (deg. C.) | 213 | 213 | 213 | 213 | 213 |
| Block Temp. (deg. C.) | 213 | 213 | 213 | 213 | 213 |
| Spin Pump Temp. (deg. C.) | 215 | 215 | 215 | 215 | 215 |
| Top Cap (deg. C.) | 215 | 215 | 215 | 215 | 215 |
| Spin Pack Temp. (deg. C.) | 216 | 216 | 216 | 216 | 216 |
| Barrel Melt Temp. (deg C.) | 217 | 218 | 218 | 218 | 217 |
| Melt Pump Inlet Pressure (psi) | 430 | 1490 | 350 | 480 | 700 |
| Melt Pump Outlet Pressure (psi) | 190 | 490 | 190 | 440 | 0 |
| Extruder (rpm) | 220 | 220 | 220 | 220 | 220 |
| Monomer Exhaust inches water | | | | | |
| Spinneret: no. of holes/Shape | 12 R | 12 R | 12 R | 12 R | 12 R |
| Spinneret: capilary diameter & depth | 0.0177 × 0.061 | 0.0177 × 0.061 | 0.0177 × 0.061 | 0.0177 × 0.061 | 0.0177 × 0.061 |
| Metering pump size (cc/rev) | 1.16 | 1.16 | 1.16 | 1.16 | 1.16 |
| Metering pump (rpm) | 9.5 | 18 | 9.5 | 18 | 9.5 |
| Thruput (lbs/hr) | 1.5 | 3 | 1.5 | 3 | 1.5 |
| Filter type | STD SCREEN | STD SCREEN | STD SCREEN | STD SCREEN | STD SCREEN |
| Quench air Flow rate (CF/M) | 7.1 | 7.6 | 6.8 | 7.3 | 7.2 |
| Qench air Temp. (deg C.) | 19.6 | 19.8 | 18.5 | 20.3 | 19.1 |
| Quench air Humidity % | 41.2 | 40.1 | 42.7 | 43.1 | 41.6 |
| % Torque | 18 | 33 | 17 | 27 | 13 |
| Nitrogen in Hopper | 3 | 3 | 3 | 3 | 3 |
| Estimated lbs of Host + Binder Fiber (lb) | 8.4 | 0 | 0 | 4 | 0.5 |

| | Sample I.D. | | | | |
|---|---|---|---|---|---|
| | 3-50 | 4-25 | 4-50 | 5-25 | 5-50 |
| | POLYMER TYPE | | | | |
| | 5% MBM 70% Technic + 25% Lactam | 10% MBM 75% Technic + 15% Lactam | 10% MBM 75% Technic + 15% Lactam | 12.5% MBM 70% Technic + 17.5% Lactam | 12.5% MBM 70% Technic + 17.5% Lactam |
| | Polymer Type/Blend ID: | | | | |
| | Blend 3 | Blend 4 | Blend 4 | Blend 5 | Blend 5 |
| SAMPLE START TIME | | | | | |
| SAMPLE FINISH TIME | | | | | |
| Run time (min) | 45 | 45 | 45 | 45 | 45 |
| Finish type | F-137 | F-137 | F-137 | F-137 | F-137 |
| Kiss roll (rpm) | 3.5 | 3 | 3.5 | 3 | 3.5 |
| WPU % | 3.28 | 5.16 | 3.28 | 5.16 | 3.28 |
| Roll # 1 Speed (m/min.) RXT-2 | 3680 | 3680 | 3680 | 3680 | 3901 |
| LARGE Roll # 4 SPEED (m/min.) RXT-1 | 3680 | 3680 | 3680 | 3680 | 3901 |
| Entangling | | | | | |
| jet type | | | | | |
| air to jet (psi) | | | | | |
| Winder grove roll: Speed (m/min.) | 4331 | 4291 | 4331 | 4331 | 4291 |
| Winder drive roll: Speed (m/min.) | 4048 | 4048 | 4048 | 4048 | 3901 |
| Undrawn Denier | 50 | 25 | 50 | 25 | 50 |
| Feeder Setting | 3 | 1.5 | 3 | 1.5 | 3 |
| water on feeding zone | on | on | on | on | on |
| zone 1 Temp. (deg C.) | 215 | 215 | 215 | 215 | 215 |
| zone 2 Temp. (deg C.) | 215 | 215 | 215 | 215 | 215 |
| zone 3 Temp. (deg C.) | 215 | 215 | 215 | 215 | 215 |
| zone 4 Temp. (deg C.) | 215 | 215 | 215 | 215 | 215 |
| zone 5 Temp. (deg C.) | 215 | 215 | 215 | 215 | 215 |
| zone 6 Temp. (deg C.) | 210 | 210 | 210 | 210 | 210 |
| zone 7 Temp. (deg C.) | 210 | 210 | 210 | 210 | 210 |
| Connecting Plate Temp. (deg. C.) | 213 | 213 | 213 | 213 | 213 |
| Block Temp. (deg. C.) | 213 | 213 | 213 | 213 | 213 |
| Spin Pump Temp. (deg. C.) | 215 | 215 | 215 | 215 | 215 |
| Top Cap (deg. C.) | 215 | 215 | 215 | 215 | 215 |
| Spin Pack Temp. (deg. C.) | 216 | 216 | 216 | 216 | 216 |
| Barrel Melt Temp. (deg C.) | 217 | 217 | 217 | 217 | 217 |
| Melt Pump Inlet Pressure (psi) | 1040 | 360 | 870 | 610 | 750 |
| Melt Pump Outlet Pressure (psi) | 20 | 90 | 250 | 80 | 120 |
| Extruder (rpm) | 220 | 220 | 220 | 220 | 220 |
| Monomer Exhaust inches water | | | | | |
| Spinneret: no. of holes/Shape | 12 R | 12 R | 12 R | 12 R | 12 R |
| Spinneret: capilary diameter & depth | 0.0177 × 0.061 | 0.0177 × 0.061 | 0.0177 × 0.061 | 0.0177 × 0.061 | 0.0177 × 0.061 |
| Metering pump size (cc/rev) | 1.16 | 1.16 | 1.16 | 1.16 | 1.16 |
| Metering pump (rpm) | 18 | 9.5 | 18 | 9.5 | 18 |
| Thruput (lbs/hr) | 3 | 1.5 | 3 | 1.5 | 3 |
| Filter type | STD SCREEN | STD SCREEN | STD SCREEN | STD SCREEN | STD SCREEN |
| Quench air Flow rate (CF/M) | 6.9 | 6.9 | 7.1 | 6.8 | 6.9 |
| Qench air Temp. (deg C.) | 18.7 | 19.5 | 18.9 | 20.1 | 18.5 |

TABLE 8-continued

| | | | | | |
|---|---|---|---|---|---|
| Quench air Humidity % | 39.2 | 40.4 | 42 | 43.1 | 39.7 |
| % Torque | 19 | 14 | 20 | 18 | 17 |
| Nitrogen in Hopper | 3 | 3 | 3 | 3 | 3 |
| Estimated lbs of Host + Binder Fiber (lb) | 0 | 10.6 | 8.8 | 5.2 | 1.5 |

| | Sample I.D. | | | |
|---|---|---|---|---|
| | 6-25 | 6-50 | 7-25 | 7-50 |
| | POLYMER TYPE | | | |
| | 5% MBM 77.5% Technic + 17.5% Lactam | 5% MBM 77.5% Technic + 17.5% Lactam | 12.5% MBM 77.5% Technic + 10% Lactam | 12.5% MBM 77.5% Technic + 10% Lactam |
| | Polymer Type/Blend ID: | | | |
| | Blend 6 | Blend 6 | Blend 7 | Blend 7 |
| SAMPLE START TIME | | | | |
| SAMPLE FINISH TIME | | | | |
| Run time (min) | 45 | 45 | 45 | 45 |
| Finish type | F-137 | F-137 | F-137 | F-137 |
| Kiss roll (rpm) | 3 | 3.5 | 3 | 3.5 |
| WPU % | 5.16 | 3.28 | 5.16 | 3.28 |
| Roll # 1 Speed (m/min.) RXT-2 | 3901 | 3901 | 3901 | 3901 |
| LARGE Roll # 4 SPEED (m/min.) RXT-1 | 3901 | 3901 | 3901 | 3901 |
| Entangling jet type | | | | |
| air to jet (psi) | | | | |
| Winder grove roll: Speed (m/min.) | 4291 | 4174 | 4291 | 4291 |
| Winder drive roll: Speed (m/min.) | 3901 | 3901 | 3901 | 3901 |
| Undrawn Denier | 25 | 50 | 25 | 50 |
| Feeder Setting | 1.5 | 6 | 1.5 | 3 |
| water on feeding zone | on | on | on | on |
| zone 1 Temp. (deg C.) | 215 | 215 | 215 | 215 |
| zone 2 Temp. (deg C.) | 215 | 215 | 215 | 215 |
| zone 3 Temp. (deg C.) | 215 | 215 | 215 | 215 |
| zone 4 Temp. (deg C.) | 215 | 215 | 215 | 215 |
| zone 5 Temp. (deg C.) | 215 | 215 | 215 | 215 |
| zone 6 Temp. (deg C.) | 210 | 210 | 210 | 210 |
| zone 7 Temp. (deg C.) | 210 | 210 | 210 | 210 |
| Connecting Plate Temp. (deg. C.) | 213 | 213 | 213 | 213 |
| Block Temp. (deg. C.) | 213 | 213 | 213 | 213 |
| Spin Pump Temp. (deg. C.) | 215 | 215 | 215 | 215 |
| Top Cap (deg. C.) | 215 | 215 | 215 | 215 |
| Spin Pack Temp. (deg. C.) | 216 | 216 | 216 | 216 |
| Barrel Melt Temp. (deg C.) | 217 | 217 | 217 | 217 |
| Melt Pump Inlet Pressure (psi) | 1100 | 1040 | 400 | 580 |
| Melt Pump Outlet Pressure (psi) | 30 | 190 | 210 | 430 |
| Extruder (rpm) | 220 | 220 | 220 | 220 |
| Monomer Exhaust inches water | | | | |
| Spinneret: no. of holes/Shape | 12 R | 12 R | 12 R | 12 R |
| Spinneret: capilary diameter & depth | 0.0177 × 0.061 | 0.0177 × 0.061 | 0.0177 × 0.061 | 0.0177 × 0.061 |
| Metering pump size (cc/rev) | 1.16 | 1.16 | 1.16 | 1.16 |
| Metering pump (rpm) | 9.5 | 18 | 9.5 | 18 |
| Thruput (lbs/hr) | 1.5 | 3 | 1.5 | 3 |
| Filter type | STD SCREEN | STD SCREEN | STD SCREEN | STD SCREEN |
| Quench air Flow rate (CF/M) | 6.9 | 6.7 | 6.8 | 7.1 |
| Qench air Temp. (deg C.) | 19.1 | 19.7 | 18.9 | 19.1 |
| Quench air Humidity % | 40.2 | 38.9 | 41.2 | 40.3 |
| % Torque | 26 | 20 | 18 | 21 |
| Nitrogen in Hopper | 3 | 3 | 3 | 3 |
| Estimated lbs of Host + Binder Fiber (lb) | 1.6 | 1.6 | 3.5 | 16.4 |

TABLE 9

| | | 1st Heat Cycle | | | | | |
|---|---|---|---|---|---|---|---|
| Cycle Type: | 300 | Rate (C./min): | 20 | Hold (min): | | | |
| Scan Conditions | | Melting Peaks | | | | | Total |
| Sample ID | Run # | Onset (C.) | 1st Tm (C.) | 1st Area (J/g) | 1st Tm-onset (C.) | 2nd Tm (C.) | 2nd Area (J/g) | ΔHf (J/g) |
| 1-25 | 1 | 159.5 | 176.7 | 52.6 | 17.2 | 213.1 | 18.5 | 71.1 |
| 70/20/10 | 2 | 165.6 | 178.8 | 54.0 | 13.2 | 214.5 | 17.5 | 71.4 |

TABLE 9-continued

| | | 1st Heat Cycle | | | | | | |
|---|---|---|---|---|---|---|---|---|
| Cycle Type: | | 300 | Rate (C./min): | | 20 | Hold (min): | | |
| Scan Conditions | | | | Melting Peaks | | | | Total |
| Sample ID | Run # | Onset (C.) | 1st Tm (C.) | 1st Area (J/g) | 1st Tm-onset | 2nd Tm (C.) | 2nd Area (J/g) | ΔHf (J/g) |
| | Ave | 162.6 | 177.8 | 53.3 | 15.2 | 213.8 | 18.0 | 71.3 |
| 2-25 | 1 | 161.9 | 172.4 | 56.6 | 10.5 | 209.2 | 4.7 | 61.2 |
| 85/5/10 | 2 | 159.7 | 170.1 | 47.6 | 10.4 | 208.5 | 2.9 | 50.5 |
| | Ave | 160.8 | 171.3 | 52.1 | 10.5 | 208.9 | 3.8 | 55.9 |
| 3-25 | 1 | 137.2 | 165.4 | 65.0 | 28.2 | 202.3 | 3.7 | 68.7 |
| 70/5/25 | 2 | 136.9 | 162.0 | 65.8 | 25.1 | 202.9 | 4.2 | 69.9 |
| | Ave | 137.1 | 163.7 | 65.4 | 26.7 | 202.6 | 3.9 | 69.3 |
| 4-25 | 1 | 156.1 | 176.1 | 53.1 | 20.0 | 212.9 | 9.5 | 62.5 |
| 75/10/15 | 2 | 151.9 | 171.9 | 57.0 | 20.0 | 210.8 | 12.6 | 69.6 |
| | Ave | 154.0 | 174.0 | 55.0 | 20.0 | 211.9 | 11.0 | 66.1 |
| 5-25 | 1 | 156.5 | 175.5 | 55.1 | 19.0 | 213.4 | 19.7 | 74.8 |
| 70/12.5/17.5 | 2 | 157.4 | 174.9 | 52.1 | 17.5 | 212.6 | 19.1 | 71.2 |
| | Ave | 157.0 | 175.2 | 53.6 | 18.3 | 213.0 | 19.4 | 73.0 |
| 6-25 | 1 | 150.7 | 167.4 | 56.3 | 16.7 | 205.7 | 4.7 | 60.9 |
| 77.5/5/17.5 | 2 | 142.8 | 169.2 | 71.9 | 26.4 | 209.0 | 4.1 | 76.0 |
| | Ave | 146.8 | 168.3 | 64.1 | 21.6 | 207.4 | 4.4 | 68.4 |
| 7-25 | 1 | 165.6 | 177.2 | 43.0 | 11.6 | 213.8 | 17.2 | 60.2 |
| 77.5/12.5/10 | 2 | 165.1 | 177.0 | 49.5 | 11.9 | 213.9 | 18.5 | 68.0 |
| | Ave | 165.4 | 177.1 | 46.2 | 11.8 | 213.9 | 17.9 | 64.1 |
| 1-50 | 1 | 169.2 | 188.4 | 39.1 | 19.2 | 217.4 | 33.0 | 72.1 |
| 70/20/10 | 2 | 175.0 | 189.5 | 44.4 | 14.5 | 217.7 | 32.4 | 76.8 |
| | Ave | 172.1 | 189.0 | 41.8 | 16.9 | 217.6 | 32.7 | 74.4 |
| 2-50 | 1 | 163.7 | 173.7 | 56.5 | 10.0 | 211.2 | 5.9 | 62.4 |
| 85/5/10 | 2 | 163.8 | 172.0 | 55.5 | 8.2 | 210.1 | 5.9 | 61.4 |
| | Ave | 163.8 | 172.9 | 56.0 | 9.1 | 210.7 | 5.9 | 61.9 |
| 3-50 | 1 | 127.0 | 160.2 | 44.6 | 33.2 | 201.2 | 29.7 | 74.4 |
| 70/5/25 | 2 | 127.0 | 162.7 | 49.9 | 35.7 | 202.6 | 37.5 | 87.4 |
| | Ave | 127.0 | 161.5 | 47.2 | 34.5 | 201.9 | 33.6 | 80.9 |
| 4-50 | 1 | 157.9 | 174.3 | 42.4 | 16.4 | 212.1 | 15.1 | 57.5 |
| 75/10/15 | 2 | 157.0 | 173.7 | 54.2 | 16.7 | 212.7 | 17.5 | 71.7 |
| | Ave | 157.5 | 174.0 | 48.3 | 16.6 | 212.4 | 16.3 | 64.6 |
| 5-50 | 1 | 139.3 | 174.4 | 67.8 | 35.1 | 211.6 | 17.1 | 84.9 |
| 70/12.5/17.5 | 2 | 142.4 | 173.7 | 62.2 | 31.3 | 212.6 | 16.6 | 78.7 |
| | Ave | 140.9 | 174.1 | 65.0 | 33.2 | 212.1 | 16.8 | 81.8 |
| 6-50 | 1 | 152.5 | 169.6 | 50.3 | 17.1 | 206.8 | 6.2 | 56.5 |
| 77.5/5/17.5 | 2 | 153.7 | 173.4 | 64.9 | 19.7 | 211.9 | 6.1 | 71.0 |
| | Ave | 153.1 | 171.5 | 57.6 | 18.4 | 209.4 | 6.2 | 63.7 |
| 7-50 | 1 | 167.8 | 176.8 | 40.5 | 9.0 | 214.2 | 14.6 | 55.1 |
| 77.5/12.5/10 | 2 | 164.3 | 177.0 | 54.3 | 12.7 | 214.3 | 17.4 | 71.7 |
| | Ave | 166.1 | 176.9 | 47.4 | 10.9 | 214.3 | 16.0 | 63.4 |

TABLE 11

| | Sample I.D. | | | | |
|---|---|---|---|---|---|
| | 10 | 1 | 2 | 3 | 4 |
| | POLYMER TYPE MBM/technic & lactam blends | | | | |
| | Blend #10 | Blend #1 | Blend #2 | Blend #3 | Blend #4 |
| Feeder Setting 1.13 | 1.13 | 1.13 | 1.13 | 1.13 | 1.13 |
| water on feeding zone | on | on | on | on | on |
| zone 1 Temp. (deg C.) 215 | 220 | 215 | 215 | 215 | 215 |
| zone 2 Temp. (deg C.) 215 | 220 | 215 | 215 | 215 | 215 |
| zone 3 Temp. (deg C.) 215 | 220 | 215 | 215 | 215 | 215 |
| zone 4 Temp. (deg C.) 215 | 220 | 215 | 215 | 215 | 215 |
| zone 5 Temp. (deg C.) 215 | 220 | 215 | 215 | 215 | 215 |
| zone 6 Temp. (deg C.) 210 | 220 | 210 | 210 | 210 | 210 |
| zone 7 Temp. (deg C.) 210 | 220 | 210 | 210 | 210 | 210 |
| 8 Connecting Plate Temp. (deg. C.) 213 | 220 | 213 | 213 | 213 | 213 |
| 9 Block Temp. (deg. C.) 213 | 220 | 213 | 213 | 213 | 213 |
| 10 Spin Pump Temp. (deg. C.) 215 | 220 | 215 | 215 | 215 | 215 |
| 11 Top Cap (deg. C.) 215 | 220 | 215 | 215 | 215 | 215 |
| 12 Spin Pack Temp. (deg. C.) 216 | 220 | 216 | 216 | 216 | 216 |
| Barrel Melt Temp. (deg. C.) | 225 | 218 | 218 | 218 | 218 |
| Melt Pump Inlet Pressure (psi) | 220 | 850 | 1210 | 670 | 630 |

TABLE 11-continued

| | | | | | |
|---|---|---|---|---|---|
| Melt Pump Outlet Pressure (psi) | 600 | 330 | 460 | 520 | 520 |
| Extruder (rpm) 200 | 200 | 200 | 200 | 200 | 200 |
| Monomer Exhaust inches water | | | | | |
| Spinneret: no. of holes/Shape | 6R | 6R | 6R | 6R | 6R |
| Spinneret: capilary diameter & depth | .01778 × .061 | .01778 × .061 | .01778 × .061 | .01778 × .061 | .01778 × .061 |
| Metering pump size (cc/rev) | 1.16 | 1.16 | 1.16 | 1.16 | 1.16 |
| Metering pump (rpm) | 7.5 | 7.5 | 7.5 | 7.5 | 7.5 |
| Thruput (lbs/hr) | 1.13 | 1.13 | 1.13 | 1.13 | 1.13 |
| Filter type | STD SCREEN | STD SCREEN | STD SCREEN | STD SCREEN | STD SCREEN |
| Quench air Flow rate (CF/M) | 7.1 | 7.2 | 7.4 | 7.3 | 7.5 |
| Qench air Temp. (deg. C.) | 20.1 | 19.9 | 18.3 | 19.5 | 19.3 |
| Quench air Humidity % | 54.5 | 52.2 | 45.2 | 51.1 | 52.5 |
| % Torque | 21 | 22 | 27 | 28 | 25 |
| Nitrogen in Hoper | 3 | 3 | 3 | 3 | 3 |
| Need: polymer chips moisture | yes | | | | |

| | Sample I.D. | | | | |
|---|---|---|---|---|---|
| | 5 | 6 | 7 | 8 | 8B |
| | POLYMER TYPE MBM/technic & lactam blends | | | | |
| | Blend #5 | Blend #6 | Blend #7 | Blend #8 | Blend #8B |
| Feeder Setting 1.13 | 1.13 | 1.13 | 1.13 | 1.13 | 1.13 |
| water on feeding zone | on | on | on | on | on |
| zone 1 Temp. (deg C.) 215 | 215 | 215 | 215 | 215 | 215 |
| zone 2 Temp. (deg C.) 215 | 215 | 215 | 215 | 215 | 215 |
| zone 3 Temp. (deg C.) 215 | 215 | 215 | 215 | 215 | 215 |
| zone 4 Temp. (deg C.) 215 | 215 | 215 | 215 | 215 | 215 |
| zone 5 Temp. (deg C.) 215 | 215 | 215 | 215 | 215 | 215 |
| zone 6 Temp. (deg C.) 210 | 210 | 210 | 210 | 210 | 210 |
| zone 7 Temp. (deg C.) 210 | 210 | 210 | 210 | 210 | 210 |
| 8 Connecting Plate Temp. (deg. C.) 213 | 213 | 213 | 213 | 213 | 213 |
| 9 Block Temp. (deg. C.) 213 | 213 | 213 | 213 | 213 | 213 |
| 10 Spin Pump Temp. (deg. C.) 215 | 215 | 215 | 215 | 215 | 215 |
| 11 Top Cap (deg. C.) 215 | 215 | 215 | 215 | 215 | 215 |
| 12 Spin Pack Temp. (deg. C.) 216 | 216 | 216 | 216 | 216 | 216 |
| Barrel Melt Temp. (deg. C.) | 218 | 218 | 218 | 218 | 217 |
| Melt Pump Inlet Pressure (psi) | 910 | 1340 | 920 | 450 | 760 |
| Melt Pump Outlet Pressure (psi) | 420 | 560 | 430 | 460 | 470 |
| Extruder (rpm) 200 | 200 | 200 | 200 | 200 | 200 |
| Monomer Exhaust inches water | | | | | |
| Spinneret: no. of holes/Shape | 6R | 6R | 6R | 6R | 6R |
| Spinneret: capilary diameter & depth | .01778 × .061 | .01778 × .061 | .01778 × .061 | .01778 × .061 | .0177 × .081 |
| Metering pump size (cc/rev) | 1.16 | 1.16 | 1.16 | 1.16 | 1.16 |
| Metering pump (rpm) | 7.5 | 7.5 | 7.5 | 7.5 | 7.5 |
| Thruput (lbs/hr) | 1.13 | 1.13 | 1.13 | 1.13 | 1.13 |
| Filter type | STD SCREEN | STD SCREEN | STD SCREEN | STD SCREEN | STD SCREEN |
| Quench air Flow rate (CF/M) | 7.4 | 7.2 | 7 | 7.4 | 6.9 |
| Qench air Temp. (deg. C.) | 18.8 | 18.5 | 18.4 | 18.5 | 19.9 |
| Quench air Humidity % | 49.7 | 50.1 | 52.4 | 53.6 | 51 |
| % Torque | 22 | 29 | 22 | 21 | 22 |
| Nitrogen in Hoper | 3 | 3 | 3 | 3 | 3 |
| Need: polymer chips moisture | | | | | |

| | Sample I.D. | | |
|---|---|---|---|
| | 9 | 9B | 12 |
| | POLYMER TYPE MBM/technic & lactam blends | | |
| | Blend #9 | Blend #9B | MBM |
| Feeder Setting 1.13 | 1.13 | 1.13 | 1.13 |
| water on feeding zone | on | on | on |
| zone 1 Temp. (deg C.) 215 | 215 | 223 | 258 |
| zone 2 Temp. (deg C.) 215 | 215 | 223 | 258 |
| zone 3 Temp. (deg C.) 215 | 215 | 223 | 258 |
| zone 4 Temp. (deg C.) 215 | 215 | 223 | 258 |
| zone 5 Temp. (deg C.) 215 | 215 | 223 | 258 |
| zone 6 Temp. (deg C.) 210 | 210 | 218 | 258 |
| zone 7 Temp. (deg C.) 210 | 210 | 218 | 258 |
| 8 Connecting Plate Temp. (deg. C.) 213 | 213 | 221 | 258 |
| 9 Block Temp. (deg. C.) 213 | 213 | 220 | 258 |
| 10 Spin Pump Temp. (deg. C.) 215 | 215 | 222 | 258 |
| 11 Top Cap (deg. C.) 215 | 215 | 222 | 258 |
| 12 Spin Pack Temp. (deg. C.) 216 | 216 | 226/223 | 258 |
| Barrel Melt Temp. (deg. C.) | 217 | 225 | 264 |

TABLE 11-continued

| | | | | |
|---|---|---|---|---|
| Melt Pump Inlet Pressure (psi) | | 470 | 1400 | 680 |
| Melt Pump Outlet Pressure (psi) | | 620 | 390 | 570 |
| Extruder (rpm) 200 | | 200 | 200 | 200 |
| Monomer Exhaust inches water | | | | |
| Spinneret: no. of holes/Shape | | 6R | 6R | 6R |
| Spinneret: capilary diameter & depth | | .0177 × .061 | .0177 × .061 | .0177 × .061 |
| Metering pump size (cc/rev) | | 1.16 | 1.16 | 1.16 |
| Metering pump (rpm) | | 7.5 | 7.5 | 7.5 |
| Thruput (lbs/hr) | | 1.13 | 1.13 | 1.13 |
| Filter type | | STD SCREEN | STD SCREEN | STD SCREEN |
| Quench air Flow rate (CF/M) | | 7 | 7.1 | 7.1 |
| Qench air Temp. (deg. C.) | | 18.9 | 18.2 | 18.5 |
| Quench air Humidity % | | 39.4 | 52.1 | 36.8 |
| % Torque | | 22 | 28 | 23 |
| Nitrogen in Hoper | | 3 | 3 | 3 |
| Need: polymer chips moisture | | | | |

TABLE 12

| | Sample I.D. | | | | |
|---|---|---|---|---|---|
| | Blend 10-1 | Blend 10-2 | Blend 10-3 | Blend 1-1 | Blend 1-2 |
| | POLYMER TYPE Nylon Blend | | | | |
| | 10 | 10 | 10 | 1 | 1 |
| SAMPLE START TIME | 13:35 | 14:25 | 15:15 | 8:30 | 8:36 |
| SAMPLE FINISH TIME | 14:20 | 15:10 | 15:40 | 8:34 | 9:16 |
| Run time (min) | 45 | 45 | 25 | 4 | 45 |
| Finish type F-137-10 | F-137-10 | F-137-10 | F-137-10 | F-137-1 | F-137-1 |
| Kiss roll (rpm) | 3.0 | 3.0 | 4.0 | 3.4 | 3.4 |
| Godets: | | | 9.5% | | |
| SMALL Roll #1 SPEED (m/min) RXT-2 | 4090 | 4090 | 4090 | 4090 | 4090 |
| SMALL Roll #2 SPEED (m/min) | | | | | |
| LARGE Roll #3 SPEED (m/min) | | | | | |
| LARGE Roll # 4 SPEED (m/min.) RXT-1 | 4090 | 4090 | 4090 | 4090 | 4090 |
| Entangling | | | | | |
| jet type | | | | | |
| str to jet (psi) | | | | | |
| Winder grove roll: Speed (m/min.) | 4499 | 4499 | 4499 | 4499 | 4499 |
| Winder drive roll: Speed (m/min. | 4090 | 4090 | 4090 | 4090 | 4090 |
| Undrawn Denier | 20.0 | | | 20.0 | 20.0 |
| Need: undrawn yarn Denier, instron | | | | | |
| , free fall FAV (after each run set) | | | | | |
| submit free fall and polymer for FAV | | | | | |
| Monomer Exhaust inches water | | | | | |

| | Sample I.D. | | | | |
|---|---|---|---|---|---|
| | Blend 1-3 | Blend 2-1 | Blend 2-2 | Blend 2-3 | Blend 3-1 |
| | POLYMER TYPE Nylon Blend | | | | |
| | 1 | 2 | 2 | 2 | 3 |
| SAMPLE START TIME | 9:20 | 10:19 | 11:06 | 11:27 | 12:36 |
| SAMPLE FINISH TIME | 10:05 | 11:04 | 11:22 | 12:10 | 1:15 |
| Run time (min) | 45 | 45 | 16 | 45 | 25 min |
| Finish type F-137-10 | F-137-1 | F-137-1 | F-137-10 | F-137-10 | F-137-10 |
| Kiss roll (rpm) | 3.8 | 3.8 | 3.8 | 3.8 | 3.8 |
| Godets: | | | | | |
| SMALL Roll #1 SPEED (m/min) RXT-2 | 4090 | 4090 | 4090 | 4090 | 4090 |
| SMALL Roll #2 SPEED (m/min) | | | | | |
| LARGE Roll #3 SPEED (m/min) | | | | | |
| LARGE Roll # 4 SPEED (m/min.) RXT-1 | 4090 | 4090 | 4090 | 4090 | 4090 |
| Entangling | | | | | |
| jet type | | | | | |
| str to jet (psi) | | | | | |
| Winder grove roll: Speed (m/min.) | 4499 | 4499 | 4499 | 4499 | 4499 |
| Winder drive roll: Speed (m/min. | 4090 | 4090 | 4090 | 4090 | 4090 |
| Undrawn Denier | 20.0 | | | | |
| Need: undrawn yarn Denier, instron | | | | | |
| , free fall FAV (after each run set) | | | | | |
| submit free fall and polymer for FAV | | | | | |
| Monomer Exhaust inches water | | | | | |

TABLE 12-continued

|  | Sample I.D. | | | | |
| --- | --- | --- | --- | --- | --- |
|  | Blend 3-2 | Blend 3-3 | Blend 4-1 | Blend 4-2 | Blend 4-3 |
|  | POLYMER TYPE Nylon Blend | | | | |
|  | 3 | 3 | 4 | 4 | 4 |
| SAMPLE START TIME | 13:23 | 14:15 | 14:45 | 15:07 | 16:05 |
| SAMPLE FINISH TIME | 14:08 | 14:25 | 14:54 | 15:52 | 16:23 |
| Run time (min) | 45 min | 10 min | 9 min | 45 min | 18 min |
| Finish type F-137-10 | F-137-10 | F-137-10 | F-137-10 | F-137-10 | F-137-10 |
| Kiss roll (rpm) | 3.8 | 3.8 | 3.8 | 3.8 | 3.8 |
| Godets: |  |  |  |  |  |
| SMALL Roll #1 SPEED (m/min) RXT-2 | 4090 | 4090 | 4090 | 4090 | 4090 |
| SMALL Roll #2 SPEED (m/min) |  |  |  |  |  |
| LARGE Roll #3 SPEED (m/min) |  |  |  |  |  |
| LARGE Roll # 4 SPEED (m/min.) RXT-1 | 4090 | 4090 | 4090 | 4090 | 4090 |
| Entangling |  |  |  |  |  |
| jet type |  |  |  |  |  |
| str to jet (psi) |  |  |  |  |  |
| Winder grove roll: Speed (m/min.) | 4499 | 4499 | 4499 | 4499 | 4499 |
| Winder drive roll: Speed (m/min. | 4090 | 4090 | 4090 | 4090 | 4090 |
| Undrawn Denier |  |  |  |  |  |
| Need: Undrawn yarn Denier, instron |  |  |  |  |  |
| , free fall FAV (after each run set) |  |  |  |  |  |
| submit free fall and polymer for FAV |  |  |  |  |  |
| Monomer Exhaust inches water |  |  |  |  |  |

|  | Sample I.D. | | | | |
| --- | --- | --- | --- | --- | --- |
|  | Blend 4-4 | Blend 5-1 | Blend 5-2 | Blend 5-3 | Blend 5-4 |
|  | POLYMER TYPE Nylon Blend | | | | |
|  | 4 | 5 | 5 | 5 | 5 |
| SAMPLE START TIME | 16:29 | 7:35 | 7:50 | 8:20 | 8:33 |
| SAMPLE FINISH TIME | 16:50 | 7:42 | 8:15 | 8:27 | 8:51 |
| Run time (min) | 21 min | 7 min | 25 min | 7 min | 18 min |
| Finish type F-137-10 | F-137-10 | F-137-10 | F-137-10 | F-137-10 | F-137-10 |
| Kiss roll (rpm) | 3.8 | 3.6 | 3.8 | 3.8 | 3.8 |
| Godets: |  |  |  |  |  |
| SMALL Roll #1 SPEED (m/min) RXT-2 | 4090 | 4090 | 4090 | 4090 | 4090 |
| SMALL Roll #2 SPEED (m/min) |  |  |  |  |  |
| LARGE Roll #3 SPEED (m/min) |  |  |  |  |  |
| LARGE Roll # 4 SPEED (m/min.) RXT-1 | 4090 | 4090 | 4090 | 4090 | 4090 |
| Entangling |  |  |  |  |  |
| jet type |  |  |  |  |  |
| str to jet (psi) |  |  |  |  |  |
| Winder grove roll: Speed (m/min.) | 4499 | 4499 | 4499 | 4499 | 4499 |
| Winder drive roll: Speed (m/min. | 4090 | 4090 | 4090 | 4090 | 4090 |
| Undrawn Denier |  |  | 20.0 |  |  |
| Need: Undrawn yarn Denier, instron |  |  |  |  |  |
| , free fall FAV (after each run set) |  |  |  |  |  |
| submit free fall and polymer for FAV |  |  |  |  |  |
| Monomer Exhaust inches water |  |  |  |  |  |

|  | Sample I.D. | | | | |
| --- | --- | --- | --- | --- | --- |
|  | Blend 5-5 | Blend 5-6 | Blend 5-7 | Blend 6-1 | Blend 6-2 |
|  | POLYMER TYPE Nylon Blend | | | | |
|  | 5 | 5 | 5 | 6 | 6 |
| SAMPLE START TIME | 8:55 | 9:30 | 9:40 | 10:07 | 10:55 |
| SAMPLE FINISH TIME | 9:26 | 9:35 | 9:49 | 10:52 | 11:20 |
| Run time (min) | 31 min | 4 min | 9 min | 45 min | 25 min |
| Finish type F-137-10 | F-137-10 | F-137-10 | F-137-10 | F-137-10 | F-137-10 |
| Kiss roll (rpm) | 3.8 | 3.8 | 3.8 | 3.67 | 3.67 |
| Godets: |  |  |  |  |  |
| SMALL Roll #1 SPEED (m/min) RXT-2 | 4090 | 4090 | 4090 | 4090 | 4090 |
| SMALL Roll #2 SPEED (m/min) |  |  |  |  |  |
| LARGE Roll #3 SPEED (m/min) |  |  |  |  |  |
| LARGE Roll # 4 SPEED (m/min.) RXT-1 | 4090 | 4090 | 4090 | 4090 | 4090 |
| Entangling |  |  |  |  |  |
| jet type |  |  |  |  |  |
| str to jet (psi) |  |  |  |  |  |
| Winder grove roll: Speed (m/min.) | 4499 | 4499 | 4499 | 4499 | 4499 |

TABLE 12-continued

| | | | | | |
|---|---|---|---|---|---|
| Winder drive roll: Speed (m/min. | 4090 | 4090 | 4090 | 4090 | 4090 |
| Undrawn Denier | | | | 20 | |
| Need: Undrawn yarn Denier, instron | | | | | |
| , free fall FAV (after each run set) | | | | | |
| submit free fall and polymer for FAV | | | | | |
| Monomer Exhaust inches water | | | | | |

| | Sample I.D. | | | | |
|---|---|---|---|---|---|
| | Blend 6-3 | Blend 6-4 | Blend 7-1 | Blend 7-2 | Blend 7-3 |
| | POLYMER TYPE Nylon Blend | | | | |
| | 6 | 6 | 7 | 7 | 7 |
| SAMPLE START TIME | 11:33 | 11:55 | 12:35 | 12:49 | 12:57 |
| SAMPLE FINISH TIME | 11:53 | 12:14 | 12:46 | 12:55 | 13:06 |
| Run time (min) | 20 min | 19 min | 11 min | 6 min | 9 min |
| Finish type F-137-10 | F-137-10 | F-137-10 | F-137-10 | F-137-10 | F-137-10 |
| Kiss roll (rpm) | 3.67 | 3.67 | 3.67 | 3.67 | 3.67 |
| Godets: | | | | | |
| SMALL Roll #1 SPEED (m/min) RXT-2 | 4090 | 4090 | 4090 | 4090 | 4090 |
| SMALL Roll #2 SPEED (m/min) | | | | | |
| LARGE Roll #3 SPEED (m/min) | | | | | |
| LARGE Roll # 4 SPEED (m/min.) RXT-1 | 4090 | 4090 | 4090 | 4090 | 4090 |
| Entangling | | | | | |
| jet type | | | | | |
| str to jet (psi) | | | | | |
| Winder grove roll: Speed (m/min.) | 4499 | 4499 | 4499 | 4499 | 4499 |
| Winder drive roll: Speed (m/min. | 4090 | 4090 | 4090 | 4090 | 4090 |
| Undrawn Denier | | | | 20 | |
| Need: Undrawn yarn Denier, instron | | | | | |
| , free fall FAV FAV (after each run set) | | | | | |
| submit free fall and polymer for FAV | | | | | |
| Monomer Exhaust inches water | | | | | |

| | Sample I.D. | | | | |
|---|---|---|---|---|---|
| | Blend 7-4 | Blend 7-5 | Blend 7-6 | Blend 7-7 | Blend 7-8 |
| | POLYMER TYPE Nylon Blend | | | | |
| | 7 | 7 | 7 | 7 | 7 |
| SAMPLE START TIME | 13:26 | 13:40 | 13:54 | 14:02 | 14:25 |
| SAMPLE FINISH TIME | 13:38 | 13:44 | 14:00 | 14:13 | 14:30 |
| Run time (min) | 12 min | 4 min | 6 min | 11 min | 5 min |
| Finish type F-137-10 | F-137-10 | F-137-10 | F-137-10 | F-137-10 | F-137-10 |
| Kiss roll (rpm) | 3.67 | 3.67 | 3.67 | 3.67 | 3.67 |
| Godets: | | | | | |
| SMALL Roll #1 SPEED (m/min) RXT-2 | 4090 | 4090 | 4090 | 4090 | 4090 |
| SMALL Roll #2 SPEED (m/min) | | | | | |
| LARGE Roll #3 SPEED (m/min) | | | | | |
| LARGE Roll # 4 SPEED (m/min.) RXT-1 | 4090 | 4090 | 4090 | 4090 | 4090 |
| Entangling | | | | | |
| jet type | | | | | |
| str to jet (psi) | | | | | |
| Winder grove roll: Speed (m/min.) | 4499 | 4499 | 4499 | 4499 | 4499 |
| Winder drive roll: Speed (m/min. | 4090 | 4090 | 4090 | 4090 | 4090 |
| Undrawn Denier | | | | | |
| Need: Undrawn yarn Denier, instron | | | | | |
| , free fall FAV (after each run set) | | | | | |
| submit free fall and polymer for FAV | | | | | |
| Monomer Exhaust inches water | | | | | |

| | Sample I.D. | | | | |
|---|---|---|---|---|---|
| | Blend 7-9 | Blend 7-10 | Blend 7-11 | Blend 8-1 | Blend 8-2 |
| | POLYMER TYPE Nylon Blend | | | | |
| | 7 | 7 | 7 | 8 | 8 |
| SAMPLE START TIME | 14:35 | 14:51 | 15:05 | 9:15 | 10:10 |
| SAMPLE FINISH TIME | 14:48 | 15:00 | 15:10 | 9:38 | 10:16 |
| Run time (min) | 13 min | 9 min | 4 min | 23 min | 6 min |
| Finish type F-137-10 | F-137-10 | F-137-10 | F-137-10 | F-137-10 | F-137-10 |
| Kiss roll (rpm) | 3.67 | 3.67 | 3.67 | 3.67 | 3.67 |
| Godets: | | | | | |
| SMALL Roll #1 SPEED (m/min) RXT-2 | 4090 | 4090 | 4090 | 4090 | 4090 |

TABLE 12-continued

| | | | | | |
|---|---|---|---|---|---|
| SMALL Roll #2 SPEED (m/min) | | | | | |
| LARGE Roll #3 SPEED (m/min) | | | | | |
| LARGE Roll # 4 SPEED (m/min.) RXT-1 | 4090 | 4090 | 4090 | 4090 | 4090 |
| Entangling | | | | | |
| jet type | | | | | |
| str to jet (psi) | | | | | |
| Winder grove roll: Speed (m/min.) | 4499 | 4499 | 4499 | 4499 | 4499 |
| Winder drive roll: Speed (m/min. | 4090 | 4090 | 4090 | 4090 | 4090 |
| Undrawn Denier | | | | 20.0 | |
| Need: Undrawn yarn Denier, instron | | | | | |
| , free fall FAV (after each run set) | | | | | |
| submit free fall and polymer for FAV | | | | | |
| Monomer Exhaust inches water | | | | | |

| | Sample I.D. | | | | |
|---|---|---|---|---|---|
| | Blend 8-3 | Blend 8-4 | Blend 8-5 | Blend 8-6 | |
| | POLYMER TYPE Nylon Blend | | | | |
| | 8 | 8 | 8 | 8 | Comments |
| SAMPLE START TIME | 10:20 | 10:30 | 10:45 | 10:55 | Hard to string up- |
| SAMPLE FINISH TIME | 10:25 | 10:38 | 10:51 | 11:02 | lowered |
| Run time (min) | 5 min | 8 min | 6 min | 7 min | RxT-2 #1 roll to 2090 |
| Finish type F-137-10 | F-137-10 | F-137-10 | F-137-10 | F-137-10 | m/min. |
| Kiss roll (rpm) | 3.67 | 3.67 | 3.67 | 3.67 | then raised back up to |
| Godets: | | | | | 4090 after running on |
| SMALL Roll #1 SPEED (m/min) RXT-2 | 4090 | 4090 | 4090 | 4090 | winder. |
| SMALL Roll #2 SPEED (m/min) | | | | | |
| LARGE Roll #3 SPEED (m/min) | | | | | |
| LARGE Roll # 4 SPEED (m/min.) RXT-1 | 4090 | 4090 | 4090 | 4090 | |
| Entangling | | | | | |
| jet type | | | | | |
| str to jet (psi) | | | | | |
| Winder grove roll: Speed (m/min.) | 4499 | 4499 | 4499 | 4499 | |
| Winder drive roll: Speed (m/min. | 4090 | 4090 | 4090 | 4090 | |
| Undrawn Denier | | | | | |
| Need: Undrawn yarn Denier, instron | | | | | |
| , free fall FAV (after each run set) | | | | | |
| submit free fall and polymer for FAV | | | | | |
| Monomer Exhaust Inches water | | | | | |

TABLE 13

| | Sample I.D. | | | | | | | |
|---|---|---|---|---|---|---|---|---|
| | Blend 8B-1 | Blend 8B-2 | Blend 8B-3 | Blend 8B-4 | Blend 8B-5 | Blend 8B-6 | Blend 8B-7 | Blend 8B-8 |
| | POLYMER TYPE Nylon Blend | | | | | | | |
| | 8B | 8B | 8B | 8B | 8B | 8B | 8B | 8B |
| | ####### | | | | | | | |
| SAMPLE START TIME | 9:06 | 9:25 | 9:40 | 10:05 | 10:15 | 10:20 | 10:30 | 10:50 |
| SAMPLE FINISH TIME | 9:20 | 9.32 | 9:50 | 10:10 | 10:18 | 10:24 | 10:45 | 10:55 |
| Run time (min) | 14 | 7 | 10 | 5 | 3 | 4 | 15 | 5 |
| Finish type F-137-10 | F-137-10 | | | | | | | |
| Kiss roll (rpm) | 3.65 | | | | | | | |
| Godets: | | | | | | | | |
| SMALL Roll #1 SPEED (m/min) RXT-2 | 4090 | | | | | | | |
| SMALL Roll #2 SPEED (m/min) | | | | | | | | |
| LARGE Roll #3 SPEED (m/min) | | | | | | | | |
| LARGE Roll # 4 SPEED (m/min.) RXT-1 | 4090 | | | | | | | |
| Entangling | | | | | | | | |
| jet type | | | | | | | | |
| air to jet (psi) | | | | | | | | |
| Winder grove roll: Speed (m/min.) | 4499 | | | | | | | |
| Winder drive roll: Speed (m/min. | 4090 | | | | | | | |
| Undrawn Denier | 20.0 | | | | | | | |
| Need: undrawn yarn Denier, instron | | | | | | | | |
| , free fall FAV (after each run set) | | | | | | | | |
| submit free fall and polymer for FAV | | | | | | | | |
| Monomer Exhaust inches water | | | | | | | | |

TABLE 13-continued

| | Sample I.D. | | | | | | | |
|---|---|---|---|---|---|---|---|---|
| | Blend 8B-9 | Blend 8B-10 | Blend 8B-11 | Blend 9-1 | Blend 9-2 | Blend 9-3 | Blend 9-4 | Blend 9-5 |
| | | | POLYMER TYPE Nylon Blend | | | | | |
| | 8B | 8B | 8B | 9 | 9 | 9 | 9 | 9 |
| SAMPLE START TIME | 11:10 | 11:30 | 11:40 | 13:20 | 13:30 | 14:00 | 14:25 | 15:00 |
| SAMPLE FINISH TIME | 11:25 | 11:37 | 11:51 | 13:25 | 13:58 | 14:13 | 14:46 | 15:09 |
| Run time (min) | 15 | 7 | 11 | 5 | 26 | 13 | 21 | 9 |
| Finish type F-137-10 | | | | | | | | |
| Kiss roll (rpm) | | | | | | | | |
| Godets: | | | | | | | | |
| SMALL Roll #1 SPEED (m/min) RXT-2 | | | | | | | | |
| SMALL Roll #2 SPEED (m/min) | | | | | | | | |
| LARGE Roll #3 SPEED (m/min) | | | | | | | | |
| LARGE Roll # 4 SPEED (m/min.) RXT-1 | | | | | | | | |
| Entangling | | | | | | | | |
| jet type | | | | | | | | |
| air to jet (psi) | | | | | | | | |
| Winder grove roll: Speed (m/min.) | | | | | | | | |
| Winder drive roll: Speed (m/min. | | | | | | | | |
| Undrawn Denier | | | | | | | | |
| Need: undrawn yarn Denier, instron | | | | | | | | |
| , free fall FAV (after each run set) | | | | | | | | |
| submit free fall and polymer for FAV | | | | | | | | |
| Monomer Exhaust inches water | | | | | | | | |

| | Sample I.D. | | | | |
|---|---|---|---|---|---|
| | Blend 9-6 | Blend 9B-1 | MBM 12-1 | MBM 12-2 | Comments |
| | POLYMER TYPE Nylon Blend | | | | Temp. change up to 225 |
| | 9 | 9 | 12 | 12 | degrees |
| SAMPLE START TIME | 15:15 | 16:00 | 8:35 | 9:40 | |
| SAMPLE FINISH TIME | 15:44 | 16:01 | 9:35 | 10:01 | |
| Run time (min) | 29 | 1 | 60 | 21 | |
| Finish type F-137-10 | | | F-137-10 | | |
| Kiss roll (rpm) | | | 3.6 | | |
| Godets: | | | | | |
| SMALL Roll #1 SPEED (m/min) RXT-2 | | | 4090 | | |
| SMALL Roll #2 SPEED (m/min) | | | | | |
| LARGE Roll #3 SPEED (m/min) | | | | | |
| LARGE Roll # 4 SPEED (m/min.) RXT-1 | | | 4090 | | |
| Entangling | | | | | |
| jet type | | | | | |
| air to jet (psi) | | | | | |
| Winder grove roll: Speed (m/min.) | | | 4499 | | |
| Winder drive roll: Speed (m/min. | | | 4090 | | |
| Undrawn Denier | | 20.1 | 20.0 | | |
| Need: undrawn yarn Denier, instron | | | | | |
| , free fall FAV (after each run set) | | | | | |
| submit free fall and polymer for FAV | | | | | |
| Monomer Exhaust inches water | | | | | |

TABLE 14

| | | 1st Heat Cycle | | | | | | |
|---|---|---|---|---|---|---|---|---|
| Cycle Type: | 300 | Rate (C./min): | 20 | Hold (min): | | | | |
| Scan Conditions | | | Melting Peaks | | | | | |
| Sample ID | Run # | Onset 1 (C.) | 1st Tm (C.) | ΔHf 1 (J/g) | Onset 2 (C.) | 2nd Tm (C.) | 3rd Tm (C.) | ΔHf 2 (J/g) |
| 1-2 | 1 | 137.2 | 148.5 | 3.5 | 178.6 | 182.3 | 215.3 | 52.2 |
| | 2 | 137.9 | 149.2 | 3.7 | 178.8 | 182.3 | 215.3 | 52.5 |
| | Ave | 137.6 | 148.9 | 3.6 | 178.7 | 182.3 | 215.3 | 52.3 |
| 2-1 | 1 | 127.3 | 139.0 | 3.7 | 177.7 | 180.8 | 214.3 | 58.3 |
| | 2 | 125.8 | 137.3 | 3.9 | 177.8 | 181.1 | 215.4 | 58.8 |
| | Ave | 126.6 | 138.2 | 3.8 | 177.8 | 181.0 | 214.9 | 58.6 |

TABLE 14-continued

| | | 1st Heat Cycle | | | | | | |
|---|---|---|---|---|---|---|---|---|
| Cycle Type: | 300 | Rate (C./min): | 20 | Hold (min): | | | | |
| Scan Conditions | | | | Melting Peaks | | | | |
| Sample ID | Run # | Onset 1 (C.) | 1st Tm (C.) | ΔHf 1 (J/g) | Onset 2 (C.) | 2nd Tm (C.) | 3rd Tm (C.) | ΔHf 2 (J/g) |
| 3-1 | 1 | 138.7 | 148.8 | 3.2 | 176.0 | 178.2 | 212.9 | 50.1 |
| | 2 | 138.3 | 148.4 | 3.2 | 175.9 | 178.0 | 213.5 | 51.5 |
| | Ave | 138.5 | 148.6 | 3.2 | 176.0 | 178.1 | 213.2 | 50.8 |
| 4-2 | 1 | 135.3 | 146.9 | 3.9 | 179.1 | 183.1 | 215.7 | 56.3 |
| | 2 | 137.2 | 147.6 | 4.0 | 179.1 | 183.0 | 215.6 | 57.2 |
| | Ave | 136.3 | 147.3 | 3.9 | 179.1 | 183.1 | 215.7 | 56.8 |
| 5-2 | 1 | 131.8 | 143.2 | 4.0 | 178.6 | 182.0 | 215.3 | 59.1 |
| | 2 | 129.1 | 141.1 | 4.2 | 179.9 | 184.9 | 216.2 | 57.5 |
| | Ave | 130.5 | 142.2 | 4.1 | 179.3 | 183.5 | 215.8 | 58.3 |
| 6-1 | 1 | 112.0 | 126.1 | 5.2 | 180.4 | 187.6 | 217.1 | 63.0 |
| | 2 | 110.6 | 124.4 | 4.8 | 179.9 | 187.4 | 217.1 | 67.0 |
| | Ave | 111.3 | 125.3 | 5.0 | 180.2 | 187.5 | 217.1 | 65.0 |
| 7-4 | 1 | 131.2 | 142.8 | 4.0 | 180.6 | 187.5 | 216.9 | 63.3 |
| | 2 | 132.3 | 143.8 | 3.9 | 180.9 | 187.6 | 216.7 | 59.7 |
| | Ave | 131.8 | 143.3 | 4.0 | 180.8 | 187.6 | 216.8 | 61.5 |
| 8-1 | 1 | 122.6 | 134.6 | 3.9 | 178.9 | 183.4 | 216.1 | 63.6 |
| | 2 | 128.9 | 140.1 | 3.9 | 179.5 | 183.7 | 215.7 | 57.1 |
| | Ave | 125.8 | 137.4 | 3.9 | 179.2 | 183.6 | 215.9 | 60.3 |
| 10-1 | 1 | 135.6 | 146.0 | 3.3 | 172.2 | 174.3 | | 49.9 |
| | 2 | 131.5 | 142.5 | 3.3 | 172.3 | 174.1 | | 54.3 |
| | Ave | 133.6 | 144.3 | 3.3 | 172.3 | 174.2 | | 52.1 |
| 11-1 | 1 | 122.6 | 135.2 | 3.8 | 171.3 | 173.0 | | 60.1 |
| | 2 | 116.2 | 128.1 | 3.8 | 171.1 | 173.4 | | 63.9 |
| | Ave | 119.4 | 131.7 | 3.8 | 171.2 | 173.2 | | 62.0 |
| 8B-1 | 1 | 118.9 | 133.6 | 4.4 | 178.5 | 184.0 | 215.5 | 62.1 |
| | 2 | 118.7 | 132.7 | 4.2 | 179.0 | 184.1 | 215.9 | 61.9 |
| | Ave | 118.8 | 133.2 | 4.3 | 178.8 | 184.1 | 215.7 | 62.0 |
| 9-1 | 1 | 125.6 | 138.3 | 4.6 | 179.7 | 188.4 | 216.7 | 60.5 |
| | 2 | 123.8 | 137.2 | 4.2 | 179.8 | 188.4 | 216.6 | 62.3 |
| | Ave | 124.7 | 137.8 | 4.4 | 179.8 | 188.4 | 216.7 | 61.4 |
| 9B-1 | 1 | 122.1 | 134.5 | 4.0 | 178.2 | 181.9 | 215.7 | 61.7 |
| | 2 | 121.5 | 135.0 | 4.3 | 178.4 | 182.1 | 214.7 | 60.2 |
| | Ave | 121.8 | 134.8 | 4.2 | 178.3 | 182.0 | 215.2 | 61.0 |
| 12-1 MBM | 1 | 114.9 | 132.3 | 5.1 | 210.6 | 214.3 | 220.7 | 73.4 |
| | 2 | 118.6 | 134.9 | 5.6 | 211.0 | 214.1 | 220.8 | 71.6 |
| | Ave | 116.8 | 133.6 | 5.3 | 210.8 | 214.2 | 220.8 | 72.5 |

TABLE 16

| | RXT-2 Extrusion | | | | |
|---|---|---|---|---|---|
| | Sample I.D. | | | | |
| | 9B | 9C | 9D | 9E | 9F |
| | POLYMER TYPE MBM/technic & lactam blends | | | | |
| | Blend #9 | Blend #9 | Blend #9 | Blend #9 | Blend #9 |
| water on feeding zone | on | on | on | on | on |
| zone 1 Temp. (deg C.) | 220 | 230 | 240 | 250 | 260 |
| zone 2 Temp. (deg C.) | 220 | 230 | 240 | 250 | 260 |
| zone 3 Temp. (deg C.) | 220 | 230 | 240 | 250 | 260 |
| zone 4 Temp. (deg C.) | 220 | 230 | 240 | 250 | 260 |
| zone 5 Temp. (deg C.) | 220 | 230 | 240 | 250 | 260 |
| zone 6 Temp. (deg C.) | 220 | 230 | 240 | 250 | 260 |
| zone 7 Temp. (deg C.) | 220 | 230 | 240 | 250 | 260 |
| 8 Connecting Plate Temp. (deg. C.) | 220 | 230 | 240 | 250 | 260 |
| 9 Block Temp. (deg. C.) | 220 | 230 | 240 | 250 | 260 |
| 10 Spin Pump Temp. (deg. C.) | 220 | 230 | 240 | 250 | 260 |
| 11 Top Cap (deg. C.) | 220 | 230 | 240 | 250 | 260 |
| 12 Spin Pack Temp. (deg. C.) | 220 | 230 | 240 | 250 | 260 |
| Barrel Melt Temp. (deg. C.) | 225 | 235 | 245 | 255 | 265 |
| Melt Pump Inlet Pressure (psi) | | | | | |
| Melt Pump Outlet Pressure (psi) | | | | | |
| Extruder (rpm) | 200 | 200 | 200 | 200 | 200 |
| Monomer Exhaust inches water | | | | | |

TABLE 16-continued

RXT-2 Extrusion

| | Sample I.D. | | | | |
|---|---|---|---|---|---|
| | 9B | 9C | 9D | 9E | 9F |
| | POLYMER TYPE MBM/technic & lactam blends | | | | |
| | Blend #9 | Blend #9 | Blend #9 | Blend #9 | Blend #9 |
| Spinneret: no. of holes/Shape | 6R | 6R | 6R | 6R | 6R |
| Spinneret: capilary diameter & depth | .01778 × .061 | .01778 × .061 | .01778 × .061 | .01778 × .061 | .01778 × .061 |
| Metering pump size (cc/rev) | 1.16 | 1.16 | 1.16 | 1.16 | 1.16 |
| Metering pump (rpm) | 7.5 | 7.5 | 7.5 | 7.5 | 7.5 |
| Thruput (lbs/hr) | 1.13 | 1.13 | 1.13 | 1.13 | 1.13 |
| Filter type | STD SCREEN | STD SCREEN | STD SCREEN | STD SCREEN | STD SCREEN |
| Quench air Flow rate (CF/M) | 7.1 | 7.1 | 7.1 | 7.1 | 7.1 |
| Qench air Temp. (deg. C.) | 20.1 | 20.1 | 20.1 | 20.1 | 20.1 |
| Quench air Humidity % | 54.5 | 54.5 | 54.5 | 54.5 | 54.5 |
| % Torque | 21 | 21 | 21 | 21 | 21 |
| Nitrogen in Hoper | 3 | 3 | 3 | 3 | 3 |
| Need: polymer chips moisture | No | | | | |

TABLE 17

RXT-1 Take-Up

| | Sample I.D. | | | | |
|---|---|---|---|---|---|
| | 9B | 9C | 9D | 9E | 9F |
| | POLYMER TYPE Nylon Blend | | | | |
| | 9 | 9 | 9 | 9 | 9 |
| SAMPLE START TIME | | | | | |
| SAMPLE FINISH TIME | | | | | |
| Run time (min) | 5–10 min | 5–10 min | 5–10 min | 5–10 min | 5–10 min |
| Finish type | F-137-10 | F-137-10 | F-137-10 | F-137-10 | F-137-10 |
| Kiss roll (rpm) | 3.7 | 3.7 | 3.7 | 3.7 | 3.7 |
| Godets: | | | | | |
| SMALL Roll #1 SPEED (m/min) RXT-2 | 4090 | 4090 | 4090 | 4090 | 4090 |
| SMALL Roll #2 SPEED (m/min) | | | | | |
| LARGE Roll #3 SPEED (m/min) | | | | | |
| LARGE Roll # 4 SPEED (m/min.) RXT-1 | 4090 | 4090 | 4090 | 4090 | 4090 |
| Entangling | | | | | |
| jet type | | | | | |
| air to jet (psi) | | | | | |
| Winder grove roll: Speed (m/min.) | 4499 | 4499 | 4499 | 4499 | 4499 |
| Winder drive roll: Speed (m/min. | 4090 | 4090 | 4090 | 4090 | 4090 |
| Undrawn Denier | 20.0 | 20.0 | 20.0 | 20.0 | 20.0 |

TABLE 18

| | | 1st Heat Cycle | | | | | |
|---|---|---|---|---|---|---|---|
| | 300 | Rate (C./min): | 20 | Hold (min): | | | |
| Cycle Type: | | | Melting Peaks | | | | |
| Scan Conditions | Onset 1 | 1st Tm | ΔHf 1 | Onset 2 | 2nd Tm | 3rd Tm | ΔHf 2 |
| Sample ID | Run# | (C.) | (C.) | (J/g) | (C.) | (C.) | (C.) | (J/g) |
| 9 B | 1 | 119.1 | 132.4 | 4.7 | 180.4 | 190.4 | 217.1 | 63.8 |
|  | 2 | 118.1 | 132.3 | 5.5 | 180.7 | 190.8 | 217.6 | 66.5 |
|  | Ave | 118.6 | 132.4 | 5.1 | 180.6 | 190.6 | 217.4 | 65.2 |
| 9 C | 1 | 128.8 | 141.0 | 4.0 | 180.4 | 186.2 | 216.1 | 62.7 |
|  | 2 | 128.2 | 140.5 | 4.6 | 180.3 | 186.4 | 216.6 | 61.6 |
|  | Ave | 128.5 | 140.8 | 4.3 | 180.4 | 186.3 | 216.4 | 62.2 |
| 9 D | 1 | 129.0 | 141.8 | 4.7 | 181.1 | 189.2 | 216.8 | 62.5 |
|  | 2 | 129.2 | 141.2 | 4.6 | 181.0 | 189.2 | 216.8 | 63.2 |
|  | Ave | 129.1 | 141.5 | 4.6 | 181.1 | 189.2 | 216.8 | 62.8 |

TABLE 18-continued

| | | 1st Heat Cycle | | | | | | |
|---|---|---|---|---|---|---|---|---|
| | | 300 | Rate (C./min): | 20 | Hold (min): | | | |
| Cycle Type: | | | | Melting Peaks | | | | |
| Scan Conditions | | Onset 1 | 1st Tm | ΔHf 1 | Onset 2 | 2nd Tm | 3rd Tm | ΔHf 2 |
| Sample ID | Run# | (C.) | (C.) | (J/g) | (C.) | (C.) | (C.) | (J/g) |
| 9 E | 1 | 132.6 | 145.2 | 4.8 | 181.1 | 189.6 | 215.9 | 62.3 |
| | 2 | 134.4 | 146.2 | 4.4 | 182.0 | 189.9 | 216.1 | 61.6 |
| | Ave | 133.5 | 145.7 | 4.6 | 181.6 | 189.8 | 216.0 | 61.9 |
| 9 F | 1 | 137.2 | 148.3 | 4.4 | 180.9 | 187.0 | 213.8 | 59.3 |
| | 2 | 136.7 | 148.6 | 4.2 | 180.8 | 187.0 | 213.7 | 58.3 |
| | Ave | 137.0 | 148.5 | 4.3 | 180.9 | 187.0 | 213.8 | 58.8 |
| 9 B As Received | 1 | | | | 177.9 | 190.1 | 217.3 | 63.9 |
| | 2 | | | | 175.5 | 189.4 | 217.4 | 64.8 |
| | Ave | | | | 176.7 | 189.8 | 217.4 | 64.3 |
| 9 F As Received | 1 | | | | 177.4 | 186.4 | 213.8 | 61.6 |
| | 2 | | | | 175.7 | 185.5 | 213.1 | 66.3 |
| | Ave | | | | 176.6 | 186.0 | 213.5 | 63.9 |

TABLE 20

RXT-2 Extrusion

| | Sample I.D. | | | | |
|---|---|---|---|---|---|
| | 9B | 9C | 9D | 9E | 9F |
| | POLYMER TYPE MBM/technic & lactam blends | | | | |
| | Blend #9 | Blend #9 | Blend #9 | Blend #9 | Blend #9 |
| | | | | | 8/11/2003 |
| water on feeding zone | on | on | on | on | on |
| zone 1 Temp. (deg C.) | 220 | 230 | 240 | 250 | 260 |
| zone 2 Temp. (deg C.) | 220 | 230 | 240 | 250 | 260 |
| zone 3 Temp. (deg C.) | 220 | 230 | 240 | 250 | 260 |
| zone 4 Temp. (deg C.) | 220 | 230 | 240 | 250 | 260 |
| zone 5 Temp. (deg C.) | 220 | 230 | 240 | 250 | 260 |
| zone 6 Temp. (deg C.) | 220 | 230 | 240 | 250 | 260 |
| zone 7 Temp. (deg C.) | 220 | 230 | 240 | 250 | 260 |
| 8 Connecting Plate Temp. (deg. C.) | 220 | 230 | 240 | 250 | 260 |
| 9 Block Temp. (deg. C.) | 220 | 230 | 240 | 250 | 260 |
| 10 Spin Pump Temp. (deg. C.) | 220 | 230 | 240 | 250 | 260 |
| 11 Top Cap (deg. C.) | 220 | 230 | 240 | 250 | 260 |
| 12 Spin Pack Temp. (deg. C.) | 220 | 230 | 240 | 250 | 260 |
| Barrel Melt Temp. (deg. C.) | 225 | 235 | 245 | 255 | 265 |
| Melt Pump Inlet Pressure (psi) | | | | | |
| Melt Pump Outlet Pressure (psi) | | | | | |
| Extruder (rpm) | 200 | 200 | 200 | 200 | 200 |
| Monomer Exhaust inches water | | | | | |
| Spinneret: no. of holes/Shape | 6R | 6R | 6R | 6R | 6R |
| Spinneret: capilary diameter & depth | .01778 × .061 | .01778 × .061 | .01778 × .061 | .01778 × .061 | .01778 × .061 |
| Metering pump size (cc/rev) | 1.16 | 1.16 | 1.16 | 1.16 | 1.16 |
| Metering pump (rpm) | 7.5 | 7.5 | 7.5 | 7.5 | 7.5 |
| Thruput (lbs/hr) | 1.13 | 1.13 | 1.13 | 1.13 | 1.13 |
| Filter type | STD SCREEN | STD SCREEN | STD SCREEN | STD SCREEN | STD SCREEN |
| Quench air Flow rate (CF/M) | 7.1 | 7.1 | 7.1 | 7.1 | 7.1 |
| Qench air Temp. (deg. C.) | 20.1 | 20.1 | 20.1 | 20.1 | 20.1 |
| Quench air Humidity % | 54.5 | 54.5 | 54.5 | 54.5 | 54.5 |
| % Torque | 21 | 21 | 21 | 21 | 21 |
| Nitrogen in Hoper | 3 | 3 | 3 | 3 | 3 |
| Need: polymer chips moisture | No | | | | |

TABLE 21

RXT-1 Take-Up

| | Sample I.D. | | | | |
|---|---|---|---|---|---|
| | 9B | 9C | 9D | 9E | 9F |
| | POLYMER TYPE Nylon Blend | | | | |
| | 9 | 9 | 9 | 9 | 9 |
| SAMPLE START TIME | | | | | |
| SAMPLE FINISH TIME | | | | | |
| Run time (min) | 5-10 min | 5-10 min | 5-10 min | 5-10 min | 5-10 min |
| Finish type | F-137-10 | F-137-10 | F-137-10 | F-137-10 | F-137-10 |
| Kiss roll (rpm) | 3.7 | 3.7 | 3.7 | 3.7 | 3.7 |
| Godets: | | | | | |
| SMALL Roll #1 SPEED (m/min) RXT-2 | 4090 | 4090 | 4090 | 4090 | 4090 |
| SMALL Roll #2 SPEED (m/min) | | | | | |
| LARGE Roll #3 SPEED (m/min) | | | | | |
| LARGE Roll # 4 SPEED (m/min.) RXT-1 | 4090 | 4090 | 4090 | 4090 | 4090 |
| Entangling | | | | | |
| jet type | | | | | |
| air to jet (psi) | | | | | |
| Winder grove roll: Speed (m/min.) | 4499 | 4499 | 4499 | 4499 | 4499 |
| Winder drive roll: Speed (m/min. | 4090 | 4090 | 4090 | 4090 | 4090 |
| Undrawn Denier | 20.0 | 20.0 | 20.0 | 20.0 | 20.0 |

TABLE 22

| | | 1st Heat Cycle | | | |
|---|---|---|---|---|---|
| Cycle Type: | 20 | Hold (min): | | na | |
| Scan Conditions | | Melting Peaks | | | |
| Sample ID | Run # | Onset (C.) | 1st Tm (C.) | 2nd Tm (C.) | ΔHf (J/g) |
| 1A | 1 | 177.4 | 184.6 | 212.6 | 53.0 |
| | 2 | 177.6 | 184.7 | 213.1 | 55.0 |
| | Ave | 177.5 | 184.7 | 212.9 | 54.0 |
| 1B | 1 | 178.3 | 185.6 | 214.9 | 50.9 |
| | 2 | 177.7 | 185.4 | 214.2 | 52.9 |
| | Ave | 178.0 | 185.5 | 214.6 | 51.9 |
| 1C | 1 | 178.2 | 185.7 | 215.5 | 54.7 |
| | 2 | 178.2 | 185.7 | 215.7 | 53.1 |
| | Ave | 178.2 | 185.7 | 215.6 | 53.9 |
| 2 | 1 | 173.7 | 184.6 | 214.3 | 60.0 |
| | 2 | 175.5 | 185.0 | 214.5 | 53.1 |
| | Ave | 174.6 | 184.8 | 214.4 | 56.5 |
| 3 | 1 | 175.5 | 183.5 | 214.1 | 55.2 |
| | 2 | 174.2 | 182.8 | 213.3 | 57.5 |
| | Ave | 174.9 | 183.2 | 213.7 | 56.4 |
| 4 | 1 | 176.9 | 185.1 | 214.4 | 55.6 |
| | 2 | 177.0 | 185.2 | 213.9 | 54.7 |
| | Ave | 177.0 | 185.2 | 214.2 | 55.2 |

TABLE 24

RXT-2 Extrusion

| | Sample I.D. | | | | |
|---|---|---|---|---|---|
| | 1 | 2 | 3 | 4 | 5 |
| | POLYMER TYPE MBM/technic & lactam blends | | | | |
| | Blend #1 | Blend #2 | Blend #3 | Blend #4 | Blend #5 |
| water on feeding zone | on | on | on | on | on |
| zone 1 Temp. (deg C.) | 253 | 253 | 253 | 253 | 253 |

TABLE 24-continued

RXT-2 Extrusion

Sample I.D.

POLYMER TYPE MBM/technic & lactam blends

| | 1 | 2 | 3 | 4 | 5 |
|---|---|---|---|---|---|
| | Blend #1 | Blend #2 | Blend #3 | Blend #4 | Blend #5 |
| zone 2 Temp. (deg C.) | 253 | 253 | 253 | 253 | 253 |
| zone 3 Temp. (deg C.) | 253 | 253 | 253 | 253 | 253 |
| zone 4 Temp. (deg C.) | 253 | 253 | 253 | 253 | 253 |
| zone 5 Temp. (deg C.) | 253 | 253 | 253 | 253 | 253 |
| zone 6 Temp. (deg C.) | 248 | 248 | 248 | 248 | 248 |
| zone 7 Temp. (deg C.) | 248 | 248 | 248 | 248 | 248 |
| 8 Connecting Plate Temp. (deg. C.) | 251 | 251 | 251 | 251 | 251 |
| 9 Block Temp. (deg. C.) | 250 | 250 | 250 | 250 | 250 |
| 10 Spin Pump Temp. (deg. C.) | 252 | 252 | 252 | 252 | 252 |
| 11 Top Cap (deg. C.) | 252 | 252 | 252 | 252 | 252 |
| 12 Spin Pack Temp. (deg. C.) | 253 | 253 | 253 | 253 | 253 |
| Barrel Melt Temp. (deg. C.) | 255 | 255 | 255 | 255 | 255 |
| Melt Pump Inlet Pressure (psi) | | | | | |
| Melt Pump Outlet Pressure (psi) | | | | | |
| Extruder (rpm) | 200 | 200 | 200 | 200 | 200 |
| Monomer Exhaust inches water | | | | | |
| Spinneret: no. of holes/Shape | 6R | 6R | 6R | 6R | 6R |
| Spinneret: capilary diameter & depth | .01778 × .061 | .01778 × .061 | .01778 × .061 | .01778 × .061 | .01778 × .061 |
| Metering pump size (cc/rev) | 1.16 | 1.16 | 1.16 | 1.16 | 1.16 |
| Metering pump (rpm) | 7.5 | 7.5 | 7.5 | 7.5 | 7.5 |
| Thruput (lbs/hr) | 1.13 | 1.13 | 1.13 | 1.13 | 1.13 |
| Filter type | STD SCREEN | STD SCREEN | STD SCREEN | STD SCREEN | STD SCREEN |
| Quench air Flow rate (CF/M) | 7.1 | 7.1 | 7.1 | 7.1 | 7.1 |
| Qench air Temp. (deg. C.) | 20.1 | 20.1 | 20.1 | 20.1 | 20.1 |
| Quench air Humidity % | 54.5 | 54.5 | 54.5 | 54.5 | 54.5 |
| % Torque | 21 | 21 | 21 | 21 | 21 |
| Nitrogen in Hoper | 3 | 3 | 3 | 3 | 3 |
| Need: polymer chips moisture | No | | | | |

TABLE 25

RXT-1 Take-Up

Sample I.D.

POLYMER TYPE Nylon Blend

| | 1 | 2 | 3 | 4 | 5 |
|---|---|---|---|---|---|
| | 1 | 2 | 3 | 4 | 5 |
| SAMPLE START TIME | | | | | |
| SAMPLE FINISH TIME | | | | | |
| Run time (min) | 5–10 min | 5–10 min | 5–10 min | 5–10 min | 5–10 min |
| Finish type | F-137-10 | F-137-10 | F-137-10 | F-137-10 | F-137-10 |
| Kiss roll (rpm) | 3.7 | 3.7 | 3.7 | 3.7 | 3.7 |
| Godets: | | | | | |
| SMALL Roll #1 SPEED (m/min) RXT-2 | 4090 | 4090 | 4090 | 4090 | 4090 |
| SMALL Roll #2 SPEED (m/min) | | | | | |
| LARGE Roll #3 SPEED (m/min) | | | | | |
| LARGE Roll # 4 SPEED (m/min.) RXT-1 | 4090 | 4090 | 4090 | 4090 | 4090 |
| Entangling | | | | | |
| jet type | | | | | |
| air to jet (psi) | | | | | |
| Winder grove roll: Speed (m/min.) | 4499 | 4499 | 4499 | 4499 | 4499 |
| Winder drive roll: Speed (m/min. | 4090 | 4090 | 4090 | 4090 | 4090 |
| Undrawn Denier | 20.0 | 20.0 | 20.0 | 20.0 | 20.0 |
| Need: undrawn yarn Denier, instron | | | | | |
| , free fall FAV (after each run set) | | | | | |
| submit free fall and polymer for FAV | | | | | |
| Monomer Exhaust inches water | | | | | |

TABLE 26

| Cycle Type: | | 1st Heat Cycle | | | |
|---|---|---|---|---|---|
| | | 20 | Hold (min): | na | |
| | | | Melting Peaks | | |
| Scan Conditions | | Onset | 1st Tm | 2nd Tm | ΔHf |
| Sample ID | Run# | (C.) | (C.) | (C.) | (J/g) |
| #1 | 1 | 179.4 | 190.9 | 216.3 | 59.7 |
| | 2 | 179.3 | 190.5 | 216.0 | 60.2 |
| | Ave | 179.4 | 190.7 | 216.2 | 60.0 |
| #2 | 1 | 180.6 | 193.1 | 216.5 | 61.8 |
| | 2 | 181.1 | 192.8 | 216.5 | 60.5 |
| | Ave | 180.9 | 193.0 | 216.5 | 61.2 |
| #3 | 1 | 185.1 | 199.5 | 218.1 | 62.9 |
| | 2 | 184.1 | 199.0 | 218.1 | 66.3 |
| | Ave | 184.6 | 199.3 | 218.1 | 64.6 |
| #4 | 1 | 201.9 | | 219.7 | 67.6 |
| | 2 | 202.0 | | 219.2 | 68.5 |
| | Ave | 202.0 | | 219.5 | 68.1 |
| #5 | 1 | 185.8 | 199.5 | 218.0 | 61.5 |
| | 2 | 186.3 | 200.0 | 218.3 | 61.1 |
| | Ave | 186.1 | 199.8 | 218.2 | 61.3 |
| #10 | 1 | 170.5 | | 172.1 | 51.8 |
| | 2 | 170.5 | | 172.3 | 49.9 |
| | Ave | 170.5 | | 172.2 | 50.8 |
| | 1 | | | | |
| | 2 | | | | |
| | Ave | | | | |
| | 1 | | | | |
| | 2 | | | | |
| | Ave | | | | |
| | 1 | | | | |
| | 2 | | | | |
| | Ave | | | | |
| | 1 | | | | |
| | 2 | | | | |
| | Ave | | | | |

We claim:

1. A pre-fiber composition, comprising:
a first fiber constituent having a first melting point;
a second fiber constituent having a second melting point; and
a gelling agent that solvates at least one of the first fiber constituent or the second fiber constituent, wherein the gelling agent significantly reduces co-polymerization of either of the constituents in the composition.

2. The pre-fiber composition of claim 1, comprising at least one additional fiber constituent having a melting point that is different from the first melting point and the second melting point.

3. The pre-fiber composition of claim 1, wherein at least one of the first fiber constituent and the second fiber constituent comprises at least one polyamide-based compound.

4. The pre-fiber composition of claim 3, wherein the at least one polyamide-based compound comprises a nylon compound.

5. The pre-fiber composition of claim 4, wherein the nylon compound comprises nylon-6.

6. The pre-fiber composition of claim 4, wherein the nylon compound comprises nylon-6,6.

7. The pre-fiber composition of claim 4, wherein the nylon compound comprises a co-polymer.

8. The pre-fiber composition of claim 7, wherein the co-polymer comprises nylon-6,6,6.

9. The pre-fiber composition of claim 1, wherein the at least one gelling agent comprises lactam.

10. The pre-fiber composition of claim 9, wherein the lactam comprises caprolactam.

11. The pre-fiber composition of claim 1, wherein the first fiber constituent comprises nylon-6,6,6, the second fiber constituent comprises nylon-6, and the gelling agent comprises a lactam-based compound.

12. The pre-fiber composition of claim 1, wherein the at least one gelling agent comprises less than 50 weight percent of the composition.

13. The pre-fiber composition of claim 12, wherein the at least one gelling agent comprises less than 40 weight percent of the composition.

14. The pre-fiber composition of claim 13, wherein the at least one gelling agent comprises less than 30 weight percent of the composition.

15. The pre-fiber composition of claim 14, wherein the at least one gelling agent comprises less than 20 weight percent of the composition.

16. The pre-fiber composition of claim 15, wherein the at least one gelling agent comprises less than 10 weight percent of the composition.

17. The pre-fiber composition of claim 16, wherein the at least one gelling agent comprises less than 5 weight percent of the composition.

18. A spun fiber comprising the composition of claim 1.

19. A carpet product comprising the spun fiber of claim 18.

20. A fiber, comprising:
at least two polyamide-based compounds, each having a melting point, wherein the melting point of one polyamide-based compound is dissimilar to the melting point of a second polyamide-based compound; and
a gelling agent that is compatible with at least one of the polyamide-based compound,
wherein the fiber comprises two differentiatable melting points that are substantially similar to the melting points of each of the polyamide-based compound.

21. A method of producing a pre-fiber composition, comprising:
providing a first fiber constituent having a first melting point;
providing a second fiber constituent having a second melting point, wherein the first melting point and the second melting point are dissimilar;
providing at least one gelling agent that is compatible with at least one of the fiber constituents; and
mixing the first fiber constituent, the second fiber constituent and the at least one gelling agent such that there is sufficient viscosity and sufficient melt strength in the composition so that it can be spun into a fiber and such that the first melting point and the second melting point in the fiber are substantially similar to their original values before mixing.

22. The method of claim 21, comprising providing at least one additional fiber constituent having a melting point that is different from the first melting point and the second melting point.

23. The method of claim 21, wherein at least one of the first fiber constituent and the second fiber constituent comprises at least one polyamide-based compound.

24. The method of claim 23, wherein the at least one polyamide-based compound comprises a nylon compound.

25. The method of claim 24, wherein the nylon compound comprises nylon-6.

26. The method of claim 24, wherein the nylon compound comprises nylon-6,6.

27. The method of claim 24, wherein the nylon compound comprises a co-polymer.

28. The method of claim 27, wherein the co-polymer comprises nylon-6,6,6.

29. The method of claim 21, wherein the at least one gelling agent comprises lactam.

30. The method of claim 29, wherein the lactam comprises caprolactam.

31. The method of claim 21, wherein the first fiber constituent comprises nylon-6,6,6, the second fiber constituent comprises nylon-6, and the gelling agent comprises a lactam-based compound.

32. The method of claim 21, wherein the at least one gelling agent comprises less than 50 weight percent of the composition.

33. The method of claim 32, wherein the at least one gelling agent comprises less than 40 weight percent of the composition.

34. The method of claim 33, wherein the at least one gelling agent comprises less than 30 weight percent of the composition.

35. The method of claim 34, wherein the at least one gelling agent comprises less than 20 weight percent of the composition.

36. The method of claim 35, wherein the at least one gelling agent comprises less than 10 weight percent of the composition.

37. The method of claim 36, wherein the at least one gelling agent comprises less than 5 weight percent of the composition.

38. The method of claim 21, wherein mixing comprises blending.

39. The method of claim 21, wherein mixing comprises extruding.

40. The method of claim 21, further comprising heating the composition.

41. The method of claim 21, further comprising removing at least part of the at least one gelling agent after the mixing step.

42. A spun fiber formed using the method of claim 21.

43. A carpet product comprising the spun fiber of claim 42.

* * * * *